United States Patent
Johns et al.

(10) Patent No.: US 10,792,651 B2
(45) Date of Patent: Oct. 6, 2020

(54) SYNTHESIS AND CHARACTERIZATION OF RU ALKYLIDENE COMPLEXES

(71) Applicants: Umicore AG & Co. KG, Hanau-Wolfgang (DE); California Institute of Technology, Pasadena, CA (US)

(72) Inventors: Adam M. Johns, Claremont, CA (US); Jessica R. Herron, Pasadena, CA (US); Richard L. Pederson, San Gabriel, CA (US); Bryan A. Fiamengo, Yorba Linda, CA (US); Jennifer A. Beerman, Monrovia, CA (US); Tzu-Pin Lin, El Lago, TX (US); Crystal K. Chu, Cambridge, MA (US); Robert H. Grubbs, South Pasadena, CA (US)

(73) Assignees: Umicore AG & Co. KG, Hanau-Wolfgang (DE); California Institute of Technology, Pasadena, CA (US)

(*) Notice: Subject to any disclaimer, the term of this patent is extended or adjusted under 35 U.S.C. 154(b) by 0 days.

(21) Appl. No.: 16/341,635

(22) PCT Filed: Oct. 17, 2017

(86) PCT No.: PCT/US2017/056919
§ 371 (c)(1),
(2) Date: Apr. 12, 2019

(87) PCT Pub. No.: WO2018/075479
PCT Pub. Date: Apr. 26, 2018

(65) Prior Publication Data
US 2020/0038851 A1    Feb. 6, 2020

Related U.S. Application Data

(60) Provisional application No. 62/509,269, filed on May 22, 2017, provisional application No. 62/410,003, filed on Oct. 19, 2016.

(51) Int. Cl.
*B01J 31/24* (2006.01)
*B01J 31/22* (2006.01)
*C07F 15/00* (2006.01)

(52) U.S. Cl.
CPC ....... *B01J 31/2414* (2013.01); *B01J 31/2208* (2013.01); *B01J 31/2273* (2013.01); *B01J 31/2278* (2013.01); *B01J 31/2295* (2013.01); *B01J 31/2404* (2013.01); *B01J 31/2409* (2013.01); *C07F 15/0046* (2013.01); *B01J 2231/543* (2013.01); *B01J 2531/821* (2013.01)

(58) Field of Classification Search
CPC .................................................. B01J 31/2414
USPC ......................................................... 544/64
See application file for complete search history.

(56) References Cited

U.S. PATENT DOCUMENTS

| | | | |
|---|---|---|---|
| 4,899,005 | A | 2/1990 | Lane et al. |
| 6,306,987 | B1 | 10/2001 | Van Der Schaaf et al. |
| 2010/0204514 | A1 | 8/2010 | Abdur-Rashid et al. |
| 2014/0303315 | A1 | 10/2014 | Nava et al. |
| 2014/0357820 | A1 | 12/2014 | Stephen et al. |

FOREIGN PATENT DOCUMENTS

WO    WO-02076920 A1    10/2002

OTHER PUBLICATIONS

International Search Report for PCT/US2017/056919 dated Dec. 21, 2017.
Written Opinion of the International Searching Authority for PCT/US2017/056919 dated Dec. 21, 2017.
Mohr, B. et al., "Synthesis of Water-Soluble, Aliphatic Phosphines and Their Application to Well-Defined Ruthenium Olefin Metathesis Catalysts", Organometallics, 1996, vol. 15, pp. 4317-4325.
Bantreil, X., et al., "Synthesis and Reactivity of Ruthenium Phosphite Indenylidene Complexes" Organometallics, 2012, vol. 31, No. 21, pp. 7415-7426.

*Primary Examiner* — Kahsay Habte
(74) *Attorney, Agent, or Firm* — Faegre Drinker Biddle & Reath LLP

(57) ABSTRACT

This invention relates generally to olefin metathesis catalyst compounds, to the preparation of such compounds, compositions comprising such compounds, methods of using such compounds, articles of manufacture comprising such compounds, and the use of such compounds in the metathesis of olefins and olefin compounds. The invention has utility in the fields of catalysts, organic synthesis, polymer chemistry, and industrial and fine chemicals industry.

8 Claims, 12 Drawing Sheets

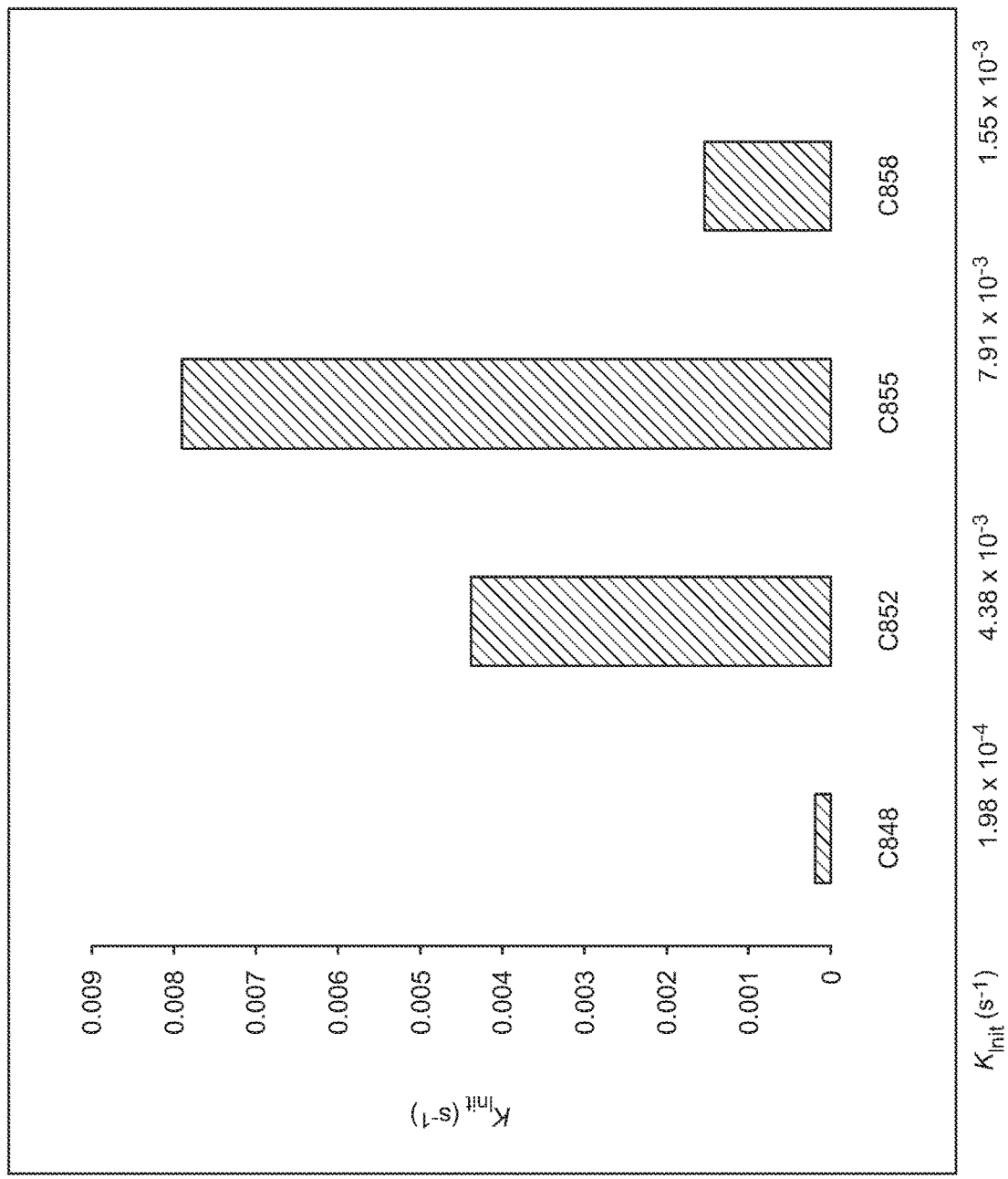

SYNTHESIS AND CHARACTERIZATION OF RU ALKYLIDENE COMPLEXES

RELATED APPLICATIONS

This application claims the benefit of U.S. Provisional Patent Application No. 62/410,003, filed Oct. 19, 2016, and the benefit of U.S. Provisional Patent Application No. 62/509,269, filed May 22, 2017, the contents of which are incorporated herein by reference.

TECHNICAL FIELD

This invention relates generally to olefin metathesis catalysts, to the preparation of such compounds, compositions comprising such compounds, methods of using such compounds, and the use of such compounds in the metathesis of olefins and in the synthesis of related olefin metathesis catalysts. The invention has utility in the fields of catalysis, organic synthesis, polymer chemistry, and in industrial applications such as oil and gas, fine chemicals and pharmaceuticals.

BACKGROUND

Since its discovery in the 1950s, olefin metathesis has emerged as a valuable synthetic method for the formation of carbon-carbon double bonds. Recent advances in applications to organic syntheses and polymer syntheses mostly rely on developments of well-defined olefin metathesis catalysts.

The technology of ruthenium metathesis catalysts has enabled the development of several research platforms including: ring opening metathesis polymerization (ROMP), ring opening cross metathesis (ROCM), cross metathesis (CM), ring closing metathesis (RCM).

The incorporation of N-Heterocyclic Carbene (NHC) ligands has played an essential role in the development of ruthenium metathesis catalysts. Metathesis catalysts, based on ruthenium, are known and have been studied.

However, there is an ongoing need for olefin metathesis catalysts, particularly ruthenium metathesis catalysts with improved characteristics which will further enable their use in a wider array of applications and olefin metathesis reactions, and for methods to prepare them.

SUMMARY OF THE INVENTION

To meet this need the inventors have discovered various olefin metathesis catalysts as described herein.

In one embodiment, the invention provides an olefin metathesis catalyst, represented by the structure of Formula (I):

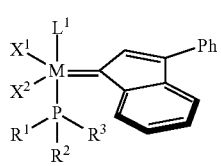

Formula (I)

wherein:

M is a Group 8 transition metal; generally M is ruthenium or osmium; typically M is ruthenium;

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F;

$L^1$ is a ligand represented by the structure of Formula (II), or is an NHC ligand represented by the structure of Formula (III):

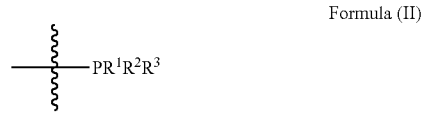

Formula (II)

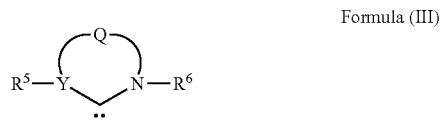

Formula (III)

$R^1$ is unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$;

$R^2$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$;

$R^3$ is unsubstituted ($C_5$-$C_{24}$ aryl), substituted ($C_5$-$C_{24}$ aryl), unsubstituted saturated N-heterocycle, or substituted saturated N-heterocycle;

Y is $CR^4$ or N;

$R^4$ is hydrogen, unsubstituted ($C_1$-$C_{12}$ alkyl), or substituted ($C_1$-$C_{12}$ alkyl);

$R^5$ and $R^6$ are independently hydrogen, unsubstituted ($C_5$-$C_{24}$ aryl), or substituted ($C_5$-$C_{24}$ aryl);

Q is a two-atom linkage represented by structures —[$CR^7R^8$]$_s$—[$CR^9R^{10}$]$_t$— or —[$CR^{11}$=$CR^{12}$]—;

$R^7$, $R^8$, $R^9$ and $R^{10}$ are independently hydrogen, unsubstituted ($C_1$-$C_{24}$ alkyl), substituted ($C_1$-$C_{24}$ alkyl), unsubstituted ($C_5$-$C_{24}$ aryl), or substituted ($C_5$-$C_{24}$ aryl); or any two of $R^7$, $R^8$, $R^9$ and $R^{10}$ are optionally linked together to form a substituted or unsubstituted, saturated or unsaturated ring structure;

$R^{11}$ and $R^{12}$ are independently hydrogen, unsubstituted ($C_1$-$C_{24}$ alkyl), substituted ($C_1$-$C_{24}$ alkyl), unsubstituted ($C_5$-$C_{24}$ aryl), or substituted ($C_5$-$C_{24}$ aryl); or $R^{11}$ and $R^{12}$ are optionally linked together to form a substituted or unsubstituted, saturated or unsaturated ring structure; and "s" and "t" are independently 1 or 2; typically "s" and "t" are independently 1.

In another embodiment, the invention provides an olefin metathesis catalyst, represented by the structure of Formula (IV):

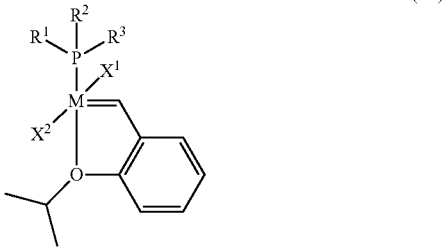

Formula (IV)

wherein:

M is a Group 8 transition metal; generally M is ruthenium or osmium; typically M is ruthenium;

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F;

$R^1$ is unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$;

$R^2$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; and $R^3$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$.

In another embodiment, the invention provides an olefin metathesis catalyst, represented by the structure of Formula (V):

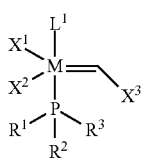

Formula (V)

wherein:

M is a Group 8 transition metal; generally M is ruthenium or osmium; typically M is ruthenium;

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F;

$X^3$ is phenyl

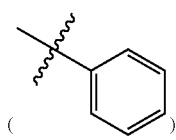 [SMILES: *c1ccccc1]

or 2-methyl-1-propenyl (—CH=C(CH$_3$)$_2$ or

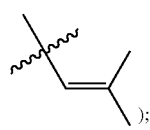 [SMILES: *C=C(C)C]

);

$L^1$ is a ligand represented by the structure of Formula (II), or is an NHC ligand represented by the structure of Formula (III):

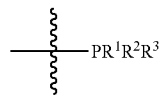

Formula (II)

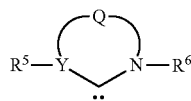

Formula (III)

$R^1$ is unsubstituted saturated N-heterocycle, substituted saturated N-heterocycle, unsubstituted unsaturated N-heterocycle, substituted unsaturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl), —N[($C_1$-$C_6$ alkylene)($C_5$-$C_{24}$ aryl)]$_2$, or —O—($C_1$-$C_{12}$ alkyl);

$R^2$ is unsubstituted ($C_5$-$C_{24}$ cycloalkyl), substituted ($C_5$-$C_{24}$ cycloalkyl), unsubstituted saturated N-heterocycle, substituted saturated N-heterocycle, unsubstituted ($C_5$-$C_{24}$ aryl), substituted ($C_5$-$C_{24}$ aryl), —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$;

$R^3$ is unsubstituted ($C_5$-$C_{24}$ cycloalkyl), substituted ($C_5$-$C_{24}$ cycloalkyl), unsubstituted saturated N-heterocycle, substituted saturated N-heterocycle, unsubstituted ($C_5$-$C_{24}$ aryl), or substituted ($C_5$-$C_{24}$ aryl);

Y is $CR^4$ or N;

$R^4$ is hydrogen, unsubstituted ($C_1$-$C_{12}$ alkyl), or substituted ($C_1$-$C_{12}$ alkyl);

$R^5$ and $R^6$ are independently hydrogen, unsubstituted ($C_5$-$C_{24}$ aryl), or substituted ($C_5$-$C_{24}$ aryl);

Q is a two-atom linkage represented by structures —[$CR^7R^8$]$_s$—[$CR^9R^{10}$]$_t$— or —[$CR^{11}$=$CR^{12}$]—;

$R^7$, $R^8$, $R^9$ and $R^{10}$ are independently hydrogen, unsubstituted ($C_1$-$C_{24}$ alkyl), substituted ($C_1$-$C_{24}$ alkyl), unsubstituted ($C_5$-$C_{24}$ aryl), or substituted ($C_5$-$C_{24}$ aryl); or any two of $R^7$, $R^8$, $R^9$ and $R^{10}$ are optionally linked together to form a substituted or unsubstituted, saturated or unsaturated ring structure;

$R^{11}$ and $R^{12}$ are independently hydrogen, unsubstituted ($C_1$-$C_{24}$ alkyl), substituted ($C_1$-$C_{24}$ alkyl), unsubstituted ($C_5$-$C_{24}$ aryl), or substituted ($C_5$-$C_{24}$ aryl); or $R^{11}$ and $R^{12}$ are optionally linked together to form a substituted or unsubstituted, saturated or unsaturated ring structure; and "s" and "t" are independently 1 or 2; typically "s" and "t" are independently 1.

In one embodiment, the invention provides a method of synthesizing the olefin metathesis catalysts of the invention.

In one embodiment, the invention provides a method of using the olefin metathesis catalysts of the invention in metathesis reactions. The olefin metathesis catalysts of the invention are of particular benefit for use in metathesis reactions, such as ring opening metathesis polymerization reactions, ring-opening cross metathesis reactions, cross metathesis reactions, ring-closing metathesis reactions, self-metathesis reactions, as well as combinations of such metathesis reactions.

The olefin metathesis catalysts of the invention are also key intermediates in the synthesis of a variety of ruthenium olefin metathesis catalysts.

These and other aspects of the present invention will be apparent to the skilled artisan in light of the following detailed description and examples. Furthermore, it is to be

BRIEF DESCRIPTION OF THE FIGURES

FIG. 12. Vinyl ether quenching experiments for catalysts: C848, C852, C855, C858.

DETAILED DESCRIPTION

Figure 1:
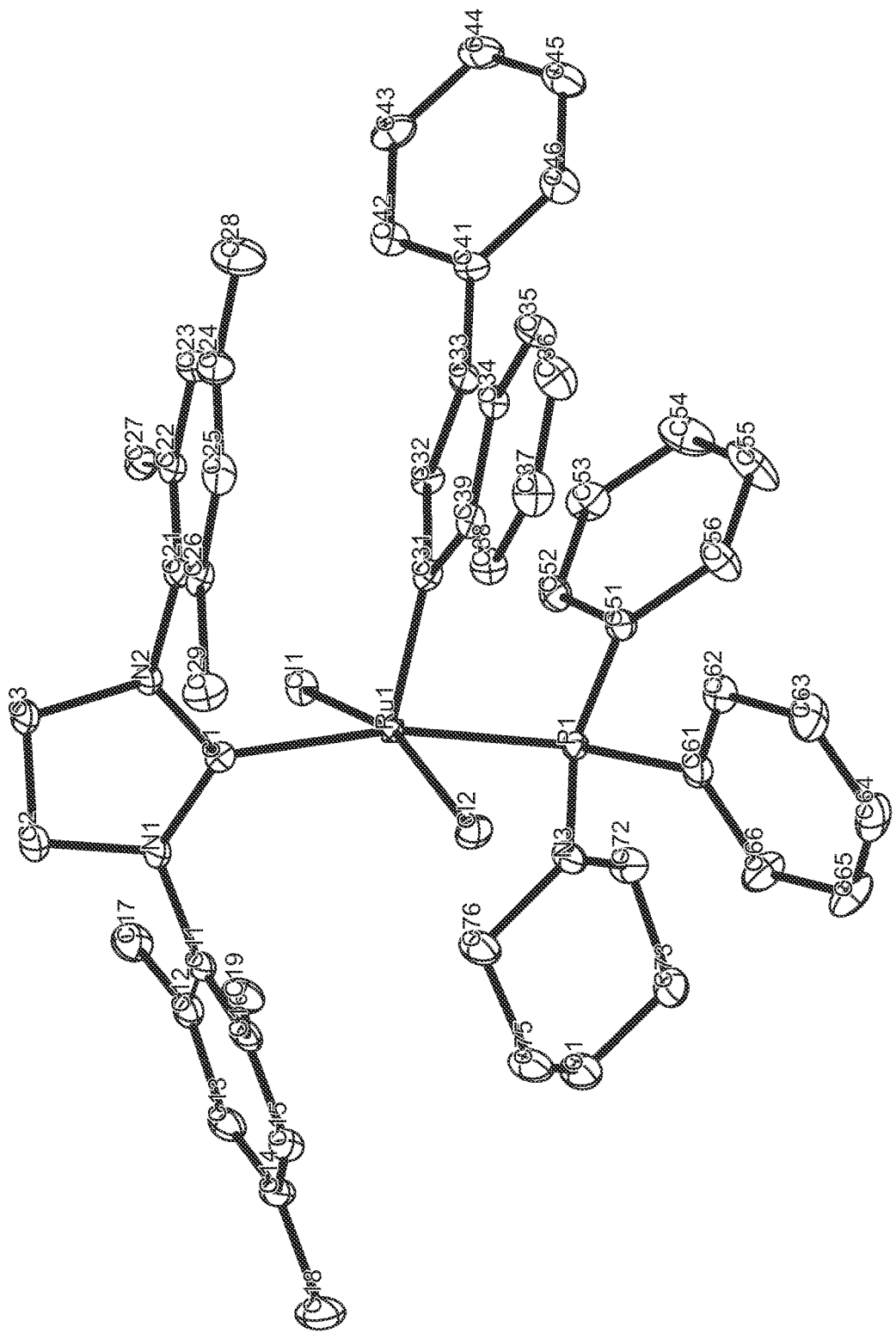
FIG. 1. Oak Ridge Thermal Ellipsoid Plot (ORTEP) diagram of C940.

Unless otherwise indicated, the invention is not limited to specific reactants, substituents, catalysts, reaction conditions, or the like, as such can vary. It is also to be understood that the terminology used herein is for the purpose of describing particular embodiments only and is not to be interpreted as being limiting.

As used in the specification and the appended claims, the singular forms "a," "an," and "the" include plural referents unless the context clearly dictates otherwise. Thus, for example, reference to "an olefin" includes a single olefin as well as a combination or mixture of two or more olefins, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing generally 1 to 30 carbon atoms, typically 1 to 12 carbon atoms, such as methyl, ethyl, n-propyl, iso-propyl, n-butyl, iso-butyl, t-butyl, octyl, decyl, and the like, as well as cycloalkyl groups such as cyclopentyl, cyclohexyl and the like. The term "lower alkyl" intends an alkyl group of 1 to 6 carbon atoms, and the specific term "cycloalkyl" intends a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a divalent linear, branched, or cyclic alkyl group, where "alkyl" is as defined above.

The term "alkenyl" as used herein refers to a linear, branched, or cyclic hydrocarbon group of 2 to 30 carbon atoms containing at least one double bond, such as ethenyl, n-propenyl, iso-propenyl, n-butenyl, iso-butenyl, octenyl, decenyl, tetradecenyl, hexadecenyl, eicosenyl, tetracosenyl, and the like. Typically alkenyl groups herein contain 2 to 12 carbon atoms. The term "lower alkenyl" intends an alkenyl group of 2 to 6 carbon atoms, and the specific term "cycloalkenyl" intends a cyclic alkenyl group, typically having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively. The term "alkenyl" is used interchangeably with the term "olefin" herein.

The term "alkenylene" as used herein refers to a divalent linear, branched, or cyclic alkenyl group, where "alkenyl" is as defined above.

The term "alkynyl" as used herein refers to a linear or branched hydrocarbon group of 2 to 30 carbon atoms containing at least one triple bond, such as ethynyl, n-propynyl, and the like. Typical alkynyl groups described herein contain 2 to 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein intends an alkyl group bound through a single, terminal ether linkage; that is, an "alkoxy" group can be represented as —O-alkyl where alkyl is as defined above. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Generally aryl groups contain 5 to 30 carbon atoms, and typically aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups.

The terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group can be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Generally alkaryl and aralkyl groups contain 6 to 30 carbon atoms, and typically alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctyl-naphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as defined herein.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl," and "aralkyl" are as defined above.

The terms "cyclic" and "ring" refer to moieties which are saturated or have unsaturations and are non-aromatic or are aromatic and that are optionally substituted and/or heteroatom containing, and that can be monocyclic, bicyclic, or polycyclic.

The term "saturated N-heterocycle" as used herein refers to a heteroatom-containing cyclic group, which is saturated and is attached to the rest of the molecule by a nitrogen (N) atom. The saturated N-heterocycle moiety contains rings wherein one or more carbon(s) has been replaced by a heteroatom, such as: N, S or O. Unsubstituted "saturated N-heterocycle" groups include pyrrolidino, morpholino, piperazino, piperidino, thiomorpholino, etc. Substituted "saturated N-heterocycle" groups include 1-methyl-piperazino, N-acetyl-piperazino, N-ethylcarboxylate-piperazino, etc.

The terms "halo," "halogen," and "halide" are used in the conventional sense to refer to a chloro, bromo, fluoro, or iodo substituent.

The term "hydrocarbyl" refers to univalent hydrocarbyl radicals containing 1 to 30 carbon atoms, typically containing 1 to 24 carbon atoms, specifically containing 1 to 12 carbon atoms, including linear, branched, cyclic, saturated, and unsaturated species, such as alkyl groups, alkenyl groups, aryl groups, and the like. The term "lower hydrocarbyl" intends a hydrocarbyl group of 1 to 6 carbon atoms, typically 1 to 4 carbon atoms, and the term "hydrocarbylene" intends a divalent hydrocarbyl moiety containing 1 to 30 carbon atoms, typically 1 to 24 carbon atoms, specifically 1 to 12 carbon atoms, including linear, branched, cyclic, saturated and unsaturated species. The term "lower hydrocarbylene" intends a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound is optionally aromatic, and further that "heterocycles" can be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc.

By "Grubbs-Hoveyda ligands," is meant benzylidene ligands having a chelating alkyloxy group attached to the benzene ring at the ortho position.

Examples of —NH($C_1$-$C_{24}$ alkyl) groups include —NHMe (e.g., methylamino), —NHEt (e.g., ethylamine), —NH(i-Pr) (e.g., iso-propylamino), etc.

Examples of —N($C_1$-$C_{24}$ alkyl)$_2$ groups include —N(Me)$_2$ (e.g., dimethylamino), —N(Et)$_2$ (e.g., diethylamino), —N(i-Pr)$_2$ (e.g., di-iso-propylamino), etc.

Examples of —NH($C_5$-$C_{24}$ aryl) groups include —NH($C_6$H$_5$) (e.g., phenylamino), etc.

Examples of —N($C_5$-$C_{24}$ aryl)$_2$ groups include —N($C_6$H$_5$)$_2$ (e.g., diphenylamino), etc.

Examples of —N($C_1$-$C_{24}$ alkyl)($C_5$-$C_{24}$ aryl) groups include —NMe($C_6$H$_5$) (e.g., phenylmethylamino), etc.

Examples of —N[($C_1$-$C_6$ alkylene)($C_5$-$C_{24}$ aryl)]$_2$ groups include —N[(CH$_2$)($C_6$H$_5$)]$_2$ (e.g., di-benzyl-amino), etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO—), carbamoyl (—(CO)—$NH_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ alkyl)), di-($C_1$-$C_{24}$ haloalkyl)-substituted carbamoyl (—(CO)—N($C_1$-$C_{24}$ alkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl, thiocarbamoyl (—(CS)—$NH_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), di-N—($C_1$-$C_{24}$ alkyl), N—($C_5$-$C_{24}$ aryl)-substituted thiocarbamoyl, carbamido (—NH—(CO)—$NH_2$), cyano(—C≡N), cyanato (—O—C≡N), thiocyanato (—S—C≡N), formyl (—(CO)—H), thioformyl (—(CS)—H), amino (—$NH_2$), mono-($C_1$-$C_{24}$ alkyl)-substituted amino, di-($C_1$-$C_{24}$ alkyl)-substituted amino, mono-($C_5$-$C_{24}$ aryl)-substituted amino, di-($C_5$-$C_{24}$ aryl)-substituted amino, ($C_1$-$C_{24}$ alkyl)($C_5$-$C_{24}$ aryl)-substituted amino, $C_2$-$C_{24}$ alkylamido (—NH—(CO)-alkyl), $C_6$-$C_{24}$ arylamido (—NH—(CO)-aryl), imino (—CR=NH where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR=N(alkyl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N(aryl), where R=hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—$NO_2$), nitroso (—NO), sulfo (—$SO_2$—OH), sulfonato (—$SO_2$—O—), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—$SO_2$-alkyl), $C_1$-$C_{24}$ monoalkylaminosulfonyl —$SO_2$—N(H) alkyl), $C_1$-$C_{24}$ dialkylaminosulfonyl —$SO_2$—N(alkyl)$_2$, $C_5$-$C_{24}$ arylsulfonyl (—$SO_2$-aryl), boryl (—$BH_2$), borono (—$B(OH)_2$), boronato (—$B(OR)_2$ where R is alkyl or other hydrocarbyl), phosphono (—$P(O)(OH)_2$), phosphonato (—$P(O)(O—)_2$), phosphinato (—P(O)(O—)), phospho (—$PO_2$), and phosphino (—$PH_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described hereinabove. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups can, if a particular group permits, be further substituted with one or more additional functional groups or with one or more hydrocarbyl moieties such as those specifically enumerated above. Analogously, the above-mentioned hydrocarbyl moieties can be further substituted with one or more functional groups or additional hydrocarbyl moieties such as those specifically enumerated.

"Optional" or "optionally" means that the subsequently described circumstance can or cannot occur, so that the description includes instances where the circumstance occurs and instances where it does not. For example, the phrase "optionally substituted" means that a non-hydrogen substituent can or cannot be present on a given atom, and, thus, the description includes structures wherein a non-hydrogen substituent is present and structures wherein a non-hydrogen substituent is not present.

Olefin Metathesis Catalysts

In one embodiment, the invention provides an olefin metathesis catalyst, represented by the structure of Formula (VI):

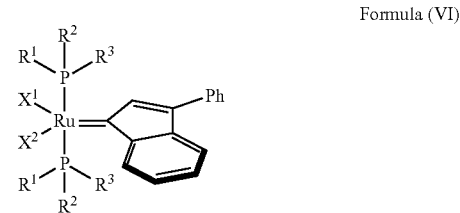

Formula (VI)

wherein:

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F;

$R^1$ is unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene) ($C_5$-$C_{24}$ aryl)]$_2$; generally $R^1$ is unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^2$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^2$ is unsubstituted ($C_6$ aryl), unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$; and $R^3$ is unsubstituted ($C_5$-$C_{24}$ aryl), substituted ($C_5$-$C_{24}$ aryl), unsubstituted saturated N-heterocycle, or substituted saturated N-heterocycle; generally $R^3$ is unsubstituted ($C_6$ aryl) or unsubstituted saturated N-heterocycle.

In another embodiment, the invention provides an olefin metathesis catalyst, represented by the structure of Formula (VI), wherein $X^1$ is Cl; $X^2$ is Cl; $R^1$ is morpholino, thiomorpholino, 1-methyl-piperazino, piperidino, N-acetyl-piperazino, di-benzyl-amino, N-ethylcarboxylate-piperazino, diethylamino, methyl-phenylamino, or di-iso-propylamino; $R^2$ is phenyl, morpholino, thiomorpholino, 1-methyl-piperazino, piperidino, N-acetyl-piperazino, di-benzyl-amino, N-ethylcarboxylate-piperazino, diethylamino, methyl-phenylamino, or di-iso-propylamino; and $R^3$ is phenyl or morpholino.

In another embodiment, the invention provides an olefin metathesis catalyst, represented by the structure of Formula (VII):

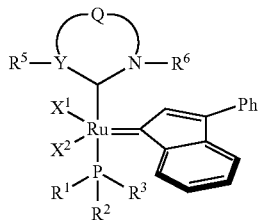

Formula (VII)

wherein:

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F;

$R^1$ is unsubstituted saturated N-heterocycle, substituted saturated N-heterocycle, $-NH(C_1-C_{24}$ alkyl), $-N(C_1-C_{24}$ alkyl$)_2$, $-NH(C_5-C_{24}$ aryl), $-N(C_5-C_{24}$ aryl$)_2$, $-N(C_1-C_{24}$ alkyl$)(C_5-C_{24}$ aryl) or $-N[(C_1-C_6$ alkylene$)(C_5-C_{24}$ aryl$)]_2$; generally $R^1$ is unsubstituted saturated N-heterocycle, substituted saturated N-heterocycle, $-N(C_1-C_6$ alkyl$)_2$, $-N(C_1-C_6$ alkyl$)(C_6$ aryl) or $-N[(C_1-C_3$ alkylene$)(C_6$ aryl$)]_2$;

$R^2$ is unsubstituted $(C_5-C_{24}$ aryl), substituted $(C_5-C_{24}$ aryl), unsubstituted saturated N-heterocycle, substituted saturated N-heterocycle, $-NH(C_1-C_{24}$ alkyl), $-N(C_1-C_{24}$ alkyl$)_2$, $-NH(C_5-C_{24}$ aryl), $-N(C_5-C_{24}$ aryl$)_2$, $-N(C_1-C_{24}$ alkyl$)(C_5-C_{24}$ aryl) or $-N[(C_1-C_6$ alkylene$)(C_5-C_{24}$ aryl$)]_2$; generally $R^2$ is unsubstituted $(C_6$ aryl), unsubstituted saturated N-heterocycle, substituted saturated N-heterocycle, $-N(C_1-C_6$ alkyl$)_2$, $-N(C_1-C_6$ alkyl$)(C_6$ aryl) or $-N[(C_1-C_3$ alkylene$)(C_6$ aryl$)]_2$;

$R^3$ is unsubstituted $(C_5-C_{24}$ aryl), substituted $(C_5-C_{24}$ aryl), unsubstituted saturated N-heterocycle or substituted saturated N-heterocycle; generally $R^3$ is unsubstituted $(C_6$ aryl) or substituted saturated N-heterocycle;

Y is $CR^4$ or N; generally Y is N;

$R^4$ is hydrogen, unsubstituted $(C_1-C_{12}$ alkyl), or substituted $(C_1-C_{12}$ alkyl);

$R^5$ and $R^6$ are independently hydrogen, unsubstituted $(C_5-C_{24}$ aryl), or substituted $(C_5-C_{24}$ aryl); generally $R^5$ and $R^6$ are independently substituted $(C_5-C_{24}$ aryl);

Q is a two-atom linkage represented by structures $-[CR^7R^8]_s-[CR^9R^{10}]_t-$ or $-[CR^{11}=CR^{12}]-$;

$R^7$, $R^8$, $R^9$ and $R^{10}$ are independently hydrogen, unsubstituted $(C_1-C_{24}$ alkyl), substituted $(C_1-C_{24}$ alkyl), unsubstituted $(C_5-C_{24}$ aryl), or substituted $(C_1-C_{24}$ aryl); or any two of $R^7$, $R^8$, $R^9$ and $R^{10}$ are optionally linked together to form a substituted or unsubstituted, saturated or unsaturated ring structure; generally $R^7$, $R^8$, $R^9$ and $R^{10}$ are independently hydrogen, unsubstituted $(C_1-C_{12}$ alkyl), substituted $(C_1-C_{12}$ alkyl), unsubstituted $(C_5-C_{14}$ aryl) or substituted $(C_5-C_{14}$ aryl);

$R^{11}$ and $R^{12}$ are independently hydrogen, unsubstituted $(C_1-C_{24}$ alkyl), substituted $(C_1-C_{24}$ alkyl), unsubstituted $(C_5-C_{24}$ aryl), or substituted $(C_5-C_{24}$ aryl); or $R^{11}$ and $R^{12}$ are optionally linked together to form a substituted or unsubstituted, saturated or unsaturated ring structure; and "s" and "t" are independently 1 or 2; generally "s" and "t" are independently 1.

In another embodiment, the invention provides an olefin metathesis catalyst, represented by the structure of Formula (VIII):

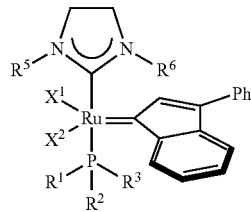

Formula (VIII)

wherein:

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F;

$R^1$ is unsubstituted saturated N-heterocycle, substituted saturated N-heterocycle, $-NH(C_1-C_{24}$ alkyl), $-N(C_1-C_{24}$ alkyl$)_2$, $-NH(C_5-C_{24}$ aryl), $-N(C_5-C_{24}$ aryl$)_2$, $-N(C_1-C_{24}$ alkyl$)(C_5-C_{24}$ aryl) or $-N[(C_1-C_6$ alkylene$)(C_5-C_{24}$ aryl$)]_2$; generally $R^1$ is unsubstituted saturated N-heterocycle, substituted saturated N-heterocycle, $-N(C_1-C_6$ alkyl$)_2$, $-N(C_1-C_6$ alkyl$)(C_6$ aryl) or $-N[(C_1-C_3$ alkylene$)(C_6$ aryl$)]_2$;

$R^2$ is unsubstituted $(C_5-C_{24}$ aryl), substituted $(C_5-C_{24}$ aryl), unsubstituted saturated N-heterocycle, substituted saturated N-heterocycle, $-NH(C_1-C_{24}$ alkyl), $-N(C_1-C_{24}$ alkyl$)_2$, $-NH(C_5-C_{24}$ aryl), $-N(C_5-C_{24}$ aryl$)_2$, $-N(C_1-C_{24}$ alkyl$)(C_5-C_{24}$ aryl) or $-N[(C_1-C_6$ alkylene$)(C_5-C_{24}$ aryl$)]_2$; generally $R^2$ is unsubstituted $(C_6$ aryl), unsubstituted saturated N-heterocycle, substituted saturated N-heterocycle, $-N(C_1-C_6$ alkyl$)_2$, $-N(C_1-C_6$ alkyl$)(C_6$ aryl) or $-N[(C_1-C_3$ alkylene$)(C_6$ aryl$)]_2$;

$R^3$ is unsubstituted $(C_5-C_{24}$ aryl), substituted $(C_5-C_{24}$ aryl), unsubstituted saturated N-heterocycle or substituted saturated N-heterocycle; generally $R^3$ is unsubstituted $(C_6$ aryl) or unsubstituted saturated N-heterocycle; and $R^5$ and $R^6$ are independently hydrogen, unsubstituted $C_5-C_{24}$ aryl, or substituted $C_5-C_{24}$ aryl; generally $R^5$ and $R^6$ are independently substituted $C_5-C_{24}$ aryl with one to three unsubstituted $(C_1-C_6$ alkyl) groups or substituted $(C_1-C_6$ alkyl) groups.

In another embodiment, the invention provides an olefin metathesis catalyst, represented by the structure of Formula (VIII), wherein $X^1$ is Cl; $X^2$ is Cl; $R^1$ is morpholino, thiomorpholino, 1-methyl-piperazino, piperidino, N-acetyl-piperazino, di-benzyl-amino, N-ethylcarboxylate-piperazino, diethylamino, methyl-phenylamino, or di-iso-propylamino; $R^2$ is phenyl, morpholino, thiomorpholino, 1-methyl-piperazino, piperidino, N-acetyl-piperazino, di-benzyl-amino, N-ethylcarboxylate-piperazino, diethylamino, methyl-phenylamino, or di-iso-propylamino; $R^3$ is phenyl or morpholino; and $R^5$ and $R^6$ are independently 2,4,6-trimethyl-phenyl (e.g., mesityl or Mes), 2,6-di-iso-propylphenyl (e.g., DIPP or DiPP), 2-iso-propylphenyl (e.g., IPP or Ipp), or 2-methyl-6-iso-propylphenyl (e.g., MIPP or Mipp or MiPP).

Some of the olefin metathesis catalysts represented by the structure of Formula (VIII) were obtained as solvates.

In one embodiment, the invention provides an olefin metathesis catalyst, represented by the structure of Formula (IVa):

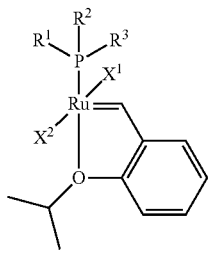

Formula (IVa)

wherein:

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F;

$R^1$ is unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^1$ is unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^2$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^2$ is unsubstituted ($C_6$ aryl), unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$; and $R^3$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^3$ is unsubstituted ($C_6$ aryl) or unsubstituted saturated N-heterocycle.

In another embodiment, the invention provides an olefin metathesis catalyst, represented by the structure of Formula (IVa), wherein $X^1$ is Cl; $X^2$ is Cl; $R^1$ is morpholino, thiomorpholino, 1-methyl-piperazino, piperidino, N-acetyl-piperazino, di-benzyl-amino, N-ethylcarboxylate-piperazino, diethylamino, methyl-phenylamino, or di-iso-propylamino; $R^2$ is phenyl, morpholino, thiomorpholino, 1-methyl-piperazino, piperidino, N-acetyl-piperazino, di-benzyl-amino, N-ethylcarboxylate-piperazino, diethylamino, methyl-phenylamino, or di-iso-propylamino; and $R^3$ is phenyl or morpholino.

In another embodiment, the invention provides an olefin metathesis catalyst, represented by the structure of Formula (IX):

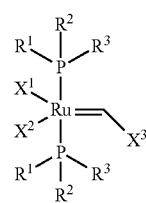

Formula (IX)

wherein:

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F;

$X^3$ is phenyl or 2-methyl-1-propenyl;

$R^1$ is unsubstituted saturated N-heterocycle, substituted saturated N-heterocycle, unsubstituted unsaturated N-heterocycle, substituted unsaturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl), —N[($C_1$-$C_6$ alkylene)($C_5$-$C_{24}$ aryl)]$_2$, or —O—($C_1$-$C_{12}$ alkyl); generally $R^1$ is unsubstituted saturated N-heterocycle, substituted saturated N-heterocycle, —O—($C_1$-$C_{12}$ alkyl), or unsubstituted unsaturated N-heterocycle;

$R^2$ is unsubstituted ($C_5$-$C_{24}$ cycloalkyl), substituted ($C_5$-$C_{24}$ cycloalkyl), unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^2$ is unsubstituted ($C_5$-$C_{24}$ cycloalkyl), unsubstituted ($C_6$ aryl), unsubstituted saturated N-heterocycle; and $R^3$ is unsubstituted ($C_5$-$C_{24}$ cycloalkyl), substituted ($C_5$-$C_{24}$ cycloalkyl), unsubstituted ($C_5$-$C_{24}$ aryl), substituted ($C_5$-$C_{24}$ aryl), unsubstituted saturated N-heterocycle or substituted saturated N-heterocycle; generally $R^3$ is unsubstituted ($C_5$-$C_{24}$ cycloalkyl), unsubstituted ($C_6$ aryl) or unsubstituted saturated N-heterocycle.

In another embodiment, the invention provides an olefin metathesis catalyst, represented by the structure of Formula (IX), wherein $X^1$ is Cl; $X^2$ is Cl; $X^3$ is phenyl; $R^1$ is morpholino, iso-propoxyl, pyrrolo; $R^2$ is cyclohexyl, phenyl or morpholino; and $R^3$ is cyclohexyl, phenyl or morpholino.

In another embodiment, the invention provides an olefin metathesis catalyst, represented by the structure of Formula (IX), wherein $X^1$ is Cl; $X^2$ is Cl; $X^3$ is 2-methyl-1-propenyl; $R^1$ is morpholino, iso-propoxyl, pyrrolo; $R^2$ is cyclohexyl, phenyl or morpholino; and $R^3$ is cyclohexyl, phenyl or morpholino.

In another embodiment, the invention provides an olefin metathesis catalyst, represented by the structure of Formula (X):

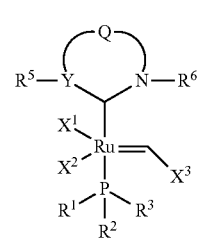

Formula (X)

wherein:

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F; $X^3$ is phenyl or 2-methyl-1-propenyl;

$R^1$ is unsubstituted saturated N-heterocycle, substituted saturated N-heterocycle, unsubstituted unsaturated N-heterocycle, substituted unsaturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl), —N[($C_1$-$C_6$ alkylene)($C_5$-$C_{24}$ aryl)]$_2$, or —O—($C_1$-$C_{12}$ alkyl); generally $R^1$ is unsubstituted saturated N-heterocycle, substituted saturated N-heterocycle, —O—($C_1$-$C_{12}$ alkyl), —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^2$ is unsubstituted ($C_5$-$C_{24}$ cycloalkyl), substituted ($C_5$-$C_{24}$ cycloalkyl), unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^2$ is unsubstituted ($C_5$-$C_{24}$ cycloalkyl), unsubstituted ($C_6$ aryl), unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^3$ is unsubstituted ($C_5$-$C_{24}$ cycloalkyl), substituted ($C_5$-$C_{24}$ cycloalkyl), unsubstituted ($C_5$-$C_{24}$ aryl), substituted ($C_5$-$C_{24}$ aryl), unsubstituted saturated N-heterocycle or substituted saturated N-heterocycle; generally $R^3$ is unsubstituted ($C_5$-$C_{24}$ cycloalkyl), unsubstituted ($C_6$ aryl) or unsubstituted saturated N-heterocycle;

Y is $CR^4$ or N; generally Y is N;

$R^4$ is hydrogen, unsubstituted ($C_1$-$C_{12}$ alkyl), or substituted ($C_1$-$C_{12}$ alkyl);

$R^5$ and $R^6$ are independently hydrogen, unsubstituted ($C_5$-$C_{24}$ aryl), or substituted ($C_5$-$C_{24}$ aryl); generally $R^5$ and $R^6$ are independently substituted ($C_5$-$C_{24}$ aryl);

Q is a two-atom linkage represented by structures —[$CR^7R^8$]$_s$—[$CR^9R^{10}$]$_t$— or —[$CR^{11}$=$CR^{12}$]—;

$R^7$, $R^8$, $R^9$ and $R^{10}$ are independently hydrogen, unsubstituted ($C_1$-$C_{24}$ alkyl), substituted ($C_1$-$C_{24}$ alkyl), unsubstituted ($C_5$-$C_{24}$ aryl), or substituted ($C_1$-$C_{24}$ aryl); or any two of $R^7$, $R^8$, $R^9$ and $R^{10}$ are optionally linked together to form a substituted or unsubstituted, saturated or unsaturated ring structure; generally $R^7$, $R^8$, $R^9$ and $R^{10}$ are independently hydrogen, unsubstituted ($C_1$-$C_{12}$ alkyl), substituted ($C_1$-$C_{12}$ alkyl), unsubstituted ($C_5$-$C_{14}$ aryl) or substituted ($C_5$-$C_{14}$ aryl);

$R^{11}$ and $R^{12}$ are independently hydrogen, unsubstituted ($C_1$-$C_{24}$ alkyl), substituted ($C_1$-$C_{24}$ alkyl), unsubstituted ($C_5$-$C_{24}$ aryl), or substituted ($C_5$-$C_{24}$ aryl); or $R^{11}$ and $R^{12}$ are optionally linked together to form a substituted or unsubstituted, saturated or unsaturated ring structure; and "s" and "t" are independently 1 or 2; generally "s" and "t" are independently 1.

In one embodiment, the invention provides olefin metathesis catalysts, represented by the structure of Formula (XI), wherein:

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F; $X^3$ is phenyl or 2-methyl-1-propenyl;

$R^1$ is unsubstituted saturated N-heterocycle, substituted saturated N-heterocycle, unsubstituted unsaturated N-heterocycle, substituted unsaturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl), —N[($C_1$-$C_6$ alkylene)($C_5$-$C_{24}$ aryl)]$_2$, or —O—($C_1$-$C_{12}$ alkyl); generally $R^1$ is unsubstituted saturated N-heterocycle, unsubstituted unsaturated N-heterocycle, —O—($C_1$-$C_{12}$ alkyl);

$R^2$ is unsubstituted ($C_5$-$C_{24}$ cycloalkyl), substituted ($C_5$-$C_{24}$ cycloalkyl), unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^2$ is unsubstituted ($C_5$-$C_{24}$ cycloalkyl), unsubstituted ($C_6$ aryl), unsubstituted saturated N-heterocycle;

$R^3$ is unsubstituted ($C_5$-$C_{24}$ cycloalkyl), substituted ($C_5$-$C_{24}$ cycloalkyl), unsubstituted ($C_5$-$C_{24}$ aryl), substituted ($C_5$-$C_{24}$ aryl), unsubstituted saturated N-heterocycle or substituted saturated N-heterocycle; generally $R^3$ is unsubstituted ($C_5$-$C_{24}$ cycloalkyl), unsubstituted ($C_6$ aryl) or unsubstituted saturated N-heterocycle; and $R^5$ and $R^6$ are independently unsubstituted ($C_5$-$C_{24}$ aryl), or substituted ($C_5$-$C_{24}$ aryl); generally $R^5$ and $R^6$ are independently substituted ($C_5$-$C_{24}$ aryl) with one to three unsubstituted ($C_1$-$C_6$ alkyl) groups or substituted ($C_1$-$C_6$ alkyl) groups.

In another embodiment, the invention provides an olefin metathesis catalyst, represented by the structure of Formula (XI), wherein $X^1$ is Cl; $X^2$ is Cl; $X^3$ is phenyl; $R^1$ is morpholino, isopropoxy, pyrrolo or piperidino; $R^2$ is cyclohexyl, morpholino, piperidino or phenyl; $R^3$ is phenyl, morpholino, piperidino or cyclohexyl; and $R^5$ and $R^6$ are independently 2,4,6-trimethyl-phenyl, 2,6-di-iso-propylphenyl, 2-iso-propylphenyl, or 2-methyl-6-iso-propylphenyl.

In another embodiment, the invention provides an olefin metathesis catalyst, represented by the structure of Formula (XI), wherein $X^1$ is Cl; $X^2$ is Cl; $X^3$ is 2-methyl-1-propenyl; $R^1$ is morpholino, isopropoxy, pyrrolo or piperidino; $R^2$ is cyclohexyl, morpholino, piperidino or phenyl; $R^3$ is phenyl, morpholino, piperidino or cyclohexyl; and $R^5$ and $R^6$ are independently 2,4,6-trimethyl-phenyl, 2,6-di-iso-propylphenyl, 2-iso-propylphenyl, or 2-methyl-6-iso-propylphenyl.

Non-limiting examples of olefin metathesis catalysts represented by the structure of Formula (VI) are found in Table (1):

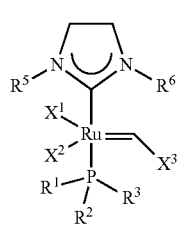

Formula (XI)

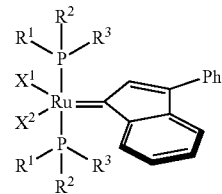

Formula (VI)

TABLE (1)

Non-limiting examples of olefin metathesis catalysts represented by Formula (VI)

| Catalyst | R¹ | R² | R³ | X¹ | X² |
|---|---|---|---|---|---|
| 1 | morpholinyl (N-linked, with O) | phenyl | phenyl | Cl | Cl |
| 2 | morpholinyl | morpholinyl | phenyl | Cl | Cl |
| 3 | morpholinyl | morpholinyl | morpholinyl | Cl | Cl |
| 4 | N(CH₂Ph)₂ | phenyl | phenyl | Cl | Cl |
| 5 | N(CH₂Ph)₂ | N(CH₂Ph)₂ | phenyl | Cl | Cl |
| 6 | N(iPr)₂ | phenyl | phenyl | Cl | Cl |
| 7 | N(iPr)₂ | N(iPr)₂ | phenyl | Cl | Cl |
| 8 | thiomorpholinyl (N-linked, with S) | phenyl | phenyl | Cl | Cl |
| 9 | thiomorpholinyl | thiomorpholinyl | phenyl | Cl | Cl |
| 10 | 4-methylpiperazinyl | phenyl | phenyl | Cl | Cl |

TABLE (1)-continued
Non-limiting examples of olefin metathesis catalysts represented by Formula (VI)
| Catalyst | R¹ | R² | R³ | X¹ | X² |
|---|---|---|---|---|---|
| 11 | 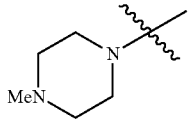 | 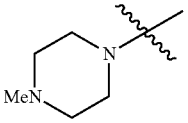 [SMILES: *N1CCN(C)CC1] | 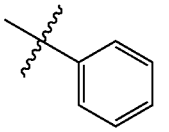 | Cl | Cl |
| 12 | 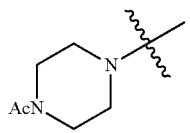 | 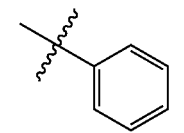 [SMILES: *c1ccccc1] | 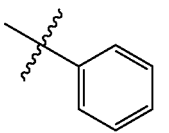 | Cl | Cl |
| 13 | 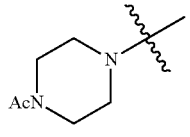 | 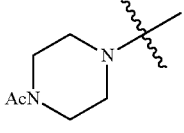 | 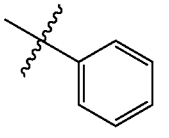 | Cl | Cl |
| 14 | 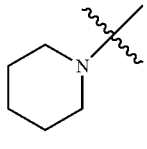 [SMILES: *N1CCCCC1] | 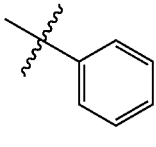 [SMILES: *c1ccccc1] | 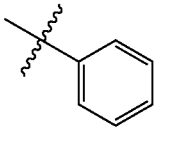 | Cl | Cl |
| 15 | 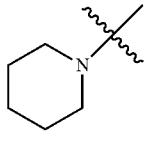 [SMILES: *N1CCCCC1] | 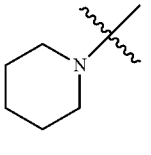 [SMILES: *N1CCCCC1] | 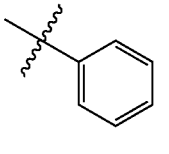 | Cl | Cl |
| 16 | 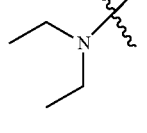 | 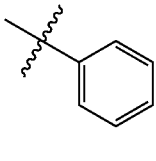 [SMILES: *c1ccccc1] | 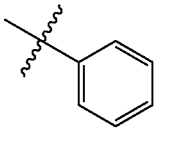 [SMILES: *c1ccccc1] | Cl | Cl |
| 17 | 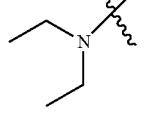 | 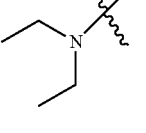 | 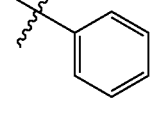 | Cl | Cl |
| 18 | 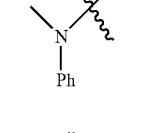 | 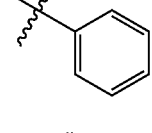 | 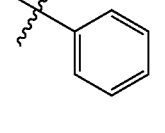 | Cl | Cl |
| 19 | 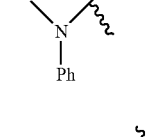 | 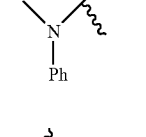 | 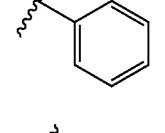 | Cl | Cl |
| 20 | 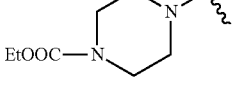 | 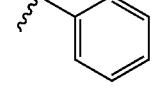 | 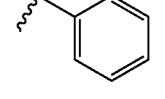 | Cl | Cl |

TABLE (1)-continued

Non-limiting examples of olefin metathesis catalysts represented by Formula (VI)

| Catalyst | R¹ | R² | R³ | X¹ | X² |
|---|---|---|---|---|---|
| 21 | 4-(ethoxycarbonyl)piperazin-1-yl | 4-(ethoxycarbonyl)piperazin-1-yl | phenyl | Cl | Cl |

Non-limiting examples of olefin metathesis catalysts represented by the structure of Formula (VIII) are found in Table (2):

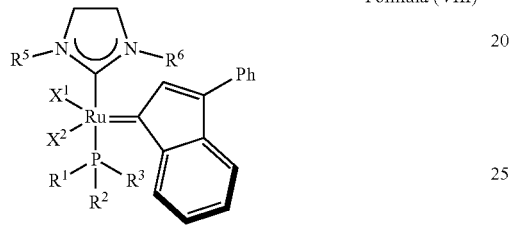

Formula (VIII)

TABLE 2

Non-limiting examples of olefin metathesis catalysts represented by Formula (VIII)

| Catalyst | R¹ | R² | R³ | X¹ | X² | R⁵ | R⁶ |
|---|---|---|---|---|---|---|---|
| 22 | morpholin-4-yl | phenyl | phenyl | Cl | Cl | Mes | Mes |
| 23 | morpholin-4-yl | morpholin-4-yl | phenyl | Cl | Cl | Mes | Mes |
| 24 | morpholin-4-yl | morpholin-4-yl | morpholin-4-yl | Cl | Cl | Mes | Mes |
| 25 | 4-methylpiperazin-1-yl | phenyl | phenyl | Cl | Cl | Mes | Mes |
| 26 | 4-methylpiperazin-1-yl | 4-methylpiperazin-1-yl | phenyl | Cl | Cl | Mes | Mes |

TABLE 2-continued

Non-limiting examples of olefin metathesis catalysts represented by Formula (VIII)

| Catalyst | R¹ | R² | R³ | X¹ | X² | R⁵ | R⁶ |
|---|---|---|---|---|---|---|---|
| 27 | piperidinyl | phenyl | phenyl | Cl | Cl | Mes | Mes |
| 28 | piperidinyl | piperidinyl | phenyl | Cl | Cl | Mes | Mes |
| 29 | N(Me)(Ph) | phenyl | phenyl | Cl | Cl | Mes | Mes |
| 30 | N(Me)(Ph) | N(Me)(Ph) | phenyl | Cl | Cl | Mes | Mes |
| 31 | N(iPr)₂ | phenyl | phenyl | Cl | Cl | Mes | Mes |
| 32 | N(iPr)₂ | N(iPr)₂ | phenyl | Cl | Cl | Mes | Mes |
| 33 | N(CH₂Ph)₂ | phenyl | phenyl | Cl | Cl | Mes | Mes |
| 34 | N(CH₂Ph)₂ | N(CH₂Ph)₂ | phenyl | Cl | Cl | Mes | Mes |
| 35 | N(Et)₂ | phenyl | phenyl | Cl | Cl | Mes | Mes |
| 36 | N(Et)₂ | N(Et)₂ | phenyl | Cl | Cl | Mes | Mes |

TABLE 2-continued

Non-limiting examples of olefin metathesis catalysts represented by Formula (VIII)

| Catalyst | R¹ | R² | R³ | X¹ | X² | R⁵ | R⁶ |
|---|---|---|---|---|---|---|---|
| 37 | thiomorpholinyl | phenyl | phenyl | Cl | Cl | Mes | Mes |
| 38 | thiomorpholinyl | thiomorpholinyl | phenyl | Cl | Cl | Mes | Mes |
| 39 | 4-acetylpiperazinyl | phenyl | phenyl | Cl | Cl | Mes | Mes |
| 40 | 4-acetylpiperazinyl | 4-acetylpiperazinyl | phenyl | Cl | Cl | Mes | Mes |
| 41 | 4-(ethoxycarbonyl)piperazinyl | phenyl | phenyl | Cl | Cl | Mes | Mes |
| 42 | 4-(ethoxycarbonyl)piperazinyl | 4-(ethoxycarbonyl)piperazinyl | phenyl | Cl | Cl | Mes | Mes |
| 43 | morpholinyl | phenyl | phenyl | Cl | Cl | DIPP | DIPP |
| 44 | morpholinyl | morpholinyl | phenyl | Cl | Cl | DIPP | DIPP |
| 45 | morpholinyl | morpholinyl | morpholinyl | Cl | Cl | DIPP | DIPP |
| 46 | 4-methylpiperazinyl | phenyl | phenyl | Cl | Cl | DIPP | DIPP |

TABLE 2-continued
Non-limiting examples of olefin metathesis catalysts represented by Formula (VIII)
| Catalyst | R¹ | R² | R³ | X¹ | X² | R⁵ | R⁶ |
|---|---|---|---|---|---|---|---|
| 47 | 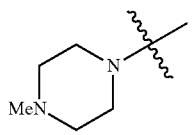 | 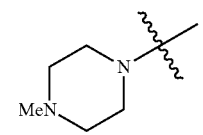 [SMILES: *N1CCN(C)CC1] | 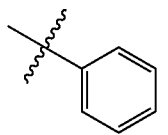 [SMILES: *c1ccccc1] | Cl | Cl | DIPP | DIPP |
| 48 | 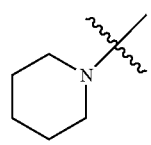 | 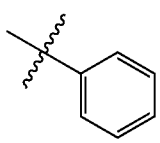 [SMILES: *c1ccccc1] | 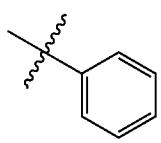 [SMILES: *c1ccccc1] | Cl | Cl | DIPP | DIPP |
| 49 | 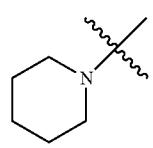 | 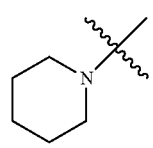 | 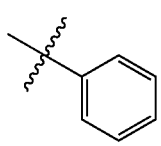 [SMILES: *c1ccccc1] | Cl | Cl | DIPP | DIPP |
| 50 | 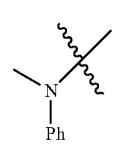 | 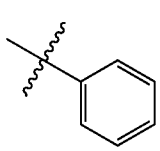 | 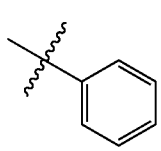 [SMILES: *c1ccccc1] | Cl | Cl | DIPP | DIPP |
| 51 | 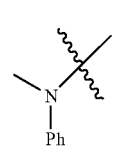 | 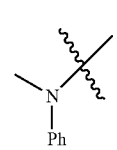 | 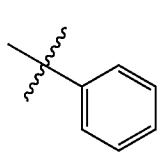 [SMILES: *c1ccccc1] | Cl | Cl | DIPP | DIPP |
| 52 | 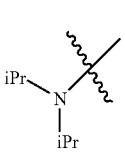 | 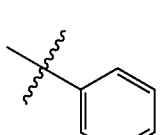 | 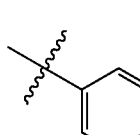 | Cl | Cl | DIPP | DIPP |
| 53 | 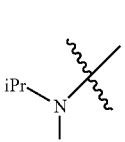 | 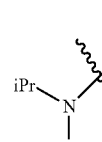 | 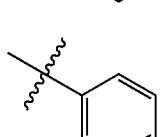 | Cl | Cl | DIPP | DIPP |
| 54 | 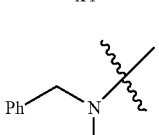 | 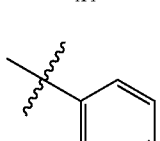 | 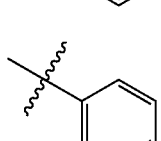 | Cl | Cl | DIPP | DIPP |
| 55 | 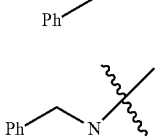 | 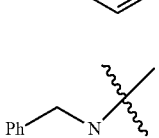 | 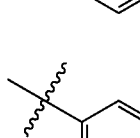 | Cl | Cl | DIPP | DIPP |
| 56 | 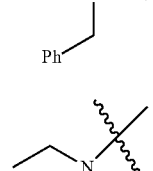 | 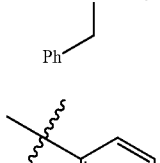 | 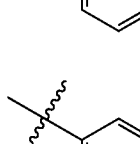 | Cl | Cl | DIPP | DIPP |

TABLE 2-continued

Non-limiting examples of olefin metathesis catalysts represented by Formula (VIII)

| Catalyst | R¹ | R² | R³ | X¹ | X² | R⁵ | R⁶ |
|---|---|---|---|---|---|---|---|
| 57 | NEt₂ | NEt₂ | Ph | Cl | Cl | DIPP | DIPP |
| 58 | thiomorpholinyl | Ph | Ph | Cl | Cl | DIPP | DIPP |
| 59 | thiomorpholinyl | thiomorpholinyl | Ph | Cl | Cl | DIPP | DIPP |
| 60 | N-acetylpiperazinyl | Ph | Ph | Cl | Cl | DIPP | DIPP |
| 61 | N-acetylpiperazinyl | N-acetylpiperazinyl | Ph | Cl | Cl | DIPP | DIPP |
| 62 | N-(ethoxycarbonyl)piperazinyl | Ph | Ph | Cl | Cl | DIPP | DIPP |
| 63 | N-(ethoxycarbonyl)piperazinyl | N-(ethoxycarbonyl)piperazinyl | Ph | Cl | Cl | DIPP | DIPP |
| 64 | morpholinyl | Ph | Ph | Cl | Cl | MIPP | MIPP |
| 65 | morpholinyl | morpholinyl | Ph | Cl | Cl | MIPP | MIPP |
| 66 | morpholinyl | morpholinyl | morpholinyl | Cl | Cl | MIPP | MIPP |

TABLE 2-continued

Non-limiting examples of olefin metathesis catalysts represented by Formula (VIII)

| Catalyst | R¹ | R² | R³ | X¹ | X² | R⁵ | R⁶ |
|---|---|---|---|---|---|---|---|
| 67 | 4-methylpiperazin-1-yl | phenyl | phenyl | Cl | Cl | MIPP | MIPP |
| 68 | 4-methylpiperazin-1-yl | 4-methylpiperazin-1-yl | phenyl | Cl | Cl | MIPP | MIPP |
| 69 | piperidin-1-yl | phenyl | phenyl | Cl | Cl | MIPP | MIPP |
| 70 | piperidin-1-yl | piperidin-1-yl | phenyl | Cl | Cl | MIPP | MIPP |
| 71 | N(Me)(Ph) | phenyl | phenyl | Cl | Cl | MIPP | MIPP |
| 72 | N(Me)(Ph) | N(Me)(Ph) | phenyl | Cl | Cl | MIPP | MIPP |
| 73 | N(iPr)₂ | phenyl | phenyl | Cl | Cl | MIPP | MIPP |
| 74 | N(iPr)₂ | N(iPr)₂ | phenyl | Cl | Cl | MIPP | MIPP |
| 75 | N(CH₂Ph)₂ | phenyl | phenyl | Cl | Cl | MIPP | MIPP |
| 76 | N(CH₂Ph)₂ | N(CH₂Ph)₂ | phenyl | Cl | Cl | MIPP | MIPP |

TABLE 2-continued

Non-limiting examples of olefin metathesis catalysts represented by Formula (VIII)

| Catalyst | $R^1$ | $R^2$ | $R^3$ | $X^1$ | $X^2$ | $R^5$ | $R^6$ |
|---|---|---|---|---|---|---|---|
| 77 | Et2N– | Ph | Ph | Cl | Cl | MIPP | MIPP |
| 78 | Et2N– | Et2N– | Ph | Cl | Cl | MIPP | MIPP |
| 79 | thiomorpholinyl | Ph | Ph | Cl | Cl | MIPP | MIPP |
| 80 | thiomorpholinyl | thiomorpholinyl | Ph | Cl | Cl | MIPP | MIPP |
| 81 | AcN-piperazinyl | Ph | Ph | Cl | Cl | MIPP | MIPP |
| 82 | AcN-piperazinyl | AcN-piperazinyl | Ph | Cl | Cl | MIPP | MIPP |
| 83 | EtOOC-N-piperazinyl | Ph | Ph | Cl | Cl | MIPP | MIPP |
| 84 | EtOOC-N-piperazinyl | EtOOC-N-piperazinyl | Ph | Cl | Cl | MIPP | MIPP | wherein: Mes is ,

MIPP is , and DIPP is 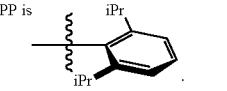.

Non-limiting examples of olefin metathesis catalysts represented by the structure of Formula (IVa) are found in Table (3):

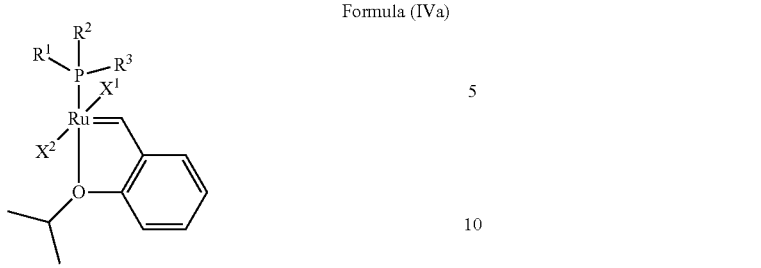

Formula (IVa)

TABLE 3

Non-limiting examples of olefin metathesis catalysts represented by the structure of Formula (IVa)

| Catalyst | R¹ | R² | R³ | X¹ | X² |
|---|---|---|---|---|---|
| 85 | morpholinyl | phenyl | phenyl | Cl | Cl |
| 86 | morpholinyl | morpholinyl | phenyl | Cl | Cl |
| 87 | morpholinyl | morpholinyl | morpholinyl | Cl | Cl |
| 88 | 4-methylpiperazinyl | phenyl | phenyl | Cl | Cl |
| 89 | 4-methylpiperazinyl | 4-methylpiperazinyl | phenyl | Cl | Cl |
| 90 | piperidinyl | phenyl | phenyl | Cl | Cl |
| 91 | piperidinyl | piperidinyl | phenyl | Cl | Cl |
| 92 | N(Me)(Ph) | phenyl | phenyl | Cl | Cl |

TABLE 3-continued
Non-limiting examples of olefin metathesis catalysts represented by the structure of Formula (IVa)
| Catalyst | R¹ | R² | R³ | X¹ | X² |
|---|---|---|---|---|---|
| 93 | 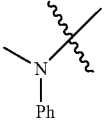 | 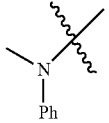 | 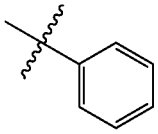 [SMILES: *c1ccccc1] | Cl | Cl |
| 94 | 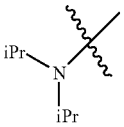 | 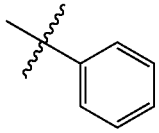 [SMILES: *c1ccccc1] | 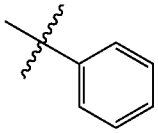 [SMILES: *c1ccccc1] | Cl | Cl |
| 95 | 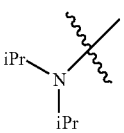 | 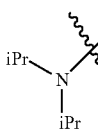 | 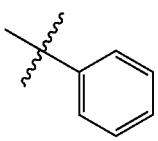 [SMILES: *c1ccccc1] | Cl | Cl |
| 96 | 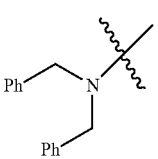 [SMILES: *N(Cc1ccccc1)Cc1ccccc1] | 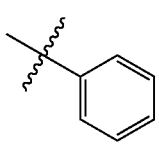 [SMILES: *c1ccccc1] | 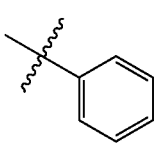 [SMILES: *c1ccccc1] | Cl | Cl |
| 97 | 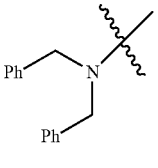 [SMILES: *N(Cc1ccccc1)Cc1ccccc1] | 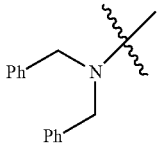 | 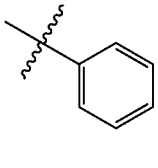 [SMILES: *c1ccccc1] | Cl | Cl |
| 98 | 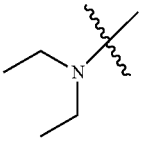 [SMILES: *N(CC)CC] | 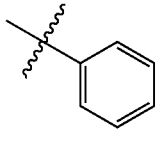 [SMILES: *c1ccccc1] | 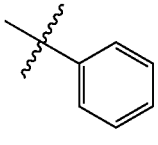 [SMILES: *c1ccccc1] | Cl | Cl |
| 99 | 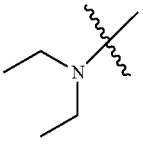 | 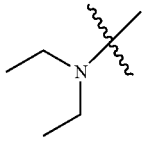 [SMILES: *N(CC)CC] | 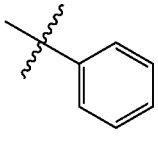 [SMILES: *c1ccccc1] | Cl | Cl |
| 100 | 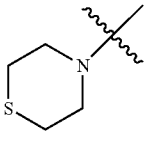 | 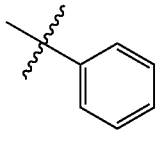 [SMILES: *c1ccccc1] | 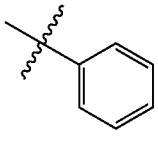 [SMILES: *c1ccccc1] | Cl | Cl |
| 101 | 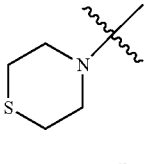 | 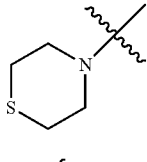 | 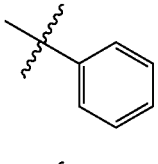 | Cl | Cl |
| 102 | 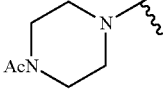 | 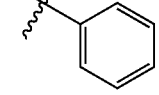 | 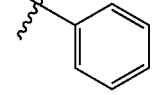 | Cl | Cl |

TABLE 3-continued

Non-limiting examples of olefin metathesis catalysts represented by the structure of Formula (IVa)

| Catalyst | R¹ | R² | R³ | X¹ | X² |
|---|---|---|---|---|---|
| 103 | AcN-piperazinyl | AcN-piperazinyl | phenyl | Cl | Cl |
| 104 | EtOOC-N-piperazinyl | phenyl | phenyl | Cl | Cl |
| 105 | EtOOC-N-piperazinyl | EtOOC-N-piperazinyl | phenyl | Cl | Cl |

Non-limiting examples of olefin metathesis catalysts represented by the structure of Formula (IX) are found in Table (4):

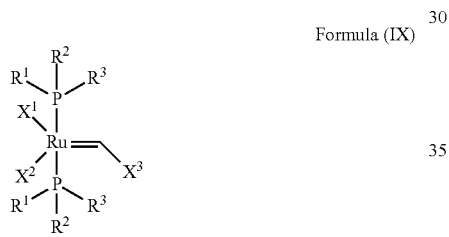

Formula (IX)

TABLE 4

Non-limiting examples of olefin metathesis catalysts represented by the structure of Formula (IX)

| Catalyst | R¹ | R² | R³ | X¹ | X² | X³ |
|---|---|---|---|---|---|---|
| 106 | morpholinyl | phenyl | phenyl | Cl | Cl | phenyl |
| 107 | morpholinyl | morpholinyl | phenyl | Cl | Cl | phenyl |
| 108 | morpholinyl | morpholinyl | morpholinyl | Cl | Cl | phenyl |

TABLE 4-continued

Non-limiting examples of olefin metathesis catalysts represented by the structure of Formula (IX)

| Catalyst | R¹ | R² | R³ | X¹ | X² | X³ |
|---|---|---|---|---|---|---|
| 109 | morpholinyl (N-linked) | cyclohexyl | cyclohexyl | Cl | Cl | phenyl |
| 110 | morpholinyl (N-linked) | morpholinyl (N-linked) | cyclohexyl | Cl | Cl | phenyl |
| 111 | isopropoxy | cyclohexyl | cyclohexyl | Cl | Cl | phenyl |
| 112 | pyrrolyl (N-linked) | cyclohexyl | cyclohexyl | Cl | Cl | phenyl |
| 113 | morpholinyl (N-linked) | phenyl | phenyl | Cl | Cl | 2-methylprop-1-en-1-yl |
| 114 | morpholinyl (N-linked) | morpholinyl (N-linked) | phenyl | Cl | Cl | 2-methylprop-1-en-1-yl |
| 115 | morpholinyl (N-linked) | morpholinyl (N-linked) | morpholinyl (N-linked) | Cl | Cl | 2-methylprop-1-en-1-yl |
| 116 | morpholinyl (N-linked) | cyclohexyl | cyclohexyl | Cl | Cl | 2-methylprop-1-en-1-yl |
| 117 | morpholinyl (N-linked) | morpholinyl (N-linked) | cyclohexyl | Cl | Cl | 2-methylprop-1-en-1-yl |
| 118 | isopropoxy | cyclohexyl | cyclohexyl | Cl | Cl | 2-methylprop-1-en-1-yl |

TABLE 4-continued

Non-limiting examples of olefin metathesis catalysts represented by the structure of Formula (IX)

| Catalyst | R¹ | R² | R³ | X¹ | X² | X³ |
|---|---|---|---|---|---|---|
| 119 | pyrrolyl | cyclohexyl | cyclohexyl | Cl | Cl | 2-methylpropenyl |

Non-limiting examples of olefin metathesis catalysts represented by the structure of Formula (IX) are found in Table (5):

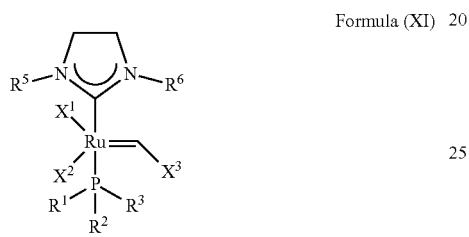

Formula (XI)

TABLE 5

Non-limiting examples of olefin metathesis catalysts represented by the structure of Formula (XI)

| Catalyst | R¹ | R² | R³ | X¹ | X² | X³ | R⁵ | R⁶ |
|---|---|---|---|---|---|---|---|---|
| 120 | morpholinyl | phenyl | phenyl | Cl | Cl | phenyl | Mes | Mes |
| 121 | morpholinyl | morpholinyl | phenyl | Cl | Cl | phenyl | Mes | Mes |
| 122 | morpholinyl | morpholinyl | morpholinyl | Cl | Cl | phenyl | Mes | Mes |
| 123 | morpholinyl | cyclohexyl | cyclohexyl | Cl | Cl | phenyl | Mes | Mes |
| 124 | morpholinyl | morpholinyl | cyclohexyl | Cl | Cl | phenyl | Mes | Mes |

TABLE 5-continued

Non-limiting examples of olefin metathesis catalysts represented by the structure of Formula (XI)

| Catalyst | $R^1$ | $R^2$ | $R^3$ | $X^1$ | $X^2$ | $X^3$ | $R^5$ | $R^6$ |
|---|---|---|---|---|---|---|---|---|
| 125 | isopropoxy | cyclohexyl | cyclohexyl | Cl | Cl | phenyl | Mes | Mes |
| 126 | pyrrolyl | cyclohexyl | cyclohexyl | Cl | Cl | phenyl | Mes | Mes |
| 127 | piperidinyl | cyclohexyl | cyclohexyl | Cl | Cl | phenyl | Mes | Mes |
| 128 | piperidinyl | piperidinyl | cyclohexyl | Cl | Cl | phenyl | Mes | Mes |
| 129 | piperidinyl | piperidinyl | piperidinyl | Cl | Cl | phenyl | Mes | Mes |
| 130 | morpholinyl | phenyl | phenyl | Cl | Cl | 2-methylpropenyl | Mes | Mes |
| 131 | morpholinyl | morpholinyl | phenyl | Cl | Cl | 2-methylpropenyl | Mes | Mes |
| 132 | morpholinyl | morpholinyl | morpholinyl | Cl | Cl | 2-methylpropenyl | Mes | Mes |
| 133 | morpholinyl | cyclohexyl | cyclohexyl | Cl | Cl | 2-methylpropenyl | Mes | Mes |
| 134 | morpholinyl | morpholinyl | cyclohexyl | Cl | Cl | 2-methylpropenyl | Mes | Mes |

TABLE 5-continued

Non-limiting examples of olefin metathesis catalysts represented by the structure of Formula (XI)

| Catalyst | R¹ | R² | R³ | X¹ | X² | X³ | R⁵ | R⁶ |
|---|---|---|---|---|---|---|---|---|
| 135 | isopropoxy | cyclohexyl | cyclohexyl | Cl | Cl | 2-methylprop-1-enyl | Mes | Mes |
| 136 | pyrrol-1-yl | cyclohexyl | cyclohexyl | Cl | Cl | 2-methylprop-1-enyl | Mes | Mes |
| 137 | piperidin-1-yl | cyclohexyl | cyclohexyl | Cl | Cl | 2-methylprop-1-enyl | Mes | Mes |
| 138 | piperidin-1-yl | piperidin-1-yl | cyclohexyl | Cl | Cl | 2-methylprop-1-enyl | Mes | Mes |
| 139 | piperidin-1-yl | piperidin-1-yl | piperidin-1-yl | Cl | Cl | 2-methylprop-1-enyl | Mes | Mes |
| 140 | morpholin-4-yl | phenyl | phenyl | Cl | Cl | phenyl | DIPP | DIPP |
| 141 | morpholin-4-yl | morpholin-4-yl | phenyl | Cl | Cl | phenyl | DIPP | DIPP |
| 142 | morpholin-4-yl | morpholin-4-yl | morpholin-4-yl | Cl | Cl | phenyl | DIPP | DIPP |
| 143 | morpholin-4-yl | cyclohexyl | cyclohexyl | Cl | Cl | phenyl | DIPP | DIPP |
| 144 | morpholin-4-yl | morpholin-4-yl | cyclohexyl | Cl | Cl | phenyl | DIPP | DIPP |

TABLE 5-continued

Non-limiting examples of olefin metathesis catalysts represented by the structure of Formula (XI)

| Catalyst | R¹ | R² | R³ | X¹ | X² | X³ | R⁵ | R⁶ |
|---|---|---|---|---|---|---|---|---|
| 145 | isopropoxy | cyclohexyl | cyclohexyl | Cl | Cl | phenyl | DIPP | DIPP |
| 146 | pyrrolyl | cyclohexyl | cyclohexyl | Cl | Cl | phenyl | DIPP | DIPP |
| 147 | piperidinyl | cyclohexyl | cyclohexyl | Cl | Cl | phenyl | DIPP | DIPP |
| 148 | piperidinyl | piperidinyl | cyclohexyl | Cl | Cl | phenyl | DIPP | DIPP |
| 149 | piperidinyl | piperidinyl | piperidinyl | Cl | Cl | phenyl | DIPP | DIPP |
| 150 | morpholinyl | phenyl | phenyl | Cl | Cl | isobutenyl | DIPP | DIPP |
| 151 | morpholinyl | morpholinyl | phenyl | Cl | Cl | isobutenyl | DIPP | DIPP |
| 152 | morpholinyl | morpholinyl | morpholinyl | Cl | Cl | isobutenyl | DIPP | DIPP |
| 153 | morpholinyl | cyclohexyl | cyclohexyl | Cl | Cl | isobutenyl | DIPP | DIPP |
| 154 | morpholinyl | morpholinyl | cyclohexyl | Cl | Cl | isobutenyl | DIPP | DIPP |

TABLE 5-continued

Non-limiting examples of olefin metathesis catalysts represented by the structure of Formula (XI)

| Catalyst | R¹ | R² | R³ | X¹ | X² | X³ | R⁵ | R⁶ |
|---|---|---|---|---|---|---|---|---|
| 155 | O-iPr | cyclohexyl | cyclohexyl | Cl | Cl | isobutenyl | DIPP | DIPP |
| 156 | pyrrolyl | cyclohexyl | cyclohexyl | Cl | Cl | isobutenyl | DIPP | DIPP |
| 157 | piperidinyl | cyclohexyl | cyclohexyl | Cl | Cl | isobutenyl | DIPP | DIPP |
| 158 | piperidinyl | piperidinyl | cyclohexyl | Cl | Cl | isobutenyl | DIPP | DIPP |
| 158 | piperidinyl | piperidinyl | piperidinyl | Cl | Cl | isobutenyl | DIPP | DIPP |
| 159 | morpholinyl | phenyl | phenyl | Cl | Cl | phenyl | MIPP | MIPP |
| 160 | morpholinyl | morpholinyl | phenyl | Cl | Cl | phenyl | MIPP | MIPP |
| 161 | morpholinyl | morpholinyl | morpholinyl | Cl | Cl | phenyl | MIPP | MIPP |
| 162 | morpholinyl | cyclohexyl | cyclohexyl | Cl | Cl | phenyl | MIPP | MIPP |
| 163 | morpholinyl | morpholinyl | cyclohexyl | Cl | Cl | phenyl | MIPP | MIPP |

TABLE 5-continued

Non-limiting examples of olefin metathesis catalysts represented by the structure of Formula (XI)

| Catalyst | $R^1$ | $R^2$ | $R^3$ | $X^1$ | $X^2$ | $X^3$ | $R^5$ | $R^6$ |
|---|---|---|---|---|---|---|---|---|
| 164 | isopropoxy | cyclohexyl | cyclohexyl | Cl | Cl | phenyl | MIPP | MIPP |
| 165 | piperidinyl | cyclohexyl | cyclohexyl | Cl | Cl | phenyl | MIPP | MIPP |
| 166 | piperidinyl | piperidinyl | cyclohexyl | Cl | Cl | phenyl | MIPP | MIPP |
| 167 | piperidinyl | piperidinyl | piperidinyl | Cl | Cl | phenyl | MIPP | MIPP |
| 168 | pyrrolyl | cyclohexyl | cyclohexyl | Cl | Cl | phenyl | MIPP | MIPP |
| 169 | morpholinyl | phenyl | phenyl | Cl | Cl | isobutenyl | MIPP | MIPP |
| 170 | morpholinyl | morpholinyl | phenyl | Cl | Cl | isobutenyl | MIPP | MIPP |
| 171 | morpholinyl | morpholinyl | morpholinyl | Cl | Cl | isobutenyl | MIPP | MIPP |
| 172 | morpholinyl | cyclohexyl | cyclohexyl | Cl | Cl | isobutenyl | MIPP | MIPP |
| 173 | morpholinyl | morpholinyl | cyclohexyl | Cl | Cl | isobutenyl | MIPP | MIPP |

TABLE 5-continued

Non-limiting examples of olefin metathesis catalysts represented by the structure of Formula (XI)

| Catalyst | $R^1$ | $R^2$ | $R^3$ | $X^1$ | $X^2$ | $X^3$ | $R^5$ | $R^6$ |
|---|---|---|---|---|---|---|---|---|
| 174 | OiPr | cyclohexyl | cyclohexyl | Cl | Cl | CH=CMe$_2$ | MIPP | MIPP |
| 175 | pyrrolyl | cyclohexyl | cyclohexyl | Cl | Cl | CH=CMe$_2$ | MIPP | MIPP |
| 176 | piperidinyl | cyclohexyl | cyclohexyl | Cl | Cl | CH=CMe$_2$ | MIPP | MIPP |
| 177 | piperidinyl | piperidinyl | cyclohexyl | Cl | Cl | CH=CMe$_2$ | MIPP | MIPP |
| 178 | piperidinyl | piperidinyl | piperidinyl | Cl | Cl | CH=CMe$_2$ | MIPP | MIPP | wherein: Mes is 2,4,6-trimethylphenyl, MIPP is 2-isopropylphenyl, and DIPP is 2,6-diisopropylphenyl.

The present invention concerns also processes for preparing the olefin metathesis catalysts described above. The olefin metathesis catalysts according to the invention can be prepared analogously to conventional methods as understood by the person skilled in the art of synthetic organic chemistry.

Synthetic Scheme 1 illustrates how the olefin metathesis catalysts of Formula (VI), Formula (VII), and Formula (VIII) can be synthesized.

Scheme 1
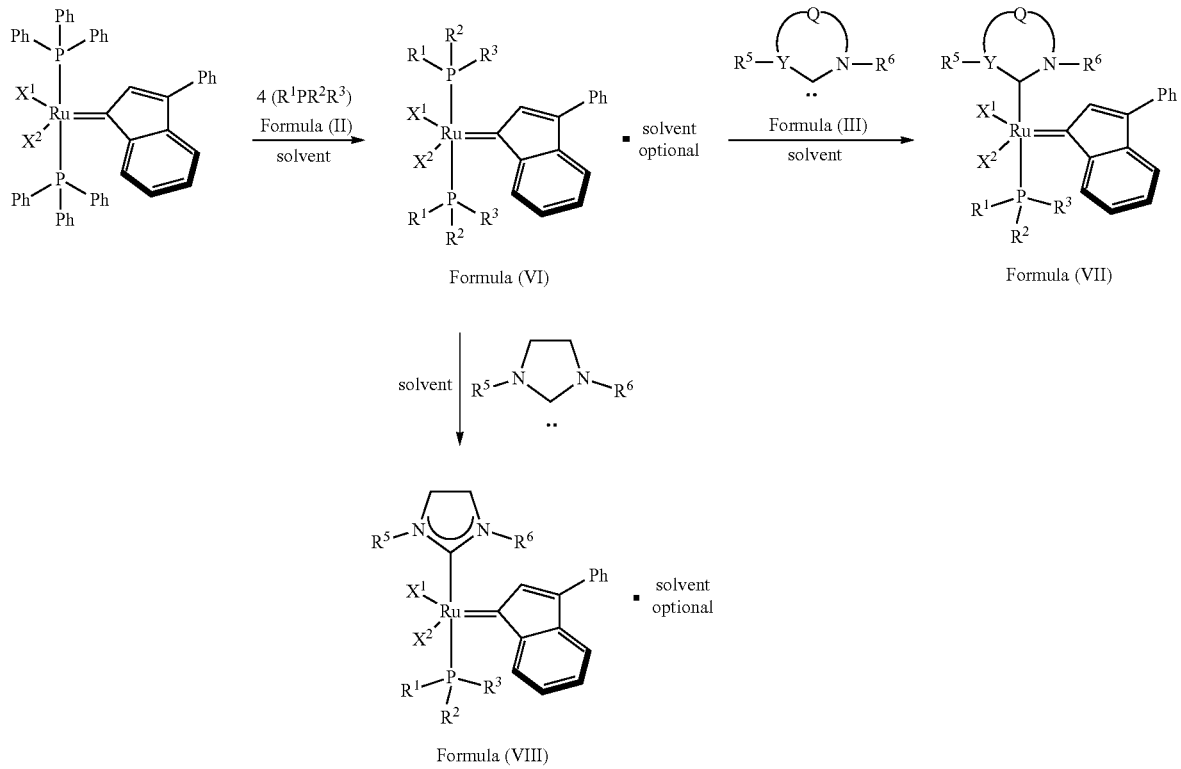
Synthetic Scheme 2 illustrates how olefin metathesis catalysts of Formula (IVa) can be synthesized.
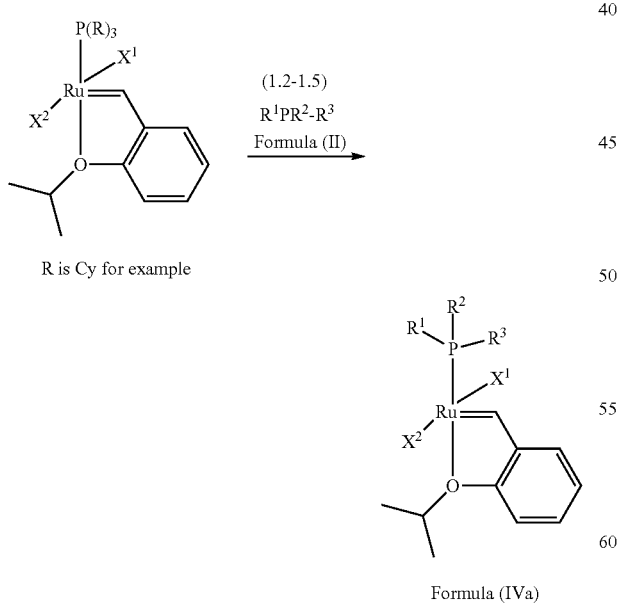
Synthetic Scheme 3 illustrates how the olefin metathesis catalysts of Formula (IX), Formula (X), and Formula (XI) can be synthesized.

Scheme 3

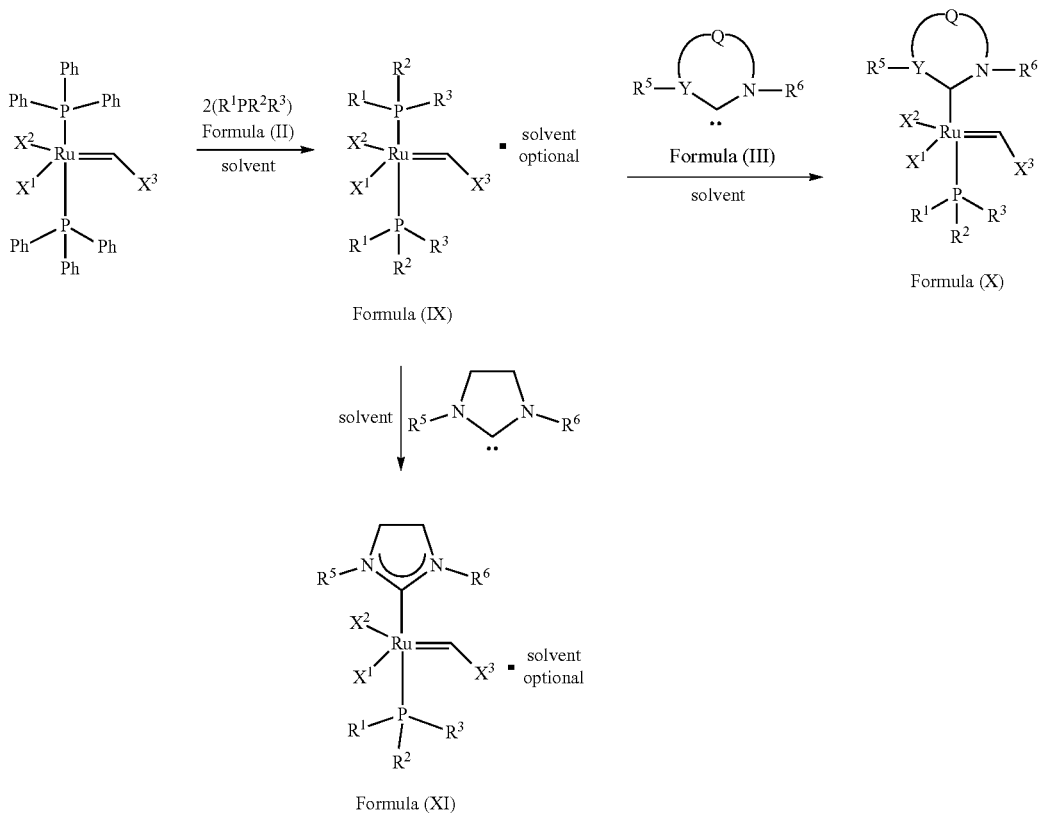

In synthetic Schemes 1, 2, and 3, substituents $X^1$, $X^2$, $X^3$, $R^1$, $R^2$, $R^3$, Q, Y, $R^5$, and $R^6$ are as defined herein.

Generally, the reactions take place under degassed $N_2$ at room temperature or at high temperature in an inert solvent (toluene, THF, MeTHF, dioxane and the like). Once the reaction is completed, the mixture is cooled to room temperature, the solvent is removed under high vacuum, and the residue is purified on a silica gel column and then recrystallized to afford the new olefin metathesis catalysts.

In another embodiment, the invention concerns methods of using the olefin metathesis catalysts of the invention, in the synthesis of related olefin metathesis catalysts. The ruthenium olefin metathesis catalysts of the invention are excellent precursors for various Second Generation Grubbs ruthenium olefin metathesis catalysts. The Second Generation Grubbs ruthenium olefin metathesis catalysts synthesized during these procedures are obtained in higher yield and with higher purity, which presents an advantage compared to the existing synthetic procedures.

The invention concerns also processes for synthesizing olefin metathesis catalysts of Formula (A) starting with an olefin metathesis catalyst of Formula (VIII).

Scheme 4

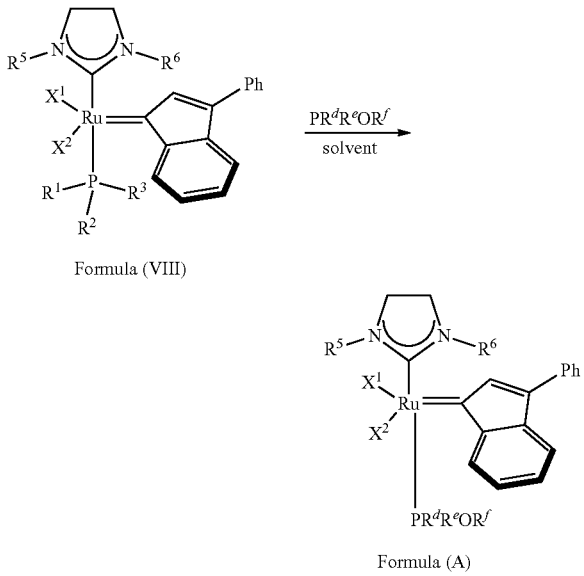

In a typical procedure, as shown in Scheme 4, the $PR^1R^2R^3$ ligand of the olefin metathesis catalyst represented by Formula (VIII) can be exchanged with a $PR^dR^eOR^f$ ligand at room temperature in an inert solvent, such as dichloromethane or toluene, wherein:

$R^1$ is unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^1$ is unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^2$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^2$ is unsubstituted ($C_6$ aryl), unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^3$ is unsubstituted ($C_5$-$C_{24}$ aryl), substituted ($C_5$-$C_{24}$ aryl), unsubstituted saturated N-heterocycle or substituted saturated N-heterocycle; generally $R^3$ is unsubstituted ($C_6$ aryl) or unsubstituted saturated N-heterocycle;

$R^5$ and $R^6$ are independently hydrogen, unsubstituted $C_5$-$C_{24}$ aryl, or substituted $C_5$-$C_{24}$ aryl; generally $R^5$ and $R^6$ are independently substituted $C_5$-$C_{24}$ aryl with one to three unsubstituted ($C_1$-$C_6$ alkyl) groups or substituted ($C_1$-$C_6$ alkyl) groups; typically, $R^5$ and $R^6$ are independently 2,4,6-trimethylphenyl, 2,6-di-iso-propylphenyl, 2-iso-propyl-6-methylphenyl, 2-iso-propylphenyl or 2-methyl-phenyl;

$X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl;

$R^d$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^d$ is unsubstituted $C_1$-$C_{10}$ alkyl or unsubstituted $C_6$-$C_{10}$ aryl; typically $R^d$ is phenyl;

$R^e$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^e$ is unsubstituted $C_1$-$C_{10}$ alkyl or unsubstituted $C_6$-$C_{10}$ aryl; typically $R^e$ is phenyl; and $R^f$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^f$ is unsubstituted $C_1$-$C_{10}$ alkyl, unsubstituted $C_6$-$C_{10}$ aryl or substituted $C_6$-$C_{10}$ aryl; typically, $R^f$ is phenyl, methyl, p-(OMe)phenyl, iso-propyl or ethyl.

The invention concerns also processes for synthesizing olefin metathesis catalysts of Formula (B) starting with an olefin metathesis catalyst of Formula (VIII).

Scheme 5

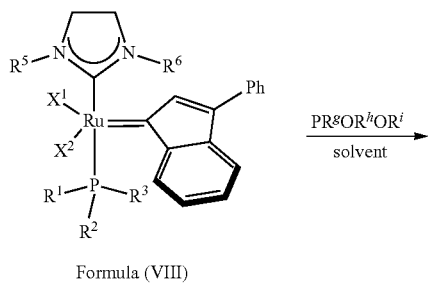

Formula (VIII)

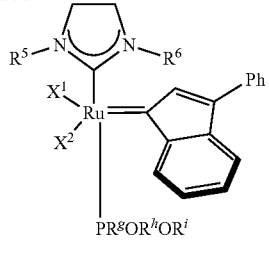

Formula (B)

In a typical procedure, as shown in Scheme 5, the $PR^1R^2R^3$ ligand of the olefin metathesis catalyst represented by Formula (VIII) can be exchanged with a $PR^gOR^hOR^i$ ligand or a $PR^gR^hOR^i$ ligand at room temperature in an inert solvent, such as dichloromethane or toluene, wherein:

$R^1$ is unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^1$ is unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^2$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^2$ is unsubstituted ($C_6$ aryl), unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^3$ is unsubstituted ($C_5$-$C_{24}$ aryl), substituted ($C_5$-$C_{24}$ aryl), unsubstituted saturated N-heterocycle or substituted saturated N-heterocycle; generally $R^3$ is unsubstituted ($C_6$ aryl) or unsubstituted saturated N-heterocycle;

$R^5$ and $R^6$ are independently hydrogen, unsubstituted $C_5$-$C_{24}$ aryl, or substituted $C_5$-$C_{24}$ aryl; generally $R^5$ and $R^6$ are independently substituted $C_5$-$C_{24}$ aryl with one to three unsubstituted ($C_1$-$C_6$ alkyl) groups or substituted ($C_1$-$C_6$ alkyl) groups; typically, $R^5$ and $R^6$ are independently 2,4,6-trimethylphenyl, 2,6-di-iso-propylphenyl, 2-iso-propyl-6-methylphenyl, 2-iso-propylphenyl or 2-methyl-phenyl;

$X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl;

$R^g$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^g$ is unsubstituted $C_1$-$C_{10}$ alkyl or unsubstituted $C_6$-$C_{10}$ aryl; typically $R^g$ is phenyl;

$R^h$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^h$ is unsubstituted $C_1$-$C_{10}$ alkyl or unsubstituted $C_6$-$C_{10}$ aryl; typically $R^h$ is phenyl or methyl; and $R^i$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^i$ is unsubstituted $C_1$-$C_{10}$ alkyl or unsubstituted $C_6$-$C_{10}$ aryl; typically $R^i$ is phenyl or methyl.

In another embodiment, the invention concerns also processes for synthesizing olefin metathesis catalysts of Formula (C) starting with an olefin metathesis catalyst of Formula (IVa).

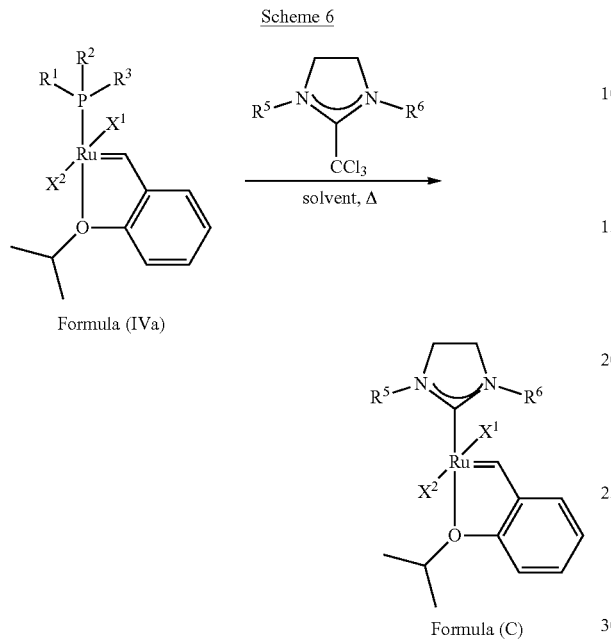

Scheme 6

Formula (IVa)

Formula (C)

In a typical procedure, as shown in Scheme 6, the $PR^1R^2R^3$ ligand of the olefin metathesis catalyst represented by Formula (IVa) can be exchanged with a NHC ligand,

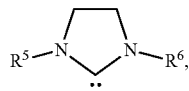

wherein:

$R^1$ is unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^1$ is unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^2$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^2$ is unsubstituted ($C_6$ aryl), unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^3$ is unsubstituted ($C_5$-$C_{24}$ aryl), substituted ($C_5$-$C_{24}$ aryl), unsubstituted saturated N-heterocycle or substituted saturated N-heterocycle; generally $R^3$ is unsubstituted ($C_6$ aryl) or unsubstituted saturated N-heterocycle;

$R^5$ and $R^6$ are independently hydrogen, unsubstituted $C_5$-$C_{24}$ aryl, or substituted $C_5$-$C_{24}$ aryl; generally $R^5$ and $R^6$ are independently substituted $C_5$-$C_{24}$ aryl with one to three unsubstituted ($C_1$-$C_6$ alkyl) groups or substituted ($C_1$-$C_6$ alkyl) groups; typically, $R^5$ and $R^6$ are independently 2,4,6-trimethylphenyl, 2,6-di-iso-propylphenyl, 2-iso-propyl-6-methylphenyl, 2-iso-propylphenyl or 2-methyl-phenyl; and $X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl.

In another embodiment, the invention concerns also processes for synthesizing olefin metathesis catalysts of Formula (C) starting with an olefin metathesis catalyst of Formula (VIII).

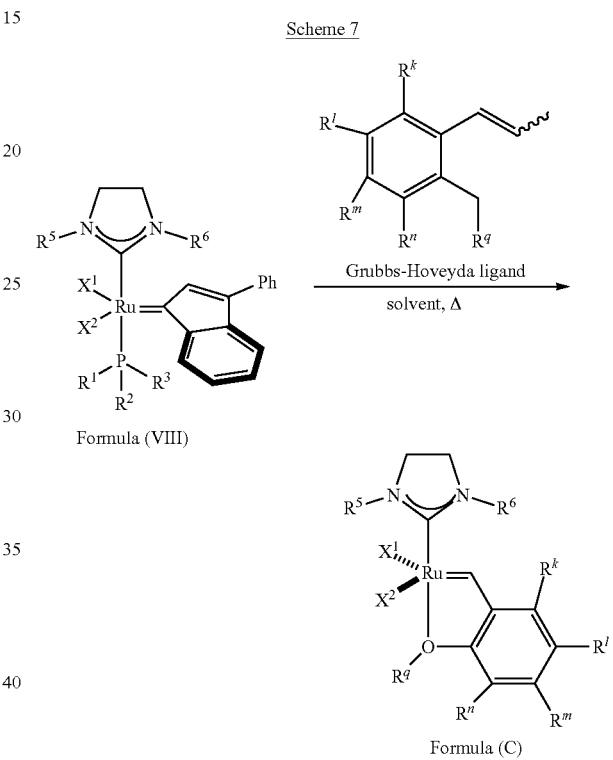

Scheme 7

Formula (VIII)

Formula (C)

In a typical procedure, as shown in Scheme 7, the —$PR^1R^2R^3$ ligand of the olefin metathesis catalyst represented by Formula (VIII) can be exchanged with a Grubbs-Hoveyda ligand, wherein:

$R^1$ is unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^1$ is unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^2$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$; generally $R^2$ is unsubstituted ($C_6$ aryl), unsubstituted saturated N-heterocycle, substituted saturated N-heterocycle, —N($C_1$-$C_6$ alkyl)$_2$, —N($C_1$-$C_6$ alkyl)($C_6$ aryl) or —N[($C_1$-$C_3$ alkylene)($C_6$ aryl)]$_2$;

$R^3$ is unsubstituted ($C_5$-$C_{24}$ aryl), substituted ($C_5$-$C_{24}$ aryl), unsubstituted saturated N-heterocycle or substituted saturated N-heterocycle; generally $R^3$ is unsubstituted ($C_6$ aryl) or unsubstituted saturated N-heterocycle;

$R^5$ and $R^6$ are independently hydrogen, unsubstituted $C_5$-$C_{24}$ aryl, or substituted $C_5$-$C_{24}$ aryl; generally $R^5$ and $R^6$ are independently substituted $C_5$-$C_{24}$ aryl with one to three unsubstituted ($C_1$-$C_6$ alkyl) groups or substituted ($C_1$-$C_6$ alkyl) groups; typically, $R^5$ and $R^6$ are independently 2,4,6-trimethylphenyl, 2,6-di-iso-propylphenyl, 2-iso-propyl-6-methylphenyl, 2-iso-propylphenyl or 2-methyl-phenyl;

$X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl.

$R^k$ is hydrogen, halogen, —NO$_2$, —CN, —CF$_3$, —SO$_2$NR$^s_2$, —NHC(O)CF$_3$, —NHC(O)C$_6$F$_5$, —NHC(O)OtBu, unsubstituted hydrocarbyl, substituted hydrocarbyl, unsubstituted heteroatom-containing hydrocarbyl, or substituted heteroatom-containing hydrocarbyl; typically, $R^k$ is hydrogen;

$R^l$ is hydrogen, halogen, —NO$_2$, —CN, —CF$_3$, —SO$_2$NR$^s_2$, —NHC(O)CF$_3$, —NHC(O)C$_6$F$_5$, —NHC(O)OtBu, unsubstituted hydrocarbyl, substituted hydrocarbyl, unsubstituted heteroatom-containing hydrocarbyl, or substituted heteroatom-containing hydrocarbyl; typically, $R^l$ is hydrogen;

$R^m$ is hydrogen, halogen, —NO$_2$, —CN, —CF$_3$, —SO$_2$NR$^s_2$, —NHC(O)CF$_3$, —NHC(O)C$_6$F$_5$, —NHC(O)OtBu, unsubstituted hydrocarbyl, substituted hydrocarbyl, unsubstituted heteroatom-containing hydrocarbyl, or substituted heteroatom-containing hydrocarbyl; typically, $R^m$ is hydrogen, —NO$_2$, —CN, —CF$_3$, —SO$_2$NR$^s_2$, —NHC(O)CF$_3$, —NHC(O)C$_6$F$_5$, or —NHC(O)OtBu; specifically $R^m$ is hydrogen;

$R^n$ is hydrogen, halogen, —NO$_2$, —CN, —CF$_3$, —SO$_2$NR$^s_2$, —NHC(O)CF$_3$, —NHC(O)C$_6$F$_5$, —NHC(O)OtBu, unsubstituted hydrocarbyl, substituted hydrocarbyl, unsubstituted heteroatom-containing hydrocarbyl, or substituted heteroatom-containing hydrocarbyl; typically, $R^n$ is hydrogen; and $R^s$ is hydrogen or $C_1$-$C_6$ alkyl; typically $R^s$ is hydrogen, methyl, ethyl or n-propyl; and $R^q$ is unsubstituted hydrocarbyl, substituted hydrocarbyl; generally, $R^q$ is $C_1$-$C_{10}$ alkyl; typically, $R^q$ is iso-propyl.

At this stage, those skilled in the art will appreciate that many additional compounds that fall under the scope of the invention can be prepared by performing various common chemical reactions. Details of certain specific chemical transformations are provided in the examples.

For example, the olefin metathesis catalysts are typically added to a resin composition as a solid, a solution, or as a suspension. When the olefin metathesis catalysts are added to a resin composition as a suspension, the olefin metathesis catalysts are suspended in a dispersing carrier such as mineral oil, paraffin oil, soybean oil, tri-iso-propylbenzene, or any hydrophobic liquid which has a sufficiently high viscosity so as to permit effective dispersion of the catalyst(s), and which is sufficiently inert and which has a sufficiently high boiling point so that is does not act as a low-boiling impurity in the olefin metathesis reaction.

Olefins

Resin compositions that may be used with the present invention disclosed herein comprise one or more cyclic olefins. Such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a ROMP cyclic olefin composition.

Examples of bicyclic and polycyclic olefins thus include, without limitation, dicyclopentadiene (DCPD); trimer and other higher order oligomers of cyclopentadiene including without limitation tricyclopentadiene (cyclopentadiene trimer), cyclopentadiene tetramer, and cyclopentadiene pentamer; ethylidenenorbornene; dicyclohexadiene; norbornene; $C_2$-$C_{12}$ hydrocarbyl substituted norbornenes; 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; 5-butenyl-2-norbornene; 5-tolyl-norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; bicyclo[2.2.1]hept-2-ene-2-carboxylic acid, 2-ethylhexyl ester; 5-cyanonorbornene; 5,5,6-trimethyl-2-norbornene; cyclohexenylnorbornene; endo, exo-5,6-dimethoxynorbornene; endo, endo-5,6-dimethoxynorbornene; endo, exo-5,6-dimethoxy carbonylnorbornene; endo,endo-5,6-dimethoxycarbonylnorbornene; 2,3-dimethoxynorbornene; norbornadiene; tricycloundecene; tetracyclododecene; 8-methyl tetracyclododecene; 8-ethyltetracyclododecene; 8-methoxy carbonyltetracyclo dodecene; 8-methyl-8-tetra cyclododecene; 8-cyanotetracyclo dodecene; pentacyclopentadecene; pentacyclo hexadecene; bicyclo[2.2.1]hept-2-ene-5-phenoxymethyl; 2-ethylhexyl ester-bicyclo[2.2.1]hept-5-ene-2-carboxylic acid; 2-hydroxyethyl ester-bicyclo[2.2.1]hept-5-ene-2-carboxylic acid; bicyclo[2.2.1]hept-5-ene-2-methanol; bicyclo[2.2.1]hept-5-ene-2-heptanoic acid-methyl ester; bicyclo[2.2.1]hept-5-ene-2-hexanoic acid-methyl ester; 1,4:5,8-dimethanonaphthalene, 2-hexyl-1,2,3,4,4a,5,8, 8a-octahydro; bicyclo[2.2.1]hept-5-ene-2-octanoic acid-methyl ester; 1,4:5,8-dimethano naphthalene; 2-butyl-1,2,3,4,4a,5,8,8a-octahydro; ethylidenetetracyclododecene; 2-vinyl-1,2,3,4,4a,5,8,8a-octahydro-1,4:5,8-dimethano naphthalene; and the like, and their structural isomers, stereoisomers, and mixtures thereof.

EXPERIMENTAL

General Information—Materials and Methods

In the following examples, efforts have been made to ensure accuracy with respect to numbers used (e.g., amounts, temperature, etc.) but some experimental error and deviation should be accounted for. The examples are to be considered as not being limiting of the invention described herein.

All reactions involving metal complexes were conducted in oven-dried glassware under an argon or nitrogen atmosphere using standard Schlenk techniques. Chemicals and solvents were obtained from Sigma-Aldrich, Strem, Alfa Aesar, Nexeo, Brenntag, AG Layne and TCI. Commercially available reagents were used as received unless otherwise noted. Silica gel was purchased from Fisher (0.040-0.063 μm, EMD Millipore). Solvents were dried by passing through an activated alumina column (n-pentane, benzene, toluene, Et$_2$O, and THF).

SIMes.HBr, SIMes.HCl, SIPr.HCl, P426, P510, 1,3-Bis(2,4,6-trimethylphenyl)-4,5-dihydroimidazol-2-ylidene and Catalysts C959, C931, C848, C831, C949, C601, C727, C787, and C765 were prepared using known methods.

The crystallographic measurements were performed at 100(2) K using a Bruker APEX-II CCD area detector diffractometer (Mo—K$_\alpha$ radiation, λ=0.71073 Å). In each case, a specimen of suitable size and quality was selected and mounted onto a nylon loop. The structures were solved by direct methods, which successfully located most of the nonhydrogen atoms. Semi-empirical absorption corrections were applied. Subsequent refinement on F$^2$ using the SHELXTL/PC package (version 6.1) allowed location of the remaining non-hydrogen atoms. Depending on the experimental conditions, some of the olefin metathesis catalysts of the invention were obtained as solvates.

Ultrene® 99 dicyclopentadiene (DCPD) was obtained from Cymetech Corporation. A modified DCPD base resin containing 20-25% tricyclopentadiene (and small amounts of higher cyclopentadiene homologs) (DCPD-HT) was prepared by heat treatment of Ultrene® 99 DCPD generally as described in U.S. Pat. No. 4,899,005.

$^1$H and $^{13}$C NMR spectra were recorded on a Varian 400 MHz spectrometer. Chemical shifts are reported in ppm downfield from Me$_4$Si by using the residual solvent peak as an internal standard (CDCl$_3$—δ 7.24 ppm; CD$_2$Cl$_2$—δ 5.32 ppm). $^{31}$P NMR used an external standard of 85% H$_3$PO$_4$, referenced to 0 ppm. Spectra were analyzed and processed using MestReNova software. Deuterated solvents were purchased from Cambridge Isotopes Laboratories, Inc. and were degassed and stored over activated 3 Å molecular sieves prior to use.

The following abbreviations are used in the examples:

| mL | milliliter |
| L | liter |
| ° C. | degrees Celsius |
| CD$_2$Cl$_2$ | deuterated dichloromethane |
| CDCl$_3$ | deuterated chloroform |
| C$_6$D$_6$ | deuterated benzene |
| SIMes•HBr | N,N'-bis-(2,4,6-trimethylphenylamino)ethane dihydrobromide |
| SIMes•HCl | N,N'-bis-(2,4,6-trimethylphenylamino)ethane dihydrochloride |
| SIPr•HCl | 1,3-bis(2,6-di-iso-propylphenyl)-4,5-dihydroimidazolium chloride |
| Ar | argon |
| HCl | hydrochloric acid |
| KHMDS | potassium bis(trimethylsilyl)amide |
| r.t. | room temperature |
| C765 | 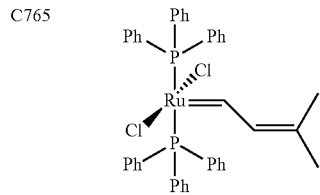 Dichloro(3-methyl-2-butenylidene)bis(triphenylphosphine)ruthenium [CAS 191609-95-7] |
| C727 | [1,3-bis(2,4,6-trimethylphenyl)-2-imidazolidinylidene]dichloro(phenylmethylene)bis(pyridine)-Ruthenium [CAS 357186-58-4] |
| 1,3-Bis(2,4,6-trimethylphenyl)-4,5-dihydro-imidazol-2-ylidene | |
| C959 | (PPh$_3$)$_3$Ru(Cl)$_2$ tris(triphenylphosphine)ruthenium(II) dichloride [CAS 15529-49-4] |
| (2-Me)THF | 2-methyltetrahydrofuran |
| THF | tetrahydrofuran |
| C787 | Benzylidenedichlorobis(triphenylphosphine)ruthenium [CAS 172222-26-3] |
| C848 | Dichloro[1,3-bis-(2,4,6-trimethylphenyl)-2-imidazolidinylidene](benzylidene)(tricyclohexylphosphine)ruthenium (II) [CAS 246047-72-3] |
| C831 | Dichloro[1,3-bis-(2,4,6-trimethylphenyl)-2-imidazolidinylidene](benzylidene)(triphenylphosphine)ruthenium (II) [CAS 357261-84-8] |

-continued

| | |
|---|---|
| PTSA | p-Toluenesulfonic acid |
| C931 | [1,3-bis-(2,4,6-trimethylphenyl)-2-imidazolidinylidene]dichloro (phenylindenylidene)(triphenylphosphine)ruthenium(II) [CAS 340810-50-6] |
| C949 | [1,3-bis-(2,4,6-trimethylphenyl)-2-imidazolidinylidene]dichloro(phenylindenylidene) (tricyclohexylphosphine)ruthenium(II) [CAS 536724-67-1] |
| C601 | Dichloro(2-isopropoxyphenylmethylene) (tricyclohexylphosphine)ruthenium (II) [CAS 203714-71-0] |
| P426 | 1,3-Bis(2,4,6-trimethylphenyl)-2-(trichloromethyl)imidazolidine [CAS 260054-47-5] |
| P510 | 1,3-bis[2,6-bis(1-methylethyl)phenyl]-2-(trichloromethyl) imidazolidine [CAS 465543-05-9] |

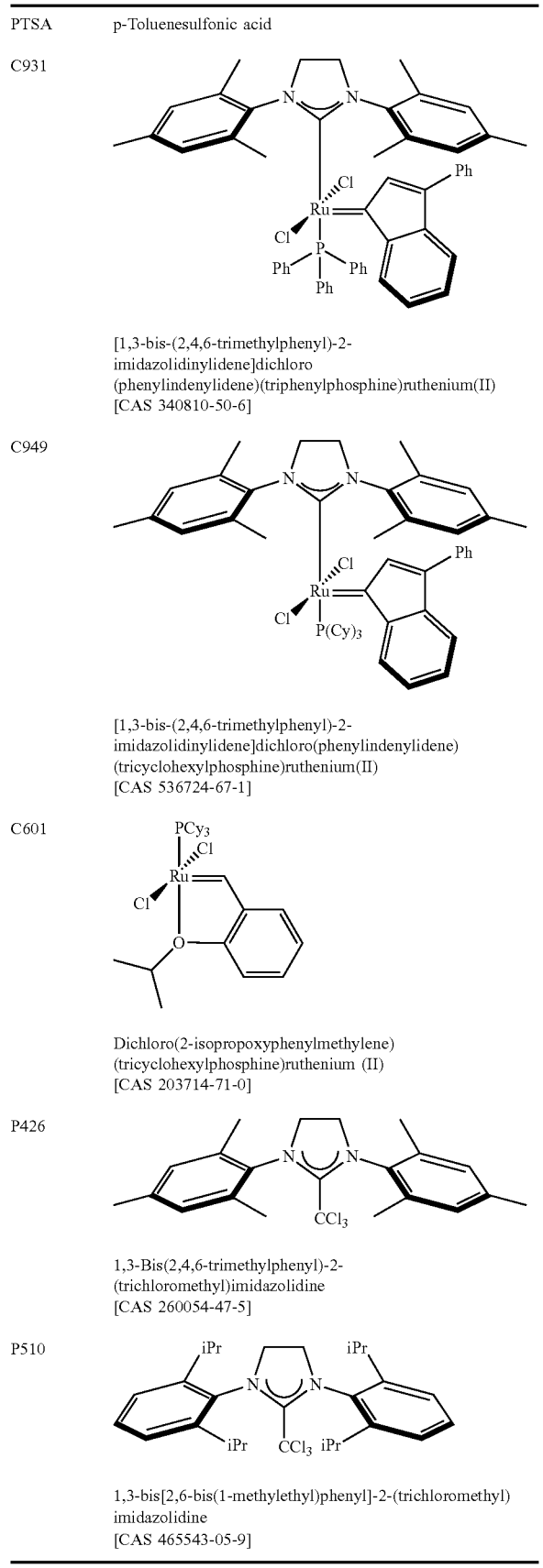

EXAMPLES

Example 1

Synthesis of C973

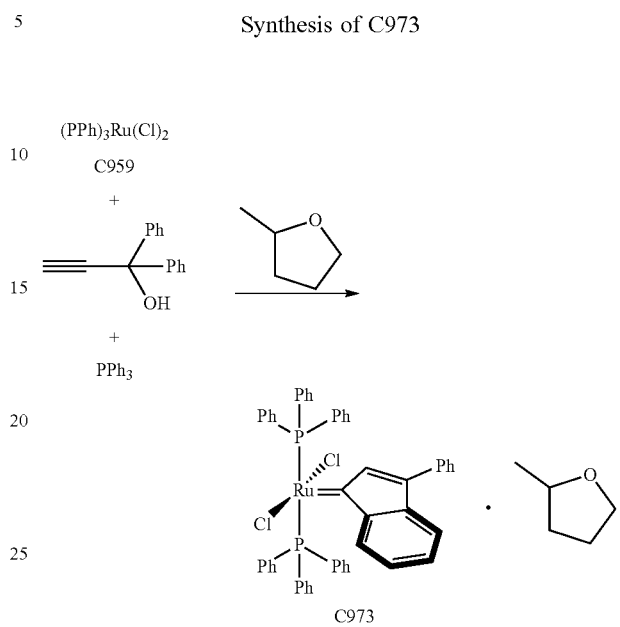

In a 3 L, 3-neck round bottom flask were added C959 (100.0 g, 104.2 mmol), 1,1-diphenyl-2-propyn-1-ol (24.9 g, 119.8 mmol), and triphenylphosphine (27.3 g, 104.2 mmol) under air. The flask was equipped with a thermocouple and rubber suba-seal septum and then it was placed under Ar using Schlenk technique. The reagents and products of this reaction are highly air sensitive in solution. A 1 L addition funnel was attached to the flask under a flow of Ar. To the addition funnel were added (2-Me)THF (1 L) and 4 M HCl (25.6 mL, 104.2 mmol) in dioxane using Schlenk technique. The solution was added over 10 minutes at room temperature with stirring. Another 0.75 L (2-Me)THF were added directly to the flask. The addition funnel was replaced with a glass stopper under a flow of Ar and the flask was lowered into a pre-heated oil bath at 65° C. The reaction was monitored by $^{31}$P NMR. When conversion was deemed to be complete, the reaction flask was removed from the oil bath and hot filtered via cannula transfer through a celite pad (in an evacuated Schlenk filter) into a Schlenk flask. Approximately 85% (2-Me)THF was removed at room temperature (water bath) under vacuum. The resulting slurry was cooled to 0° C. then filtered on a coarse glass frit under air. The solid was washed quickly with 3×50 mL portions of 0° C. (2-Me)THF followed by hexanes (200 mL) (r.t.) and 2-propanol (100 mL). The solid from the frit was re-slurried with hexanes (200 mL) and filtered again. The solid was air-dried until no condensation was seen on the outside of the glass frit, then transferred to a 200 mL round bottom flask and dried under high vacuum overnight. The final $^1$H NMR and $^{31}$P NMR in CDCl$_3$ indicate that the complex is a 1:1 adduct of (PPh$_3$)$_2$Ru(PhInd)Cl$_2$, and (2-Me)THF, C973, for a final molecular weight of 973 g/mol. Yield=74.1 g (73%).

$^1$H NMR (400 MHz in CDCl$_3$ at r.t.): 67 =7.2-7.6 (overlapping CDCl$_3$ and aromatics), 7.07 (d, Ind, 1H), 6.62 (t, Ind, 1H), 6.43 (s, Ind, 1H), 3.92 (m, (2-Me)THF, 2H), 3.70 (m, (2-Me)THF, 1H), 1.88-1.98 (overlapping m, (2-Me)THF, 3H), 1.41 (m, (2-Me)THF, 1H), 1.23 (d, (2-Me)THF, 3H).

Example 2

Synthesis of C905

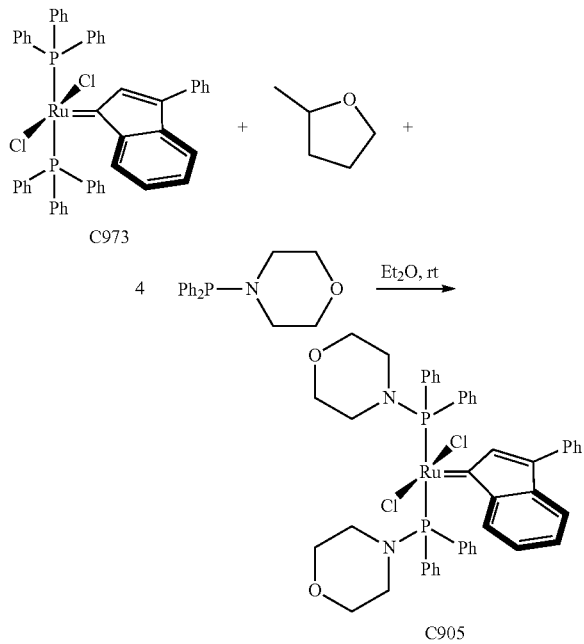

To a 40 mL scintillation vial equipped with a magnetic stir bar were added C973 (0.750 mg, 0.771 mmol), Ph$_2$P[N(C$_2$H$_4$)$_2$O] ([CAS 13743-27-6] 0.837 g, 3.08 mmol), and diethyl ether (20 mL). The suspension was allowed to stir for 14 hours at ambient temperature. The resulting precipitate was isolated by filtration, washed with diethyl ether (5 mL) followed by diethyl ether/hexanes (1:1, 10 mL), then dried in vacuum to afford C905 as a red/brown powder (0.507 g, 72.7% yield).

$^1$H NMR (400 MHz, CD$_2$Cl$_2$) δ 7.71 (m, 6H), 7.61-7.50 (m, 4H), 7.48-7.40 (m, 5H), 7.40-7.31 (m, 11H), 7.24 (d, J=7.4 Hz, 2H), 6.79 (t, J=7.4 Hz, 1H), 6.38 (s, 1H), 3.42 (br s, 8H), 2.81 (br s, 8H). $^{31}$P NMR (162 MHz, CD$_2$Cl$_2$) δ 79.3 (s).

Example 3

Synthesis of C940

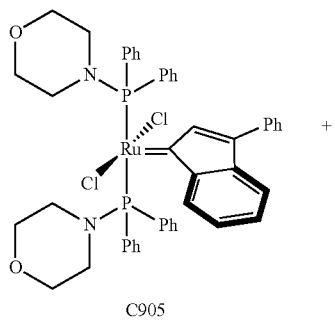

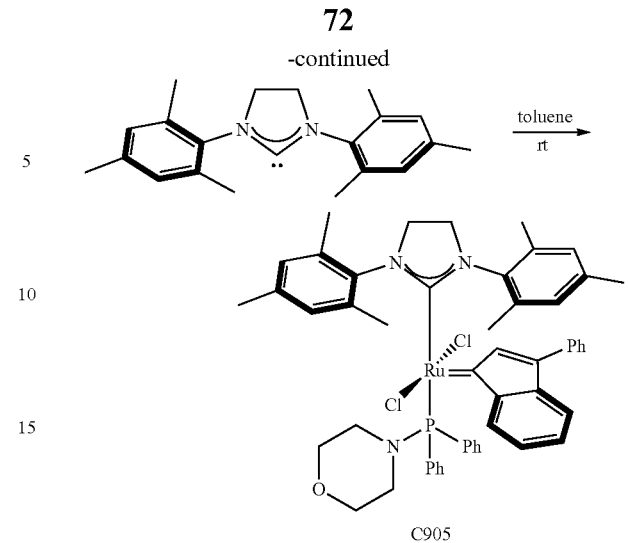

To a 40 mL scintillation vial equipped with a magnetic stir bar were added C905 (0.200 mg, 0.221 mmol), 1,3-bis(2,4,6-trimethylphenyl)-4,5-dihydroimidazol-2-ylidene (0.071 g, 0.23 mmol), and toluene (10 mL). The resulting solution was stirred for 2 hours, devolatilized, and the resulting residue recrystallized from toluene/pentane at −35° C. The resulting brown crystals were separated by filtration and dried in vacuum affording C940 (0.146 g, 70.1% yield). FIG. 1 shows the ORTEP diagram of C940.

$^1$H NMR (400 MHz, CD$_2$Cl$_2$) δ 7.78 (d, J=7.6 Hz, 1H), 7.56-7.33 (m, 7H), 7.27 (t, J=7.3 Hz, 1H), 7.24-7.11 (m, 6H), 7.08-7.01 (m, 2H), 6.98 (d, J=6.5 Hz, 3H), 6.93 (t, J=7.6 Hz, 1H), 6.54 (s, 1H), 6.39 (s, 1H), 6.00 (s, 1H), 4.07-3.97 (m, 2H), 3.90-3.71 (m, 2H), 3.37-3.22 (m, 4H), 2.65 (s, 6H), 2.62-2.48 (m, 4H), 2.38 (s, 3H), 2.12 (s, 3H), 1.97 (s, 3H), 1.81 (s, 3H). $^{31}$P NMR (162 MHz, CD$_2$Cl$_2$) δ 76.3 (s).

Example 4

Synthesis of C923

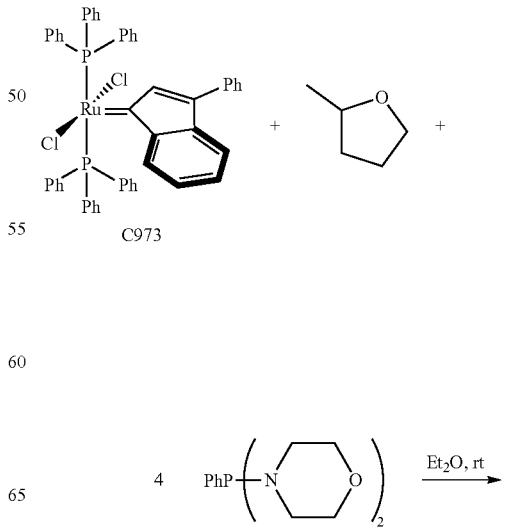

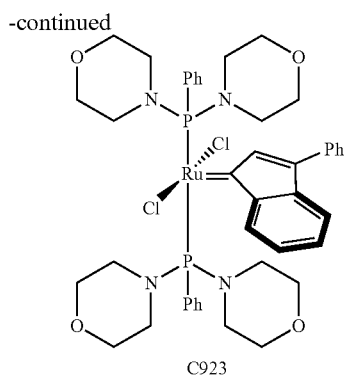

C923

To a 20 mL scintillation vial equipped with a magnetic stir bar were added C973 (0.500 mg, 0.514 mmol), 4,4'-(phenylphosphinidene)bismorpholine ([CAS 13337-35-4] 0.576 g, 2.06 mmol), and diethyl ether (10 mL). The suspension was allowed to stir for 14 hours at ambient temperature. The resulting precipitate was isolated by filtration, washed with diethyl ether (5 mL) followed by diethyl ether/hexanes (1:1, 10 mL) and hexanes (10 mL), then dried in vacuum to afford C923 as a red/brown powder (0.313 g, 66.0% yield).

$^1$H NMR (400 MHz, CD$_2$Cl$_2$) δ 7.95-7.15 (m, 18H), 7.15-6.30 (m, 2H), 3.49 (br s, 16H), 3.02 (br s, 16H). $^{31}$P NMR (162 MHz, CD$_2$Cl$_2$) δ 97.3 (br s).

Example 5

Synthesis of C949

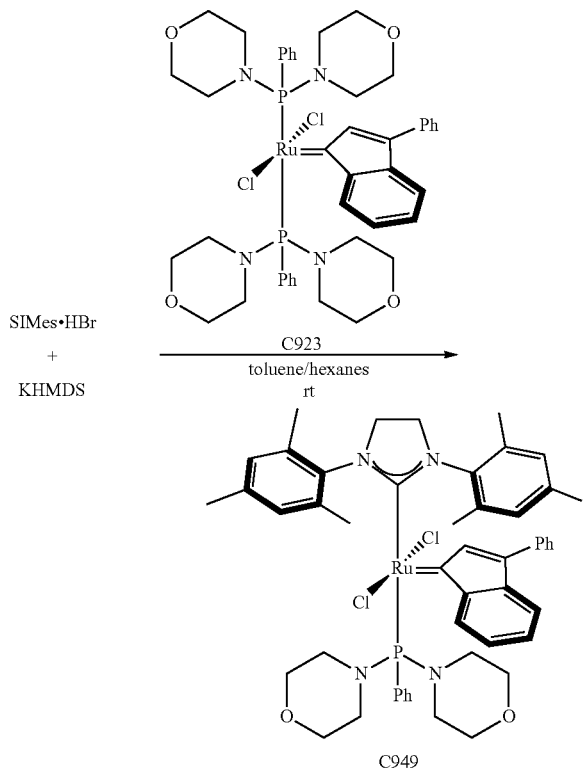

To a 20 mL scintillation vial equipped with a magnetic stir bar were added SIMes.HBr (0.110 mg, 0.285 mmol), KHMDS (0.057 g, 0.285 mmol), and toluene (2 mL). The resulting reaction was allowed to stir for 30 minutes at ambient temperature, then it was filtered through a pad of celite, and combined with C923 and hexanes (8 mL) in a 20 mL scintillation vial equipped with a magnetic stir bar. The resulting suspension was subsequently stirred for 6 hours at ambient temperature. The resulting precipitate was isolated by filtration, washed with toluene/hexanes (3:7, 2×10 mL) followed by hexanes (10 mL) then dried in vacuum, to afford C949 as a red/brown powder (0.239 g, 93.0% yield).

$^1$H NMR (400 MHz, CD$_2$Cl$_2$) δ 7.91 (d, J=7.3 Hz, 1H), 7.66 (d, J=7.6 Hz, 2H), 7.56 (t, J=6.9 Hz, 1H), 7.42 (t, J=7.6 Hz, 2H), 7.25 (t, J=7.3 Hz, 1H), 7.21-7.07 (m, 3H), 7.09-6.93 (m, 6H), 6.54 (s, 1H), 6.38 (s, 1H), 5.96 (s, 1H), 4.10-3.97 (m, 2H), 3.90-3.70 (m, 2H), 3.29 (br s, 4H), 3.26-3.03 (m, 4H), 2.96-2.80 (m, 4H), 2.78-2.69 (m, 4H), 2.67 (s, 3H), 2.66 (s, 3H), 2.38 (s, 3H), 2.13 (s, 3H), 1.97 (s, 3H), 1.76 (s, 3H). $^{31}$P NMR (162 MHz, CD$_2$Cl$_2$) δ 97.4 (s).

Example 6

Synthesis of C941

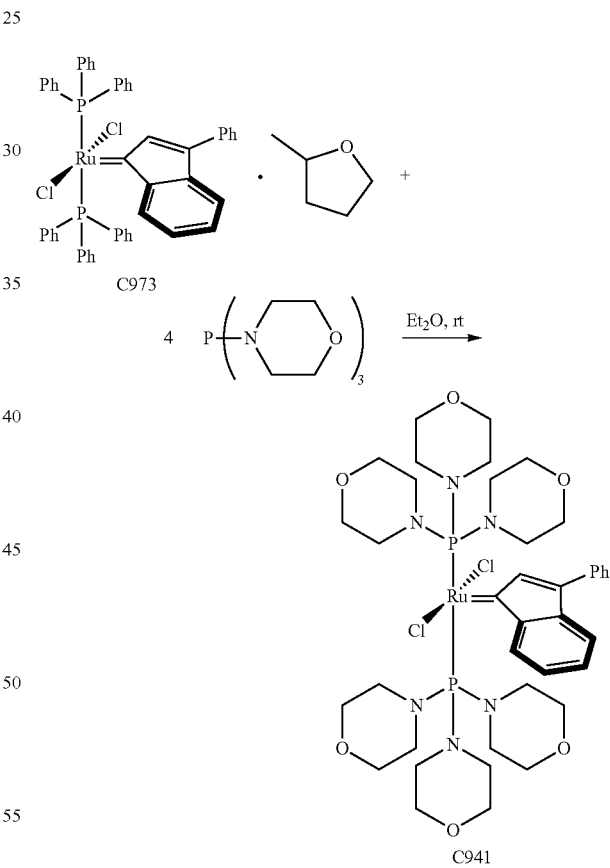

To a 40 mL scintillation vial equipped with a magnetic stir bar were added C973 (1.00 g, 1.03 mmol), 4,4'',4'''-phosphinidyltrismorpholine ([CAS 5815-61-2] 1.19 g, 4.11 mmol), and diethyl ether (30 mL). The suspension was allowed to stir for 14 hours at ambient temperature. The resulting precipitate was isolated by filtration, washed with diethyl ether (4×15 mL) followed by hexanes (2×10 mL), then dried in vacuum to afford C941 as a red powder (0.740 g, 76.5% yield).

$^1$H NMR (400 MHz, CD$_2$Cl$_2$) δ 8.61-8.44 (m, 1H), 7.87-7.72 (m, 2H), 7.60 (t, J=7.0 Hz, 1H), 7.45 (t, J=7.4 Hz, 3H), 7.40-7.20 (m, 3H), 3.52 (s, 24H), 3.15 (s, 24H). $^{31}$P NMR (162 MHz, CD$_2$Cl$_2$) δ 100.1 (br s).

Example 7

Synthesis of C958

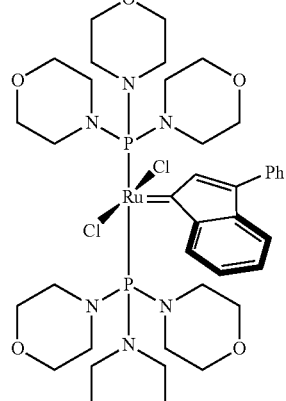

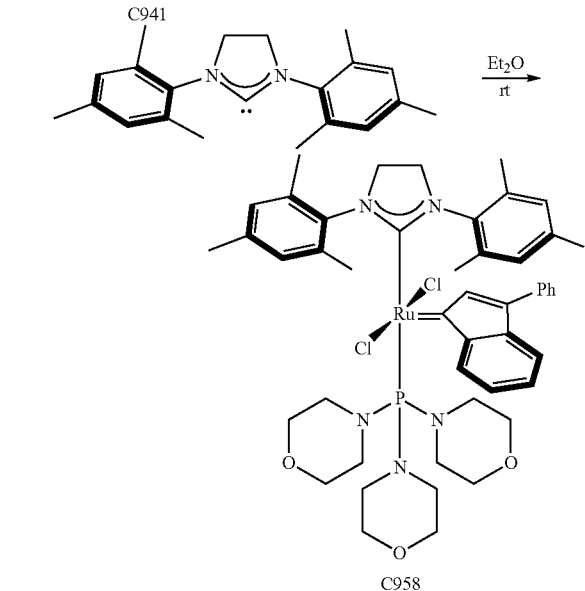

Figure 2:
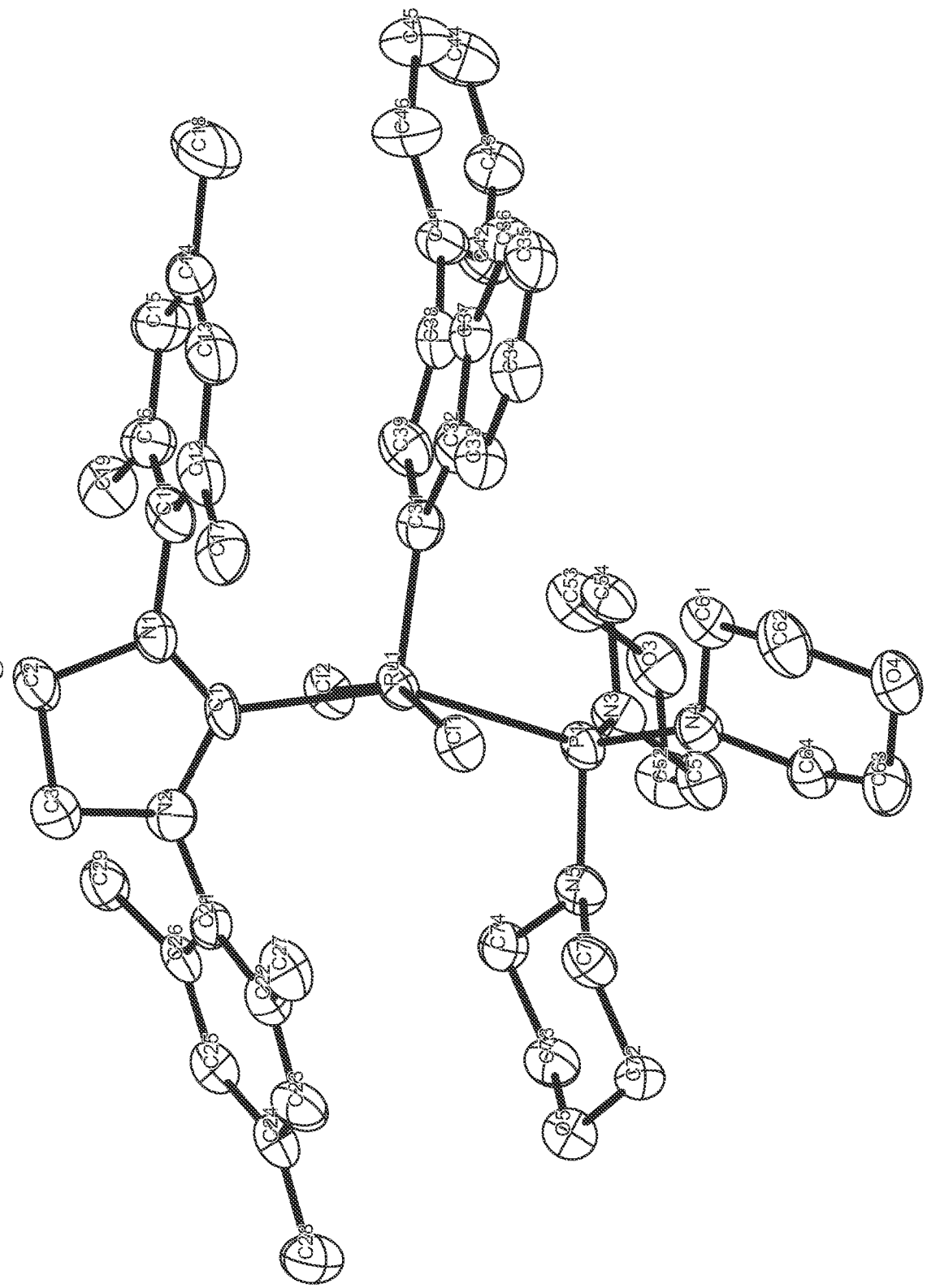
FIG. 2. Oak Ridge Thermal Ellipsoid Plot (ORTEP) diagram of C958.

To a 20 mL scintillation vial equipped with a magnetic stir bar was added C941 (0.500 g, 0.531 mmol), 1,3-bis(2,4,6-trimethylphenyl)-4,5-dihydroimidazol-2-ylidene (0.171 g, 0.558 mmol), and diethyl ether (10 mL). The resulting suspension was allowed to stir for 8 hours at ambient temperature. The resulting precipitate was isolated by filtration, washed with diethyl ether (2×10 mL) followed by hexanes (10 mL) then dried in vacuum to afford C958 as a red/brown powder (0.434 g, 85.3% yield). FIG. 2 shows the ORTEP diagram of C958.

$^1$H NMR (400 MHz, CD$_2$Cl$_2$) δ 8.41 (d, J=7.4 Hz, 1H), 7.70 (d, J=7.8 Hz, 2H), 7.54 (t, J=7.4 Hz, 1H), 7.43 (t, J=7.5 Hz, 2H), 7.30-7.20 (m, 2H), 7.14 (t, J=7.5 Hz, 2H), 7.09-6.98 (m, 3H), 6.42 (s, 1H), 5.99 (s, 1H), 4.07-3.97 (m, 2H), 3.91-3.72 (m, 2H), 3.23 (s, 12H), 2.79 (s, 12H), 2.71 (s, 3H), 2.67 (s, 3H), 2.36 (s, 3H), 2.17 (s, 3H), 2.10 (s, 3H), 1.81 (s, 3H). $^{31}$P NMR (162 MHz, CD$_2$Cl$_2$) δ 108.8 (s).

Example 8

Synthesis of C1042

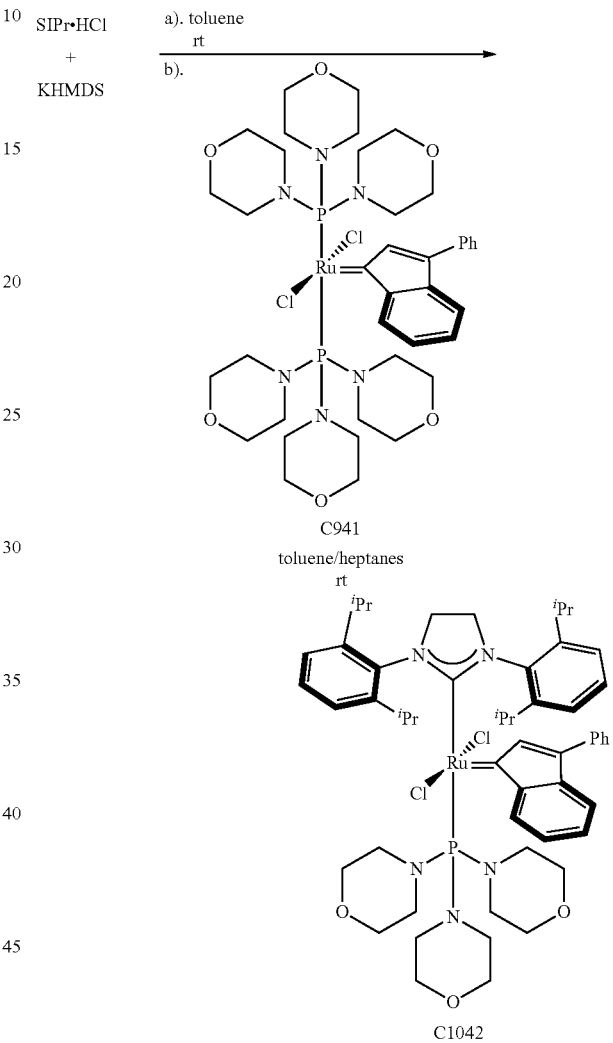

To a 20 mL scintillation vial equipped with a magnetic stir bar was added 1,3-bis(2,6-diisopropylphenyl)-4,5-dihydroimidazolium chloride (0.238 g, 0.558 mmol), potassium bis(trimethylsilyl)amide (0.111 g, 0.558 mmol), and toluene (5 mL). The resulting reaction was allowed to stir for 30 minutes at ambient temperature, filtered through a pad of celite, and combined with C941 (0.500 g, 0.531 mmol) and heptanes (15 mL) in a 40 mL scintillation vial equipped with a magnetic stir bar. The resulting suspension was subsequently stirred for 3 hours at ambient temperature. The resulting precipitate was isolated by filtration, washed with toluene/heptanes (1:4, 2×10 mL) followed by heptanes (10 mL) then dried in vacuum to afford C1042 (0.436 g, 78.7% yield) as a red/brown powder.

$^1$H NMR (400 MHz, CDCl$_3$) δ 8.66 (d, J=7.4 Hz, 1H), 7.64 (d, J=8.3 Hz, 2H), 7.53-7.42 (m, 2H), 7.37 (t, J=6.5 Hz, 4H), 7.23 (t, J=7.5 Hz, 1H), 7.12 (t, J=7.5 Hz, 1H), 7.04 (d,

J=7.2 Hz, 1H), 6.94 (s, 1H), 6.73-6.67 (m, 2H), 6.61-6.56 (m, 1H), 4.27-4.18 (m, 1H), 4.17-3.91 (m, 4H), 3.91-3.81 (m, 1H), 3.59-3.49 (m, 1H), 3.31-3.18 (m, 12H), 3.19-3.10 (m, 1H), 2.93-2.77 (m, 6H), 2.75-2.63 (m, 6H), 1.58 (d, J=6.4 Hz, 3H), 1.53 (d, J=6.4 Hz, 3H), 1.37 (d, J=6.6 Hz, 3H), 1.26 (d, J=6.8 Hz, 3H), 1.22 (d, J=6.8 Hz, 3H), 1.09 (d, J=6.8 Hz, 3H), 0.94 (d, J=6.8 Hz, 3H), 0.82 (d, J=6.6 Hz, 3H). $^{31}$P NMR (162 MHz, CDCl$_3$) δ 102.8 (s).

Example 9

Synthesis of C1050

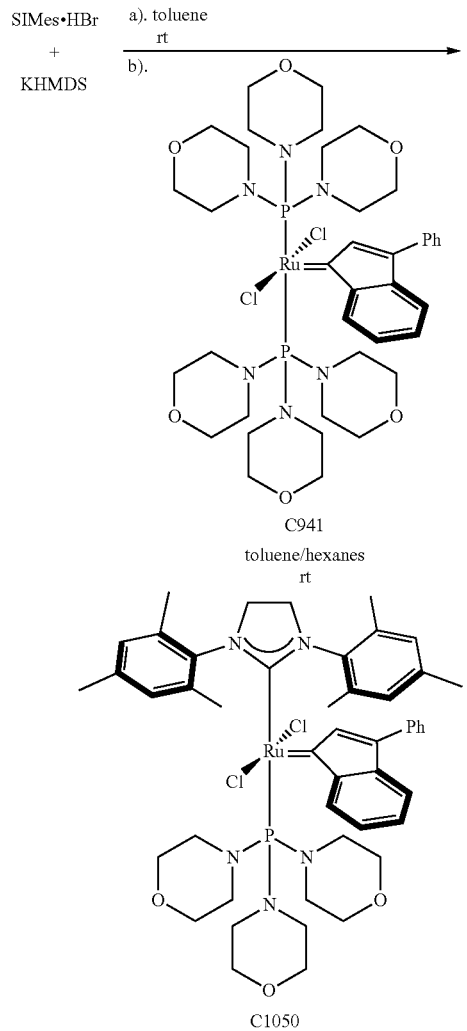

To a 20 mL scintillation vial equipped with a magnetic stir bar were added SIMes.HBr (0.173 mg, 0.446 mmol), KHMDS (0.089 g, 0.446 mmol), and toluene (4 mL). The resulting reaction was allowed to stir for 30 minutes at ambient temperature, then filtered through a pad of celite, and combined with C941 (0.400 g, 0.425 mmol) and hexanes (16 mL) in a 40 mL scintillation vial equipped with a magnetic stir bar. The resulting suspension was subsequently stirred for 4 hours at ambient temperature. The resulting precipitate was isolated by filtration, washed with toluene/hexanes (1:5, 2×10 mL) followed by hexanes (10 mL) then dried in vacuum to afford C1050 as a red/brown powder (0.406 g, 91.0% yield).

$^1$H NMR (400 MHz, CD$_2$Cl$_2$) δ 8.41 (d, J=7.5 Hz, 1H), 7.70 (d, J=7.8 Hz, 2H), 7.54 (t, J=7.2 Hz, 1H), 7.43 (t, J=7.6 Hz, 2H), 7.30-7.20 (m, 4H), 7.20-7.10 (m, 4H), 7.09-6.98 (m, 3H), 6.42 (s, 1H), 5.99 (s, 1H), 4.07-3.97 (m, 2H), 3.91-3.72 (m, 2H), 3.24 (s, 12H), 2.79 (s, 12H), 2.71 (s, 3H), 2.67 (s, 3H), 2.36 (s, 3H), 2.34 (s, 3H), 2.17 (s, 3H), 2.10 (s, 3H), 1.81 (s, 3H). $^{31}$P NMR (162 MHz, CD$_2$Cl$_2$) δ 108.9 (s).

Example 10

Synthesis of C947

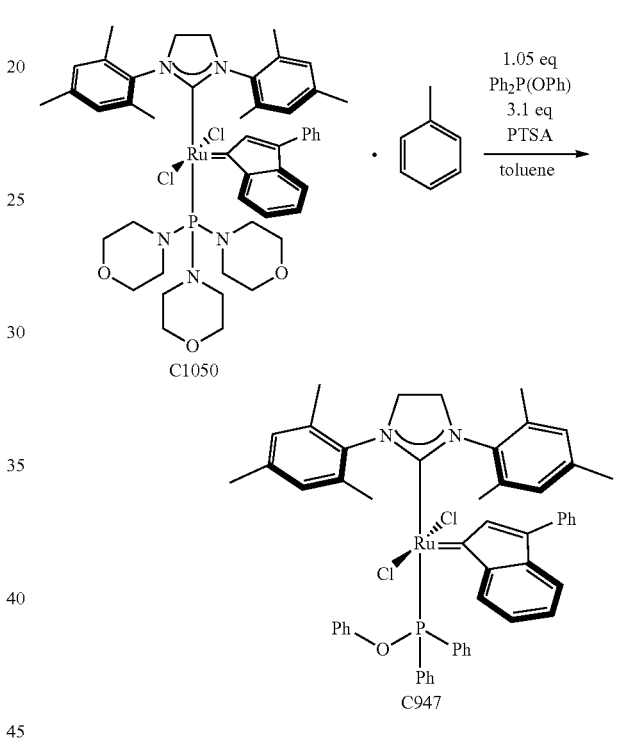

To a 20 mL scintillation vial equipped with a magnetic stir bar were added C1050 (0.300 g, 0.286 mmol), phenoxydiphenylphosphine ([CAS 13360-92-4] 0.057 g, 0.300 mmol), PTSA (0.169 g, 0.886 mmol) and toluene (5 mL). The resulting reaction was allowed to stir for 60 minutes at ambient temperature, then it was filtered through a plug of silica gel, devolatilized and the resulting residue was recrystallized from toluene/heptanes at −35° C. The red/brown crystals were isolated by filtration, washed with toluene/heptanes (1:5, 2×10 mL) followed by heptanes (5 mL) then dried in vacuum to afford C947 (0.228 g, 84.2% yield).

$^1$H NMR (400 MHz, CD$_2$Cl$_2$) δ 8.18 (d, J=7.5 Hz, 1H), 7.58 (d, J=7.7 Hz, 2H), 7.54 (t, J=7.4 Hz, 1H), 7.40 (t, J=7.6 Hz, 2H), 7.27-7.11 (m, 7H), 7.08-7.00 (m, 7H), 6.97 (d, J=7.3 Hz, 1H), 6.82 (t, J=7.8 Hz, 2H), 6.71 (t, J=7.3 Hz, 1H), 6.63 (s, 1H), 6.54 (d, J=8.3 Hz, 2H), 6.45 (s, 1H), 6.07 (s, 1H), 4.19-4.04 (m, 2H), 4.00-3.78 (m, 2H), 2.71 (s, 3H), 2.67 (s, 3H), 2.43 (s, 3H), 2.26 (s, 3H), 1.99 (s, 3H), 1.79 (s, 3H). $^{31}$P NMR (162 MHz, CD$_2$Cl$_2$) δ 127.9 (s).

Example 11

Synthesis of C609

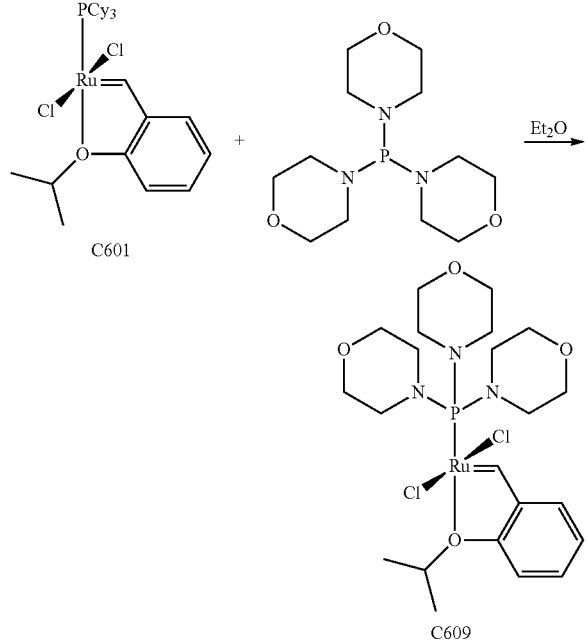

To a 40 mL scintillation vial equipped with a magnetic stir bar was added C601 (0.500 g, 0.833 mmol), 4,4",4'"-phosphinidyntrismorpholine ([CAS 5815-61-2] 0.361 g, 1.25 mmol), and diethyl ether (20 mL). The resulting reaction was allowed to stir for 4 hours at 35° C. then cooled to ambient temperature. The resulting precipitate was isolated by filtration, washed with diethyl ether (2×10 mL), and dried in vacuum to afford C609 (0.420 g, 82.8% yield) as a pale red/brown powder.

$^1$H NMR (400 MHz, C$_6$D$_6$) δ 16.69 (d, J=5.0 Hz, 1H), 7.36 (d, J=7.4 Hz, 1H), 7.20 (t, J=7.4 Hz, 1H), 6.82 (t, J=7.4 Hz, 1H), 6.59 (d, J=8.2 Hz, 1H), 4.81-4.70 (m, 1H), 3.52 (br s, 12H), 3.10 (br s, 12H), 1.72 (d, J=6.1 Hz, 6H). $^{31}$P NMR (162 MHz, C$_6$D$_6$) δ 120.3 (s). $^{31}$P NMR (162 MHz, CD$_2$Cl$_2$) δ 119.7 (s).

Example 12

Synthesis of C591

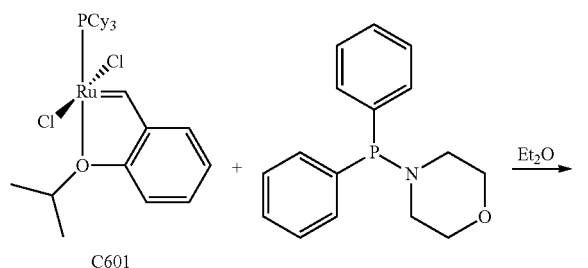

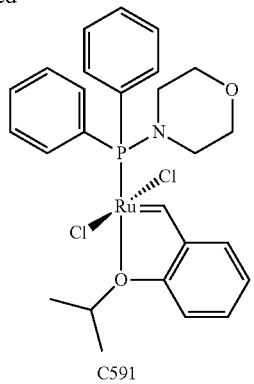

To a 40 mL scintillation vial equipped with a magnetic stir bar was added C601 (0.500 g, 0.833 mmol), 4-(diphenylphosphino)morpholine (0.294 g, 1.08 mmol), and diethyl ether (20 mL). The resulting reaction was allowed to stir for 4 hours at 30° C. The resulting precipitate was isolated by filtration, washed with diethyl ether (2×10 mL), and dried in vacuum to afford C591 (0.302 g, 61.4% yield) as a pale red/brown powder.

$^1$H NMR (400 MHz, CDCl$_3$) δ 16.62 (d, J=5.8 Hz, 1H), 7.82-7.70 (m, 4H), 7.61 (t, J=7.8 Hz, 1H), 7.56 (d, J=7.6 Hz, 1H), 7.52-7.39 (m, 6H), 7.16 (d, J=8.5 Hz, 1H), 7.08 (t, J=7.5 Hz, 1H), 5.43-5.33 (m, 1H), 3.75-3.62 (m, 4H), 3.18 (m, 4H), 1.85 (d, J=6.1 Hz, 6H). $^{31}$P NMR (162 MHz, CDCl$_3$) δ 109.5 (s).

Example 13

Synthesis of C600

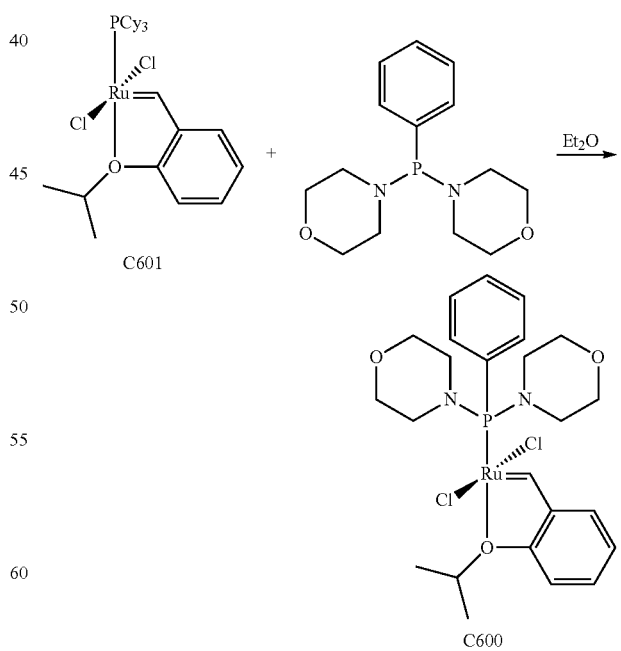

To a 40 mL scintillation vial equipped with a magnetic stir bar was added C601 (0.500 g, 0.833 mmol), 4,4'-(phenylphosphinidene)bismorpholine (0.303 g, 1.08 mmol), and diethyl ether (20 mL). The resulting reaction was allowed to stir for 4 hours at 30° C. The resulting precipitate was isolated by filtration, washed with diethyl ether (2×10 mL), and dried in vacuum to afford C600 (0.422 g, 84.4% yield) as a pale red/brown powder.

$^1$H NMR (400 MHz, CDCl$_3$) δ 16.59 (d, J=5.2 Hz, 1H), 7.86-7.76 (m, 2H), 7.61 (t, J=8.0 Hz, 1H), 7.55 (d, J=7.6 Hz, 1H), 7.50-7.40 (m, 3H), 7.15 (d, J=8.4 Hz, 1H), 7.08 (t, J=7.6 Hz, 1H), 5.41-5.30 (m, 1H), 3.80-3.60 (m, 8H), 3.41-3.29 (m, 4H), 3.26-3.15 (m, 4H), 1.84 (d, J=6.2 Hz, 6H). $^{31}$P NMR (162 MHz, CDCl$_3$) δ 125.9 (br s).

Example 14

Synthesis of C590

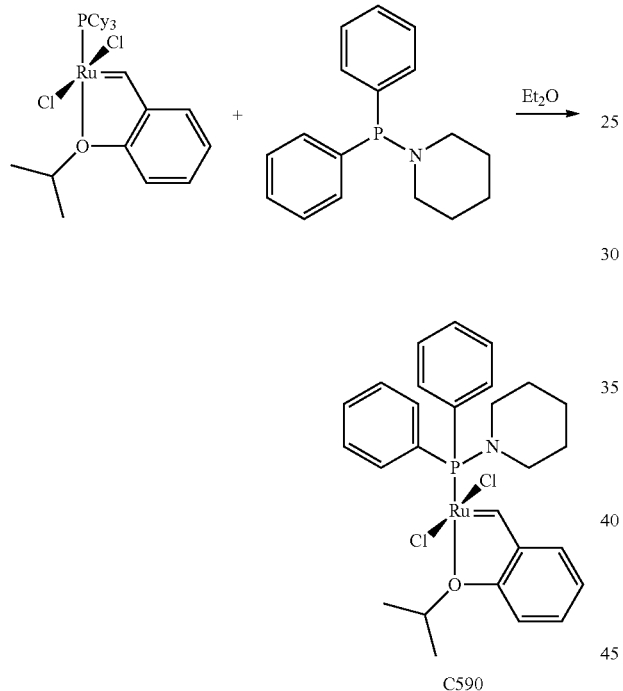

To a 40 mL scintillation vial equipped with a magnetic stir bar was added C601 (0.500 g, 0.833 mmol), 1-(diphenylphosphino)piperidine ([CAS 22859-54-7] 0.292 g, 1.08 mmol), and diethyl ether (20 mL). The resulting reaction was allowed to stir for 14 hours at 30° C. The resulting precipitate was isolated by filtration, washed with diethyl ether (2×10 mL), and then dissolved in a minimal amount of dichloromethane (4 mL). The solution was filtered through a pad of celite then hexanes (30 mL) was slowly added to afford a red precipitate. The solid was isolated by filtration, washed with hexanes (2×10 mL), and dried in vacuum to afford C590 (0.191 g, 38.9% yield) as a red solid.

$^1$H NMR (400 MHz, CDCl$_3$) δ 16.70 (d, J=5.7 Hz, 1H), 7.80-7.70 (m, 4H), 7.59 (t, J=7.8 Hz, 1H), 7.55 (d, J=7.7 Hz, 1H), 7.50-7.37 (m, 6H), 7.15 (d, J=8.4 Hz, 1H), 7.07 (t, J=7.5 Hz, 1H), 5.42-5.31 (m, 1H), 3.20-3.08 (m, 4H), 1.86 (d, J=6.1 Hz, 6H), 1.66-1.50 (m, 6H). $^{31}$P NMR (162 MHz, CDCl$_3$) δ 107.9 (s).

Example 15

Synthesis of C627 from C591

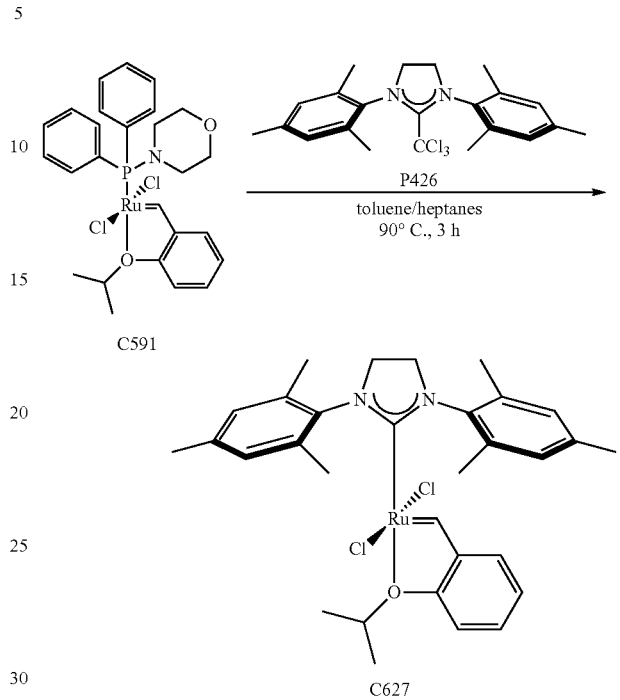

To a 40 mL scintillation vial equipped with a magnetic stir bar was added C591 (0.250 g, 0.423 mmol), P426 (0.216 g, 0.507 mmol), and 10% toluene/heptanes (v/v) (10 mL). The resulting reaction was heated to 90° C. for 5 hr. The resulting precipitate was isolated by filtration, washed with hexanes (2×10 mL) followed by methanol (2×10 mL), then dried in vacuum to afford C627 (0.146 g, 55.0% yield) as a green solid. The NMR data correspond to the data reported in the literature.

Example 16

Synthesis of C627 from C1050

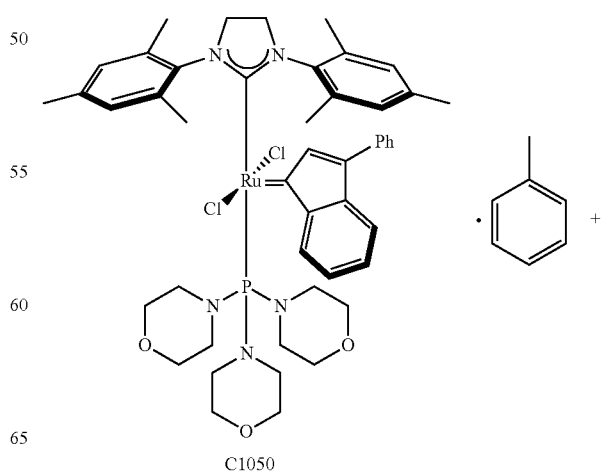

-continued

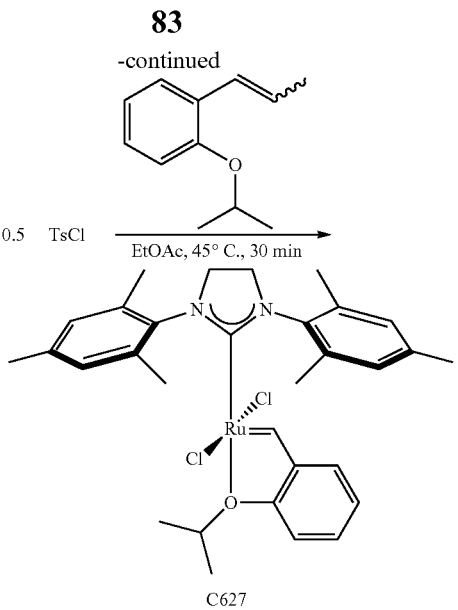

C627

To a 40 mL scintillation vial equipped with a magnetic stir bar was added C1050 (0.5 g, 0.5 mmol), 2-isopropoxy--methylstyrene (0.18 g, 1.02 mmol), DCM (5 mL), and tosyl chloride (0.11 g, 0.57 mmol). The resulting reaction was heated to 60° C. for 30 min and then concentrated to dryness. The material was triturated with methanol (10 mL) and the resulting green solid was collected on a fritted funnel and washed with methanol (10 mL) followed by hexanes (10 mL) then dried in vacuum to afford C627 (0.268 g, 90% yield) as a green solid. The NMR data correspond to the data reported in the literature.

Example 17

Synthesis of C627 from C940

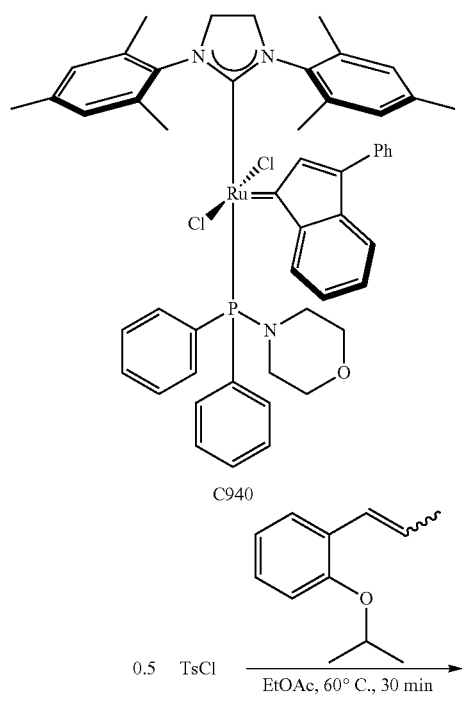

-continued

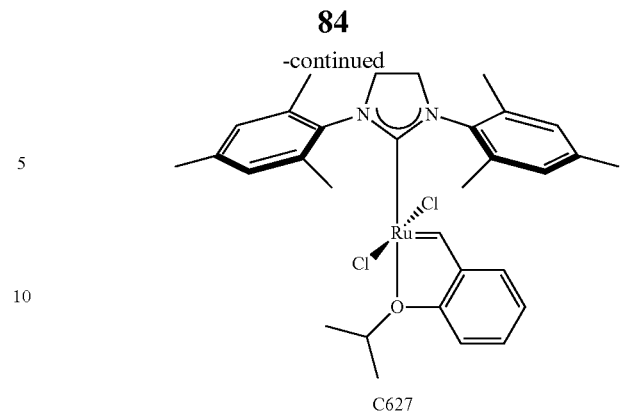

C627

To a 40 mL scintillation vial equipped with a magnetic stirbar was added C940 (0.5 g, 0.53 mmol), 2-iso-propoxy-β-methylstyrene (0.18 g, 1.02 mmol), EtOAc (20 mL), and tosyl chloride (0.11 g, 0.58 mmol). The resulting reaction was heated to 60° C. for 30 min and then concentrated to dryness. The material was triturated with methanol (10 mL) and the resulting green solid was collected on a fritted funnel and washed with methanol (10 mL) followed by hexanes (10 mL) then dried in vacuum to afford C627 (0.177 g, 53% yield) as a green solid. The NMR data corresponded to the data reported in the literature.

Example 18

Synthesis of C627 from C609

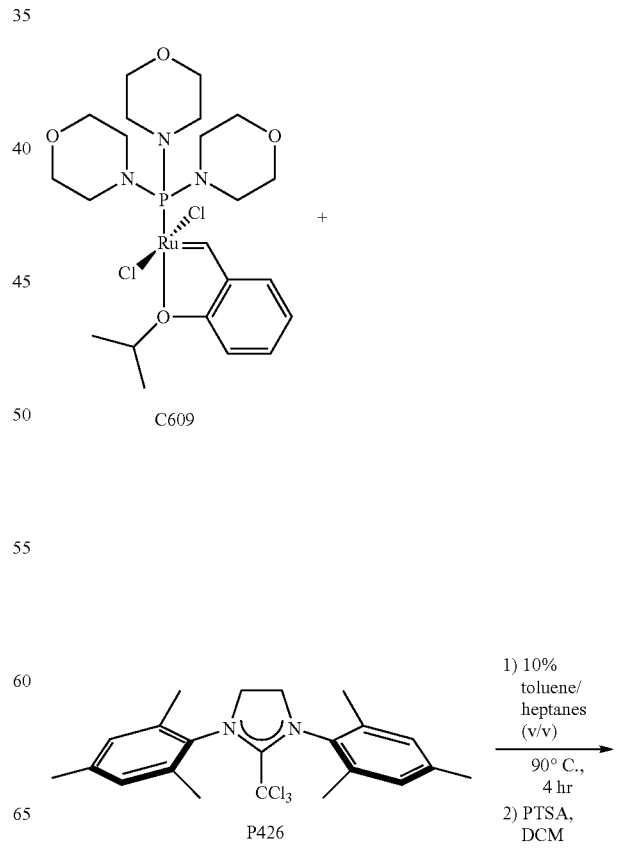

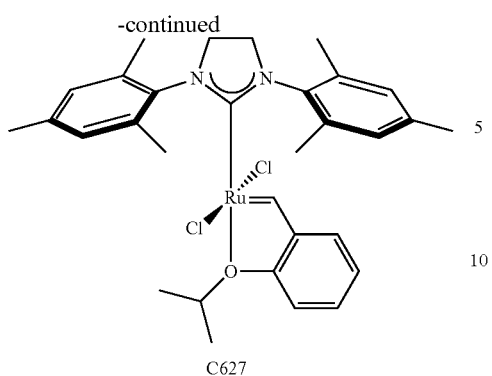

C627

To a 40 mL scintillation vial equipped with a magnetic stir bar was added C609 (1.0 g, 1.64 mmol), P426 (0.805 g, 1.89 mmol), and 10% toluene/heptanes (v/v) (10 mL). The resulting reaction was heated to 90° C. for 3 hr. The resulting precipitate was isolated by filtration and dissolved in DCM (10 mL). PTSA (0.343 g) was added to the solution and allowed to stir at room temperature for 30 min. The reaction mixture was concentrated and the C627 was triturated with MeOH (10 mL). The resulting precipitate was collected on a fritted funnel and washed with methanol (10 mL), then dried in vacuum to afford C627 (0.74 g, 72% yield) as a green solid. The NMR data corresponded to the data reported in the literature.

Example 19

Synthesis of C711 from C591

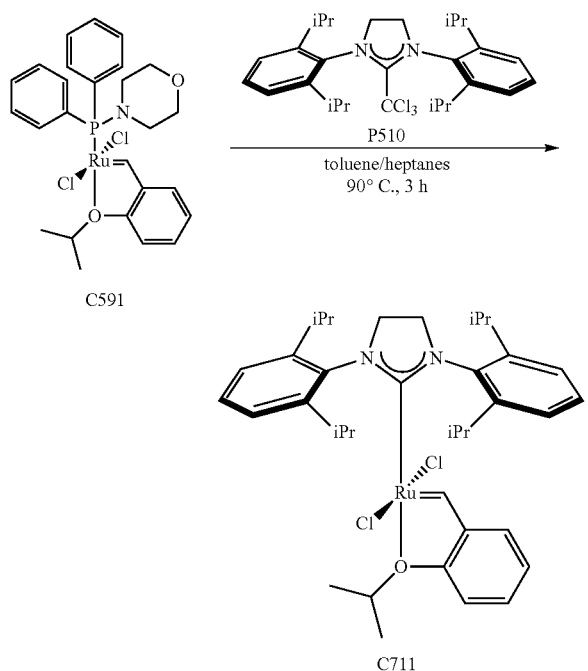

C591

C711

To a 40 mL scintillation vial equipped with a magnetic stir bar was added C591 (0.250 g, 0.423 mmol), P510 (0.259 g, 0.507 mmol), and 10% toluene/heptanes (v/v) (10 mL). The resulting reaction was heated to 90° C. for 5 hr. The resulting precipitate was isolated by filtration, washed with hexanes (2×10 mL) followed by methanol (2×10 mL), then dried in vacuum to afford C711 (0.224 g, 74.5% yield) as a green solid. The NMR data corresponded to the data reported in the literature.

Example 20

Synthesis of C627 from C609

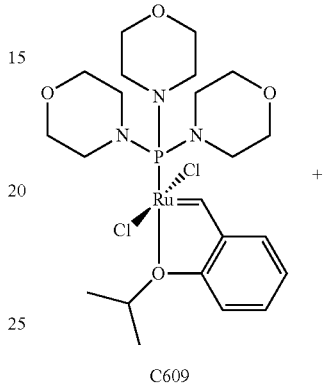

C609

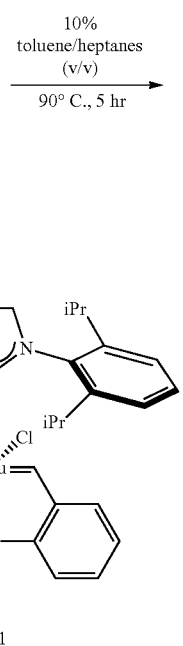

P510

C711

To a 40 mL scintillation vial equipped with a magnetic stir bar was added C609 (1.0 g, 1.64 mmol), P510 (1.0 g, 1.96 mmol), and 10% toluene/heptanes (v/v) (10 mL). The resulting reaction was heated to 90° C. for 5 hr. The resulting precipitate was isolated by filtration, washed with hexanes (2×10 mL) followed by methanol (2×10 mL), then dried in vacuum to afford C711 (0.64 g, 54.8% yield) as a green solid. The NMR data corresponded to the data reported in the literature.

Example 21

Synthesis of C829

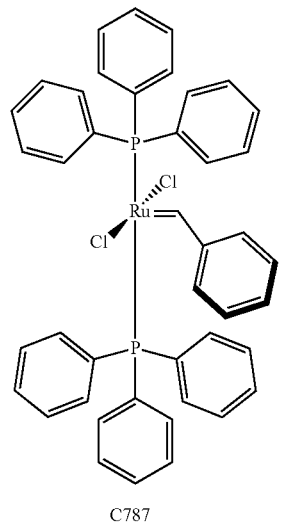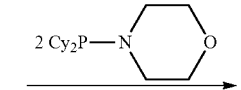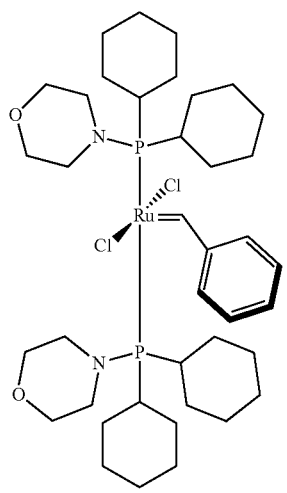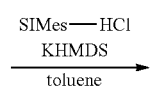

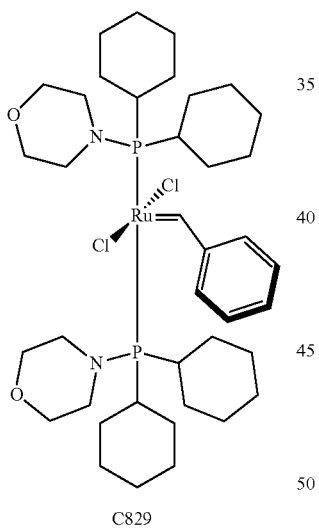

C829

Figure 9:
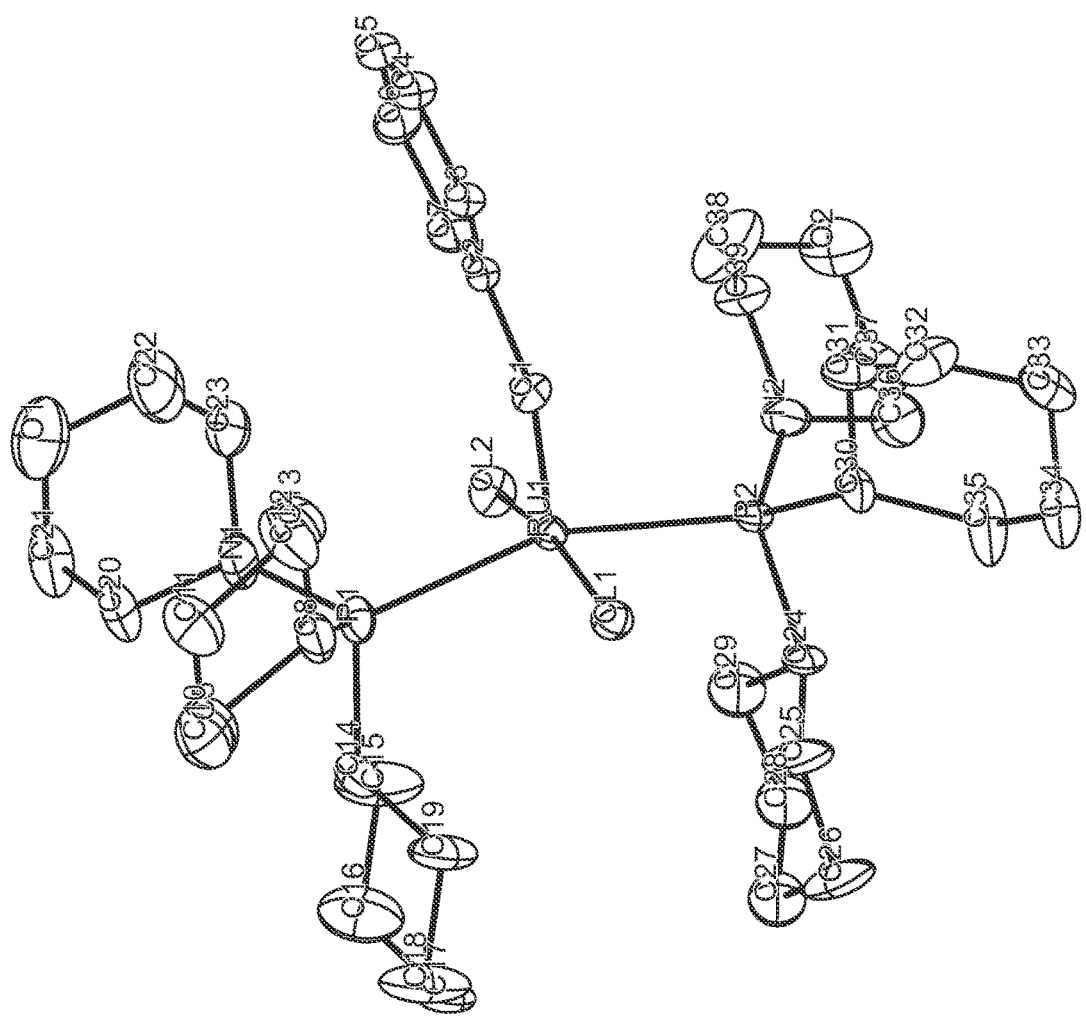
FIG. 9. Oak Ridge Thermal Ellipsoid Plot (ORTEP) diagram of C829.

To a THF solution (5 mL) of C787 (215 mg, 0.273 mmol) was added a THF solution (3 mL) of Cy$_2$P(morph) (309.8 mg, 1.093 mmol) at r.t. The mixture was allowed to stir at ambient temperature for 15 min, leading to the quantitative formation of C829 as monitored in situ by $^{31}$P NMR spectroscopy. The solvent was then removed under reduced pressure to afford a sticky solid. To this solid was added n-pentane (3×10 mL), and the resulting solid was removed by filtration. The combined n-pentane solutions were slowly concentrated by vapor diffusion into hexamethyldisiloxane at r.t. over 12 h, affording purple crystals of C829 (80 mg, 35%) which were isolated by filteration, washed with cold n-pentane, and dried under vacuum. FIG. 9 shows the ORTEP diagram of C829.

$^1$H NMR (300 MHz; C$_6$D$_6$): δ 20.52 (s, 1H), 8.47 (d, 2H, J$_{H-H}$=10.6 Hz), 7.16 (t, 1H, J$_{H-H}$=7.2 Hz), 7.00 (t, 2H, J$_{H-H}$=7.5 Hz), 3.53 (t, 8H, J$_{H-H}$=3.8 Hz), 2.82-2.76 (m, 8H), 1.98-1.12 (m, 44H). $^{31}$P NMR (121 MHz; C$_6$D$_6$): δ 95.7 (s).

Example 22

Synthesis of C852

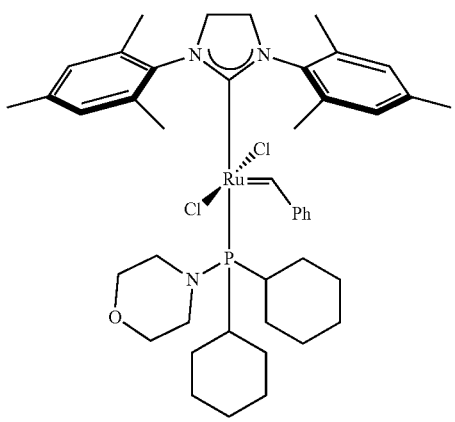

C852

Figure 3:
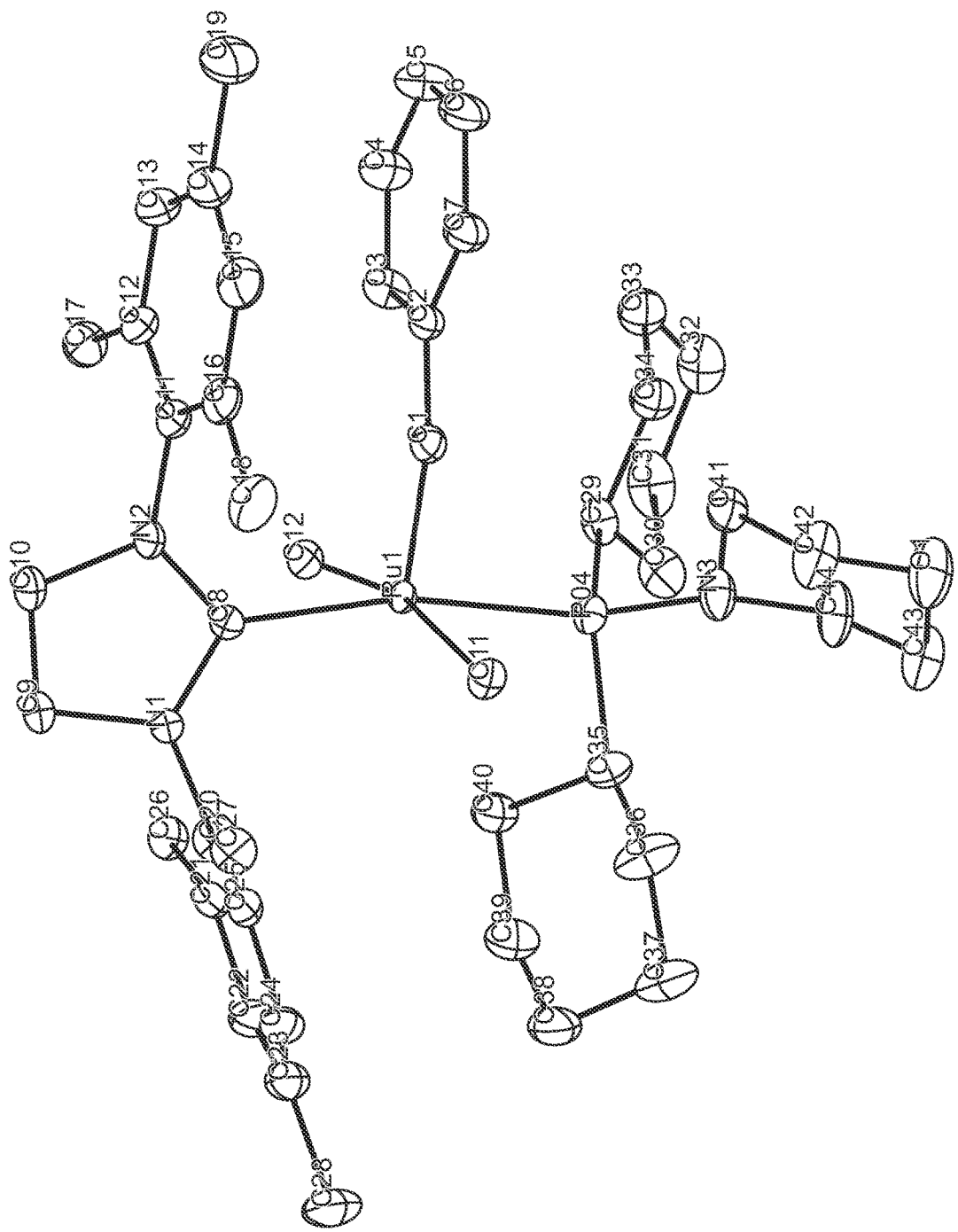
FIG. 3. Oak Ridge Thermal Ellipsoid Plot (ORTEP) diagram of C852.

To a toluene solution (2 mL) of SIMes-HCl (34.7 mg, 0.101 mmol) was added solid KHMDS (20.2 mg, 0.101 mmol). The resulting mixture was allowed to stir at r.t. for 15 min, and then transferred into a toluene solution (5 mL) of C829 (79.8 mg, 0.096 mmol). The reaction was warmed up to 65° C. for 12 h. The resulting suspension was then passed through a short plug of Celite to remove the unwanted solid. All volatiles were removed under reduced pressure, affording a brown solid which was washed with cold n-pentane (10 mL). Further recrystallization from THF/pentane yielded brown/pink crystals of C852 (50 mg, 61%). FIG. 3 shows the ORTEP diagram of C852.

$^1$H NMR (300 MHz; $C_6D_6$): δ 19.56 (s, 1H), 9.13 (bs, 2H), 7.11-6.90 (m, 5H), 6.10 (bs, 2H), 3.45 (t, 4H, $J_{H-H}$=4.3 Hz), 3.31-0.75 (m, 48H). $^{31}$P NMR (121 MHz; $C_6D_6$): δ 92.2 (s).

Example 23

Synthesis of C807

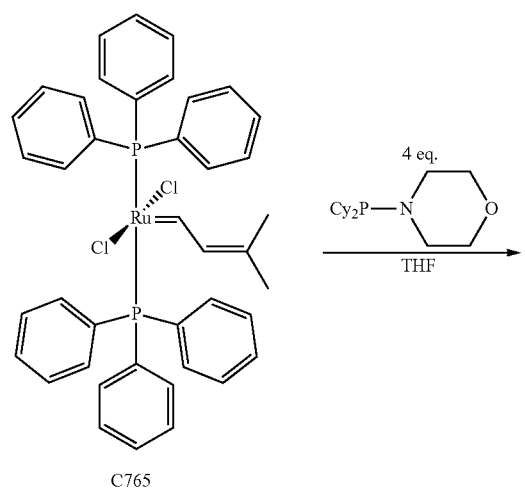

C765

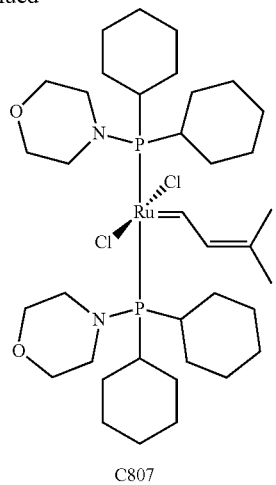

C807

To a THF solution (6 mL) of C765 (250 mg, 0.327 mmol) was added a THF solution (6 mL) of Cy$_2$P(morph) (370.6 mg, 1.308 mmol) at ambient temperature. The mixture was allowed to stir at ambient temperature for 15 min, leading to the quantitative formation of C807 as monitored in situ by $^{31}$P NMR spectroscopy. The solvent was then removed under reduced pressures to afford a brown oil. To this oil was added n-pentane (45 mL). The mixture was stirred at r.t. for 30 min, and the resulting solid was removed by filtration. The n-pentane solution was concentrated to ~20 mL, and allowed to stand at −30° C. for 12 h, affording purple crystals of C807 (74 mg, 28%) which were isolated by filtration, washed with cold n-pentane, and dried under vacuum.

$^1$H NMR (300 MHz; $C_6D_6$): δ 19.81 (d, 1H, $J_{H-H}$=11.2 Hz), 8.08 (d, 1H, $J_{H-H}$=11.2 Hz), 3.60 (t, 8H, $J_{H-H}$=3.7 Hz), 2.94 (t, 8H, $J_{H-H}$=3.7 Hz), 2.07-0.91 (m, 54H). $^{31}$P NMR (121 MHz; $C_6D_6$): δ 95.3 (s).

Example 24

Synthesis of C830

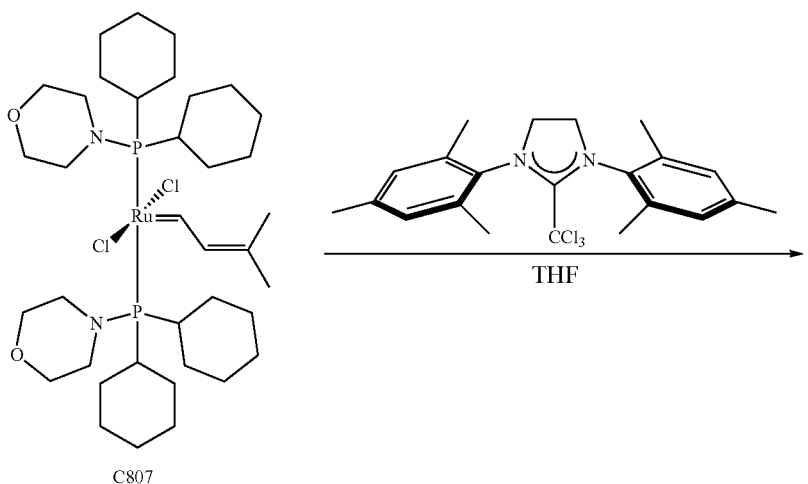

C807

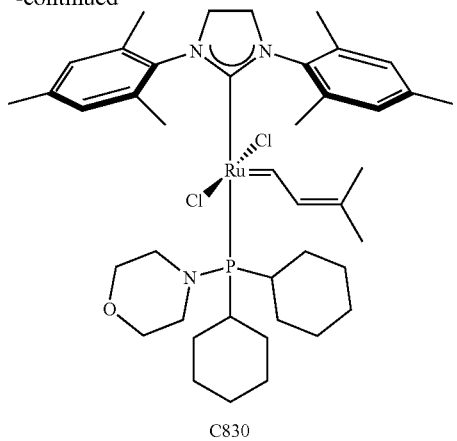

C830

To a THF solution (2 mL) of C807 (50 mg, 0.062 mmol) was added a THF solution (2 mL) of SIMes-CHCl₃ (26.4 mg, 0.062 mmol). The reaction was warmed up to 65° C. for 2 h. During the course of the reaction, the color changed from purple to brown. All volatiles were removed under reduced pressures, affording a brown solid. To this solid was added n-pentane (3×10 mL), and the resulting solid was removed by filtration. The combined n-pentane solution was slowly concentrated by vapor diffusion into hexamethyldisiloxane at r.t. over 12 h, affording brown crystals of C830 (18 mg, 35%) which were isolated by filteration, washed with Et₂O, and dried under vacuum.

$^1$H NMR (300 MHz; C₆D₆): δ 19.03 (d, 1H, $J_{H\text{-}H}$=11.3 Hz), 7.68 (d, 1H, $J_{H\text{-}H}$=11.3 Hz), 6.85 (s, 2H), 6.57 (s, 2H), 3.53 (t, 4H, $J_{H\text{-}H}$=2.9 Hz), 2.74 (s, 6H), 2.50 (s, 6H), 2.15 (s, 3H), 1.97 (s, 3H), 1.07-0.92 (m, 36H). $^{31}$P NMR (121 MHz; C₆D₆): δ 90.3 (s).

Example 25

Synthesis of C803

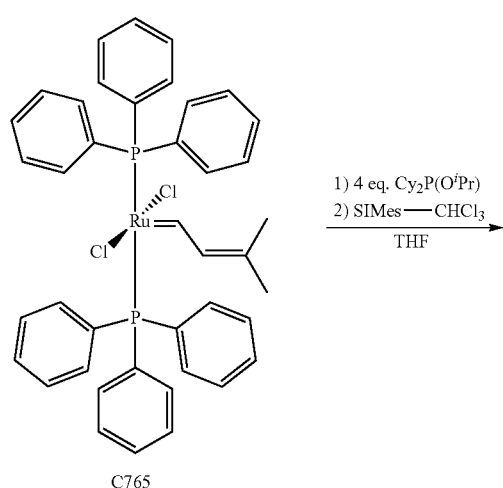

C765

1) 4 eq. Cy₂P(O$^i$Pr)
2) SIMes—CHCl₃
THF
→

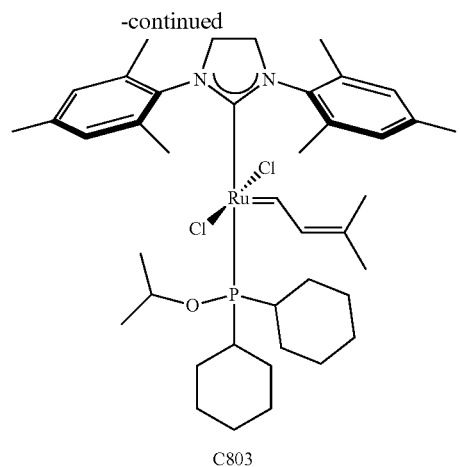

C803

Figure 4:
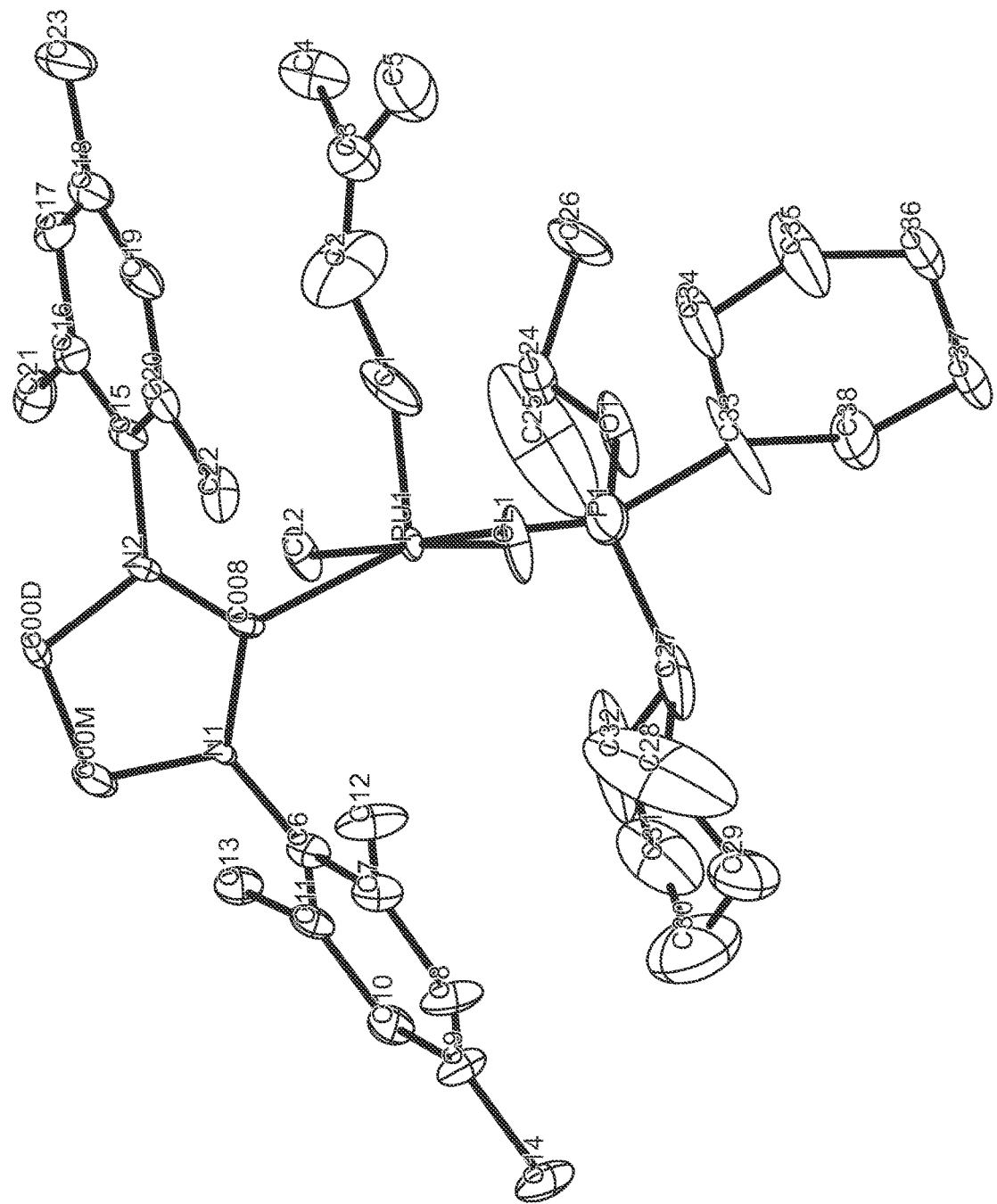
FIG. 4. Oak Ridge Thermal Ellipsoid Plot (ORTEP) diagram of C803.
Figure 5:
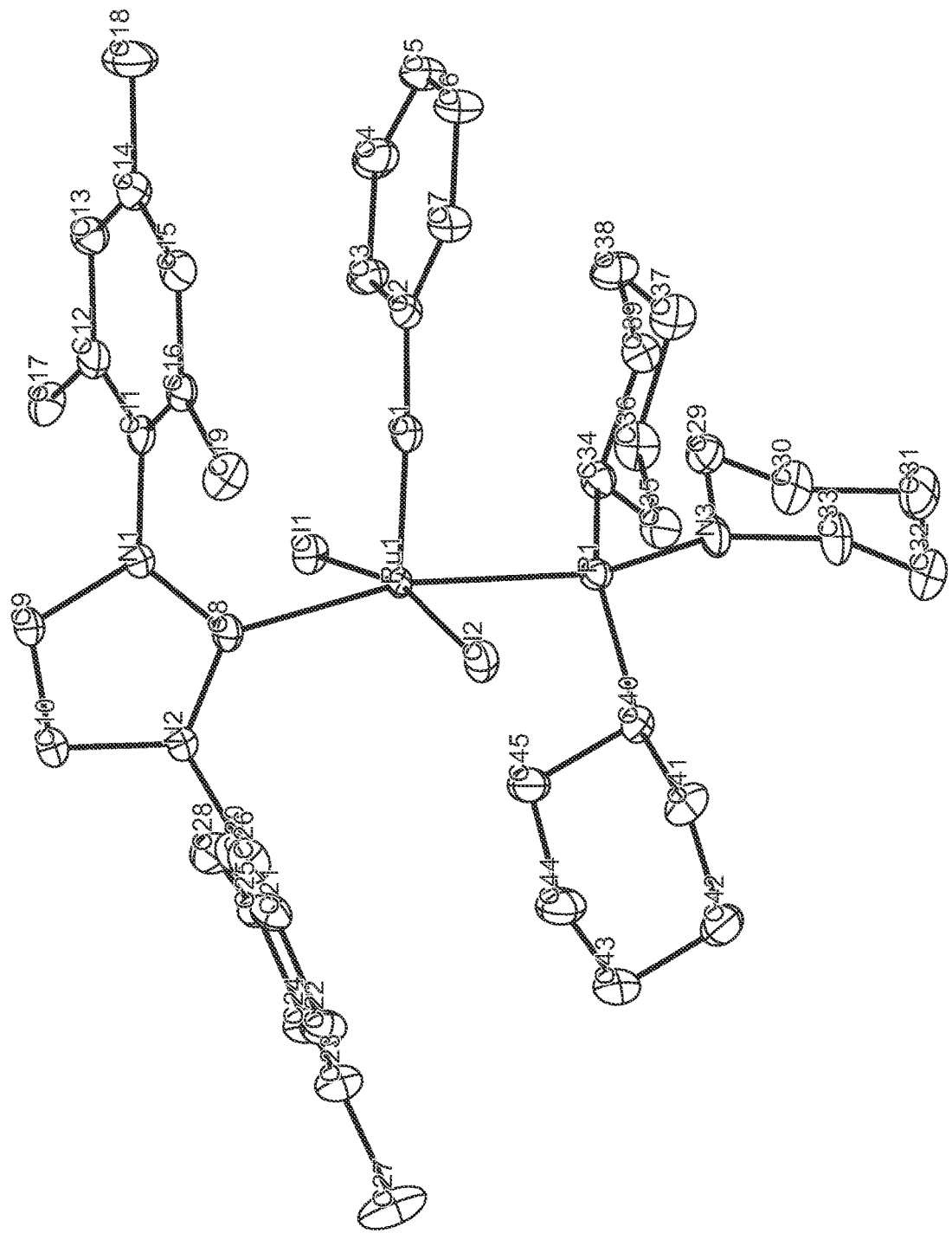
FIG. 5. Oak Ridge Thermal Ellipsoid Plot (ORTEP) diagram of C850.
Figure 6:
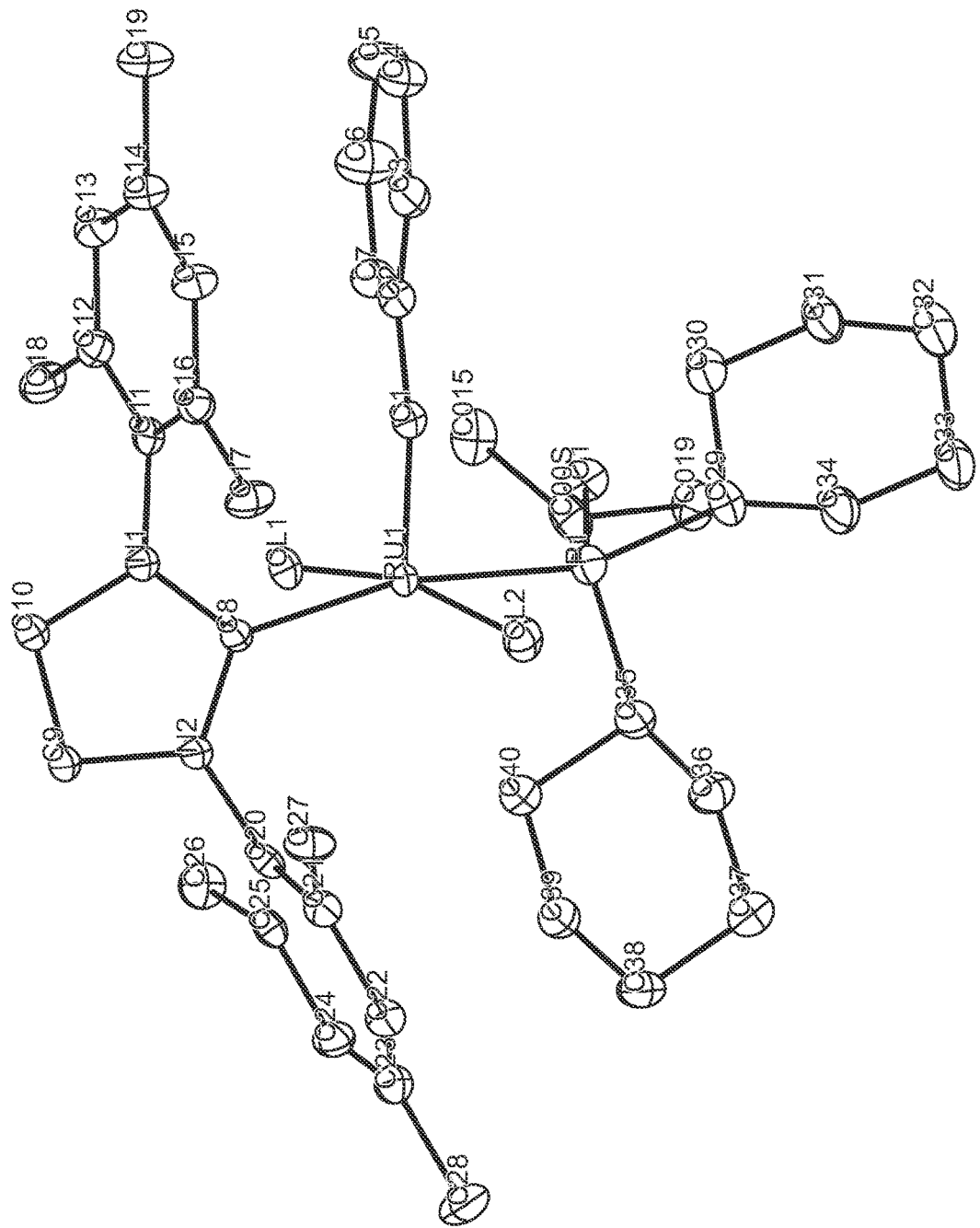
FIG. 6. Oak Ridge Thermal Ellipsoid Plot (ORTEP) diagram of C825.
Figure 7:
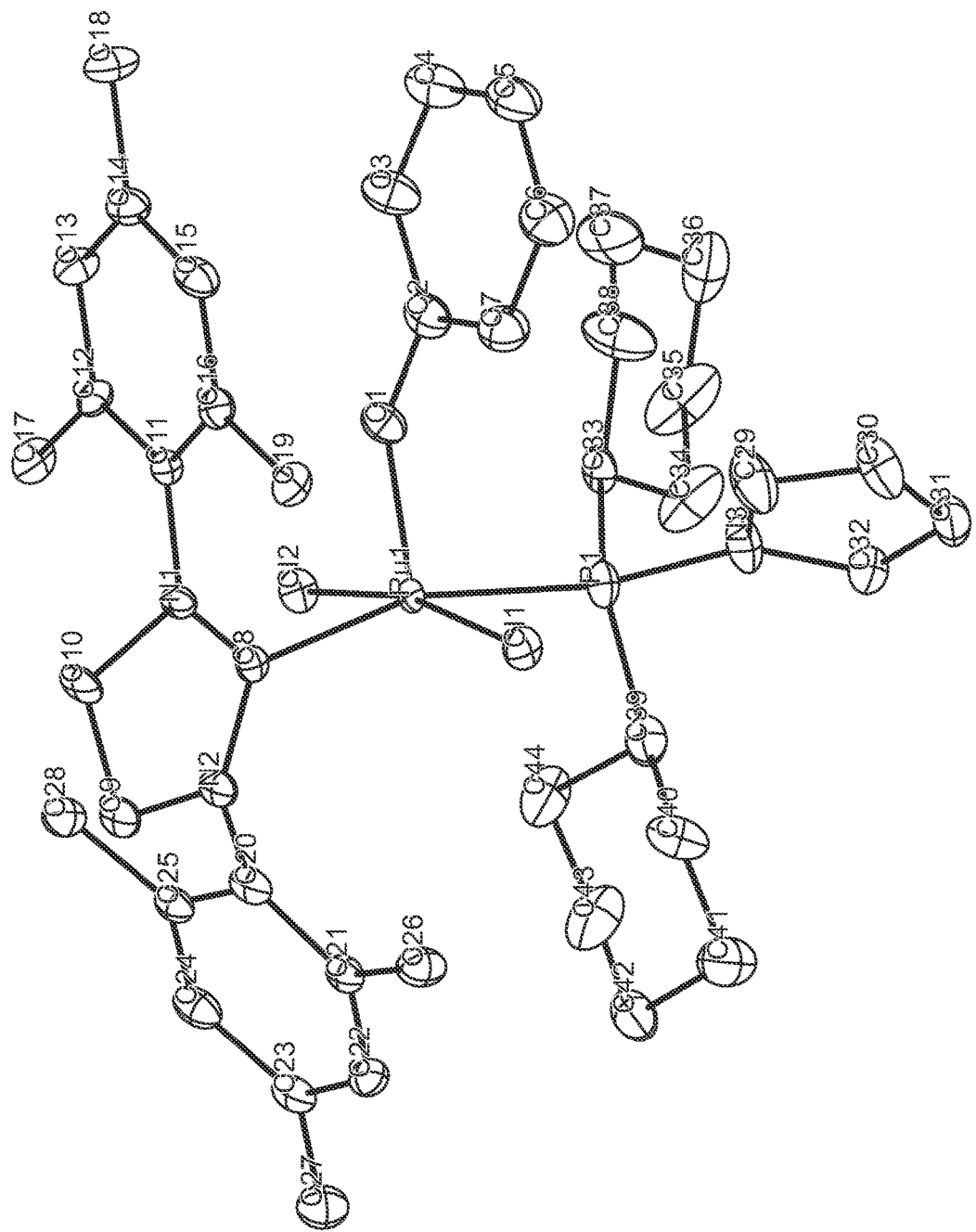
FIG. 7. Oak Ridge Thermal Ellipsoid Plot (ORTEP) diagram of C832.
Figure 8:
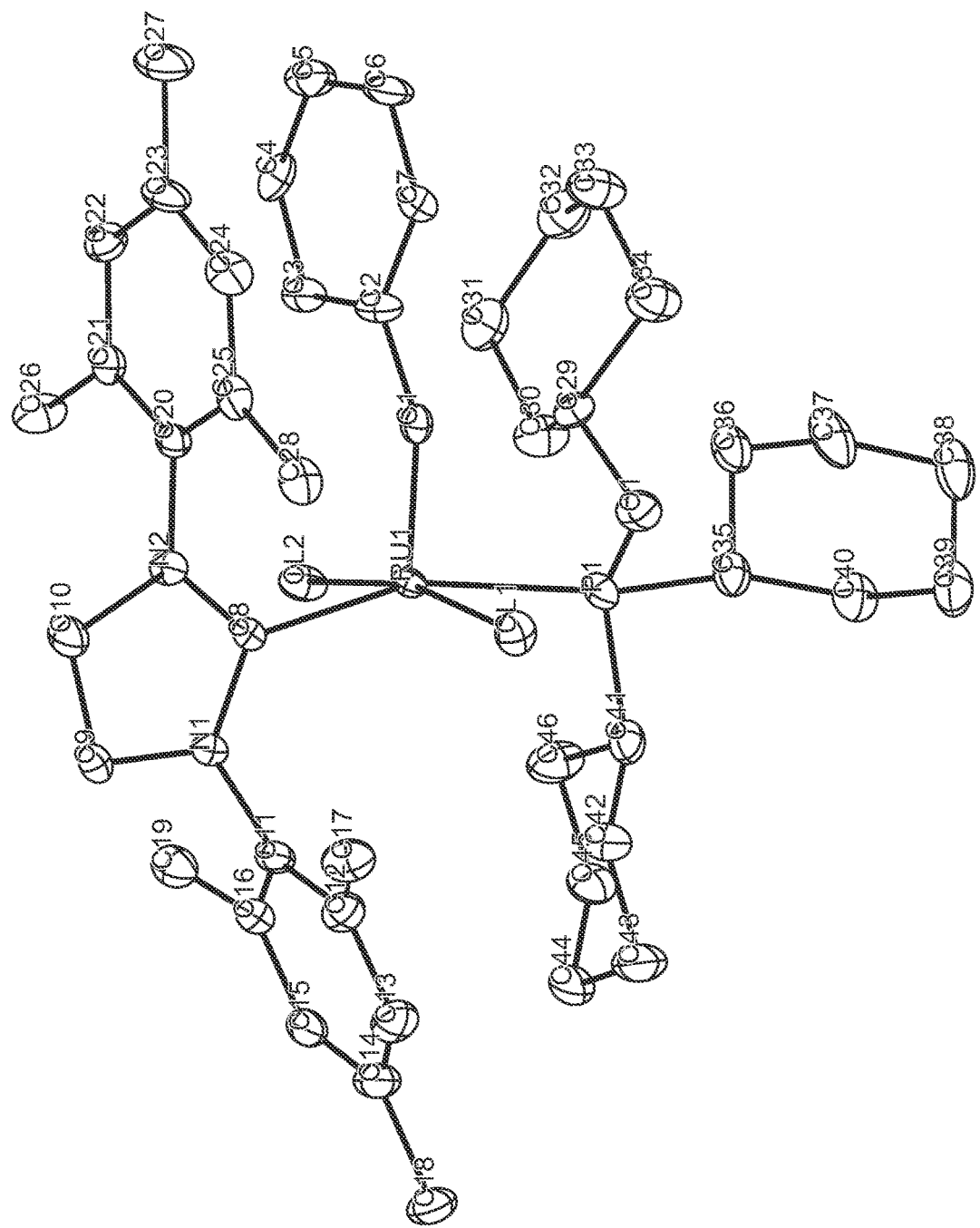
FIG. 8. Oak Ridge Thermal Ellipsoid Plot (ORTEP) diagram of C865.

To a THF solution (3 mL) of C765 (100 mg, 0.131 mmol) was added a THF solution (3 mL) of Cy₂P(O$^i$Pr) ([CAS 65796-69-2]134.1 mg, 0.523 mmol) at ambient temperature. The mixture was allowed to stir at ambient temperature for 15 min, leading to the quantitative formation of the bis-phosphinite complex as monitored in situ by $^{31}$P NMR spectroscopy (143.6 ppm). To this solution was added a THF solution (2 mL) of SIMes-CHCl₃ (55.7 mg, 0.131 mmol). The resulting mixture was allowed to reflux at 65° C. for 2 h. The solvent was then removed under reduced pressures to afford a brown solid. To this solid was added n-pentane (10 mL). The mixture was stirred at r.t. for 5 min, and the resulting solid was removed by filtration. Slow evaporation of the n-pentane filtrate afforded brown crystals of C803 (71 mg, 68%) which were isolated by filteration, washed with cold n-pentane, and dried under vacuum. FIG. 4 shows the ORTEP diagram of C803.

$^1$H NMR (300 MHz; $C_6D_6$): δ 18.94 (d, 1H, $J_{H-H}$=11.2 Hz), 7.57 (d, 1H, $J_{H-H}$=11.2 Hz), 6.84 (s, 2H), 6.58 (s, 2H), 3.24-3.15 (m, 3H), 2.77 (s, 6H), 2.50 (s, 6H), 2.12 (s, 3H), 1.98 (s, 3H), 1.66-0.90 (m, 18H). $^{31}$P NMR (121 MHz; $C_6D_6$): δ 151.0 (s).

Example 26

Synthesis of Olefin Metathesis Catalysts Represented by Formula (XI)

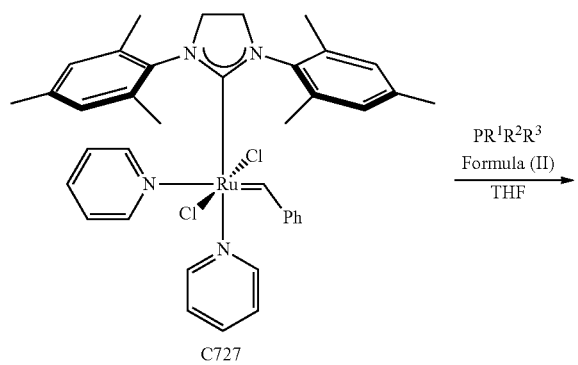

C727

$\xrightarrow{\text{PR}^1\text{R}^2\text{R}^3 \text{ Formula (II)}}{\text{THF}}$

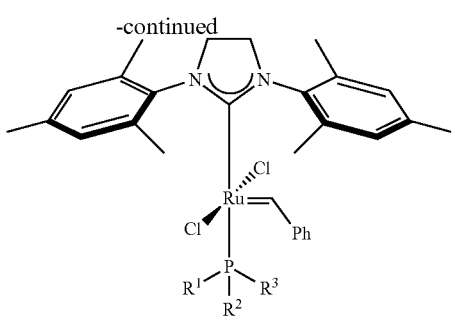

Formula (XI)
when $X^3$ = Ph
$R^5 = R^6$ = Mes

To a THF solution (2 mL) of the bispyridine complex C727 (100 mg, 0.138 mmol) was added 1.2 equivalent (0.165 mmol) of the corresponding $PR^1R^2R^3$ ligand of Formula (II) in THF (1 mL). The resulting mixture was stirred at r.t. for 20 min. All volatiles were then removed under reduced pressures. Addition of pentane or diethyl ether led to a pink precipitate of the desired complex which was isolated by filtration and dried under vacuum.

The olefin metathesis catalysts synthesized according to the procedure described in Example 26 are disclosed in Table 6. FIGS. 5, 6, 7, and 8 show the ORTEP diagrams of C850, C825, C832, and C865, respectively.

TABLE 6

| Olefin metathesis catalyst $R^1\overset{\big|}{\underset{R^2}{P}}R^3$ | Quantity (mg) | Yield (%) | δ $^1$H NMR (300 MHz; $C_6D_6$) | δ $^{31}$P NMR (121 MHz; $C_6D_6$) |
|---|---|---|---|---|
| C852 | 110 | 94 | 19.56 (s, 1H), 9.13 (bs, 2H), 7.11-6.90 (m, 5H), 6.10 (bs, 2H), 3.45 (t, 4H, $J_{H-H}$ = 4.3 Hz), 3.31-0.75 (m, 48H) | 92.2 (s) |
| C855 | 79 | 67 | 19.30 (s, 1H), 8.03 (bs, 2H), 7.10-6.88 (m, 5H), 6.17 (bs, 2H), 3.27 (t, 16H, $J_{H-H}$ = 3.8 Hz), 2.75 (s, 6H), 2.69-2.67 (m, 12H), 2.35 (s, 6H), 1.77 (s, 3H). | 131.9 (s) |
| C858 | 103 | 87 | 19.44 (s, 1H), 7.96 (bs, 2H), 7.00-6.92 (m, 5H), 6.15 (bs, 2H), 3.27-0.72 (m, 46H). | 116.9 (s) |

TABLE 6-continued
| Olefin metathesis catalyst 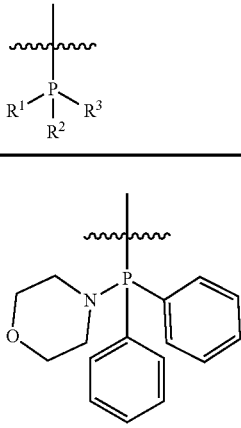 | Quantity (mg) | Yield (%) | δ ¹H NMR (300 MHz; C₆D₆) | δ ³¹P NMR (121 MHz; C₆D₆) |
|---|---|---|---|---|
| C840 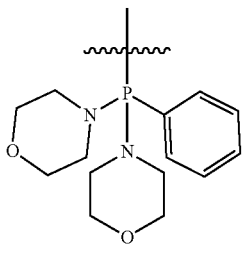 | 110 | 95 | 19.32 (s, 1H), 7.71 (d, 2H, $J_{H-H}$ = 8.5 Hz), 7.37 (t, 4H, $J_{H-H}$ = 7.5 Hz), 7.05-6.95 (m, 7H), 6.77 (t, 2H, $J_{H-H}$ = 7.5 Hz), 6.72 (s, 2H), 6.19 (s, 2H), 3.44-3.26 (m, 6H), 2.68 (s, 6H), 2.58-2.55 (m, 4H). 2.28 (s, 6H), 2.17 (s, 3H), 1.85 (s, 3H). | 86.7 (s) |
| C849 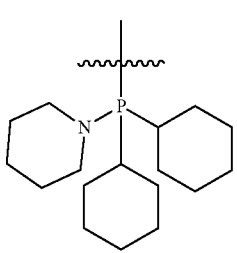 | 95 | 81 | 19.11 (s, 1H), 7.64 (d, 2H, $J_{H-H}$ = 5.9 Hz), 7.17 (t, 1H, $J_{H-H}$ = 6.8 Hz), 7.11-6.97 (m, 7H), 6.84 (t, 2H, $J_{H-H}$ = 8.8 Hz), 6.80 (s, 2H), 6.16 (s, 2H), 3.43-3.23 (m, 12H), 2.73-2.65 (m, 11H). 2.26 (s, 6H), 2.22 (s, 3H), 2.08 (s, 3H), 1.82 (s, 3H) | 107.9 (s) |
| C850 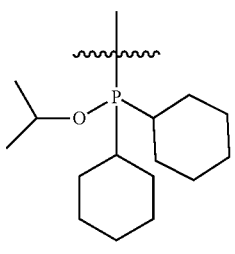 | 93 | 80 | 19.65 (s, 1H), 9.30 (bs, 2H), 7.08-6.89 (m, 5H), 6.53 (bs, 2H), 3.30-0.77 (m, 54H). | 92.1 (s) |
| C825  | 101 | 89 | 19.55 (d, 1H, $J_{H-H}$ = 11.2 Hz), 8.19 (bs, 2H), 7.16-6.94 (m, 3H), 6.85 (s, 2H), 6.16 (bs, 2H), 4.18-4.11 (m, 1H), 3.42-3.25 (m, 4H), 2.76 (s, 6H), 2.36 (s, 6H), 2.17 (s, 3H), 1.80 (s, 3H), 1.69-1.03 (m, 18H), 0.94 (d, 6H, $J_{H-H}$ = 5.9 Hz) | 145.9 (s) |

TABLE 6-continued

| Olefin metathesis catalyst | R¹—P(—R²)—R³ structure | Quantity (mg) | Yield (%) | δ ¹H NMR (300 MHz; C₆D₆) | δ ³¹P NMR (121 MHz; C₆D₆) |
|---|---|---|---|---|---|
| C832 | pyrrolyl-P(Cy)(Cy) | 96 | 84 | 19.74 (d, 1H, $J_{H-H}$ = 11.2 Hz), 8.17 (bs, 2H), 7.10-6.88 (m, 5H), 6.65-6.63 (m, 2H), 6.16 (bs, 2H), 6.11 (s, 2H), 3.44-3.26 (m, 4H), 2.75 (s, 6H), 2.36 (s, 6H), 2.19 (s, 3H), 1.80 (s, 3H), 1.58-0.93 (m, 22H). | 92.0 (s) |
| C865 | CyO-P(Cy)(Cy) | 89 | 75 | 19.53 (s, 1H), 8.24 (bs, 2H), 7.18-6.89 (m, 5H), 6.17 (bs, 2H), 4.06-4.01 (m, 1H), 3.43-3.26 (m, 4H), 2.77 (s, 6H), 2.37 (s, 6H), 2.21 (s, 3H), 1.82 (s, 3H), 1.78-1.01 (m, 32H). | 150.3 (s) |
| C850n | piperidinyl-P(piperidinyl)(Cy) | 82 | 54 | (400 MHz; C₆D₆): δ 19.47 (s, 1H), 8.46 (bs, 1H), 7.14 (m, 1H), 7.01 (t, J = 7.7 Hz, 2H), 6.94 (s, 3H), 6.20 (m, 2H), 3.44-3.17 (m, 4H), 3.04-2.75 (m, 11H), 2.75-2.56 (s, 6H), 2.22 (s, 3H), 1.82 (s, 3H), 1.69-1.50 (m, 5H), 1.41 (s, 11H), 1.28 (s, 7H), 1.08-0.75 (m, 3H). | (161.8 MHz; C₆D₆): δ 133.0 (s) |
| C851 | piperidinyl-P(piperidinyl)(piperidinyl) | 92 | 78 | (400 MHz; C₆D₆): δ 19.70 (s, 1H), 8.30 (bs, 2H), 7.19 (m, 1H), 7.04-6.98 (m, 2H), 6.93 (s, 2H), 6.25 (s, 2H), 3.43-3.16 (m, 4H), 2.86 (s, 6H), 2.85-2.77 (m, 12H), 2.48 (s, 6H), 2.22 (s, 3H), 1.82 (s, 3H), 1.48-1.34 (m, 6H), 1.29 (m, 12H) | (161.8 MHz; C₆D₆): δ 118.7 (s) |

Catalytic Activity of Complexes

Example 27

RCM of Diethyl Diallylmalonate

Ring closing metathesis reactions of diethyl diallylmalonate were run in the presence of different catalysts of the invention. In an argon filled glovebox, diethyl diallylmalonate (0.200 mL, 0.827 mmol), catalyst (0.021 mmol) and toluene (4 mL) were combined in a 40 mL scintillation vial equipped with a magnetic stir bar. The resulting reaction was stirred at 80° C. and analyzed by gas chromatography.

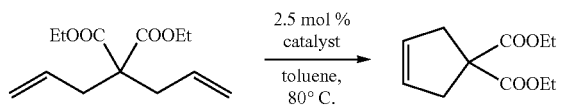 [SMILES: C=CCC(CC=C)(C(=O)OCC)C(=O)OCC ; CCOC(=O)C1(C(=O)OCC)CC=CC1]

| entry | catalyst | time | % yield |
|---|---|---|---|
| 1 | C609 | 1 | 15 |
| 2 | | 3 | 30 |
| 3 | | 5 | 36 |
| 4 | | 20 | 50 |
| 5 | C600 | 1 | 1 |
| 6 | | 3 | 1 |
| 7 | | 5 | 1 |
| 8 | | 20 | 1 |
| 9 | C591 | 1 | 3 |
| 10 | | 3 | 5 |
| 11 | | 5 | 6 |
| 12 | | 20 | 9 |

Example 28

Vinyl Ether Quenching Experiments

The catalysts of the invention show fast initiation, as indicated by the vinyl ether quenching experiments. For example, the initiation rate of the C832 complex is about two orders of magnitude faster than the C849 analogue.

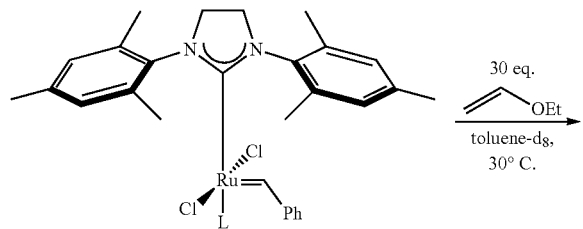

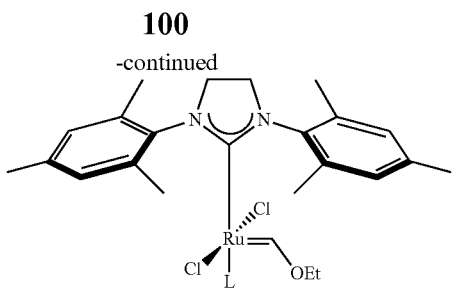

Figure 10:
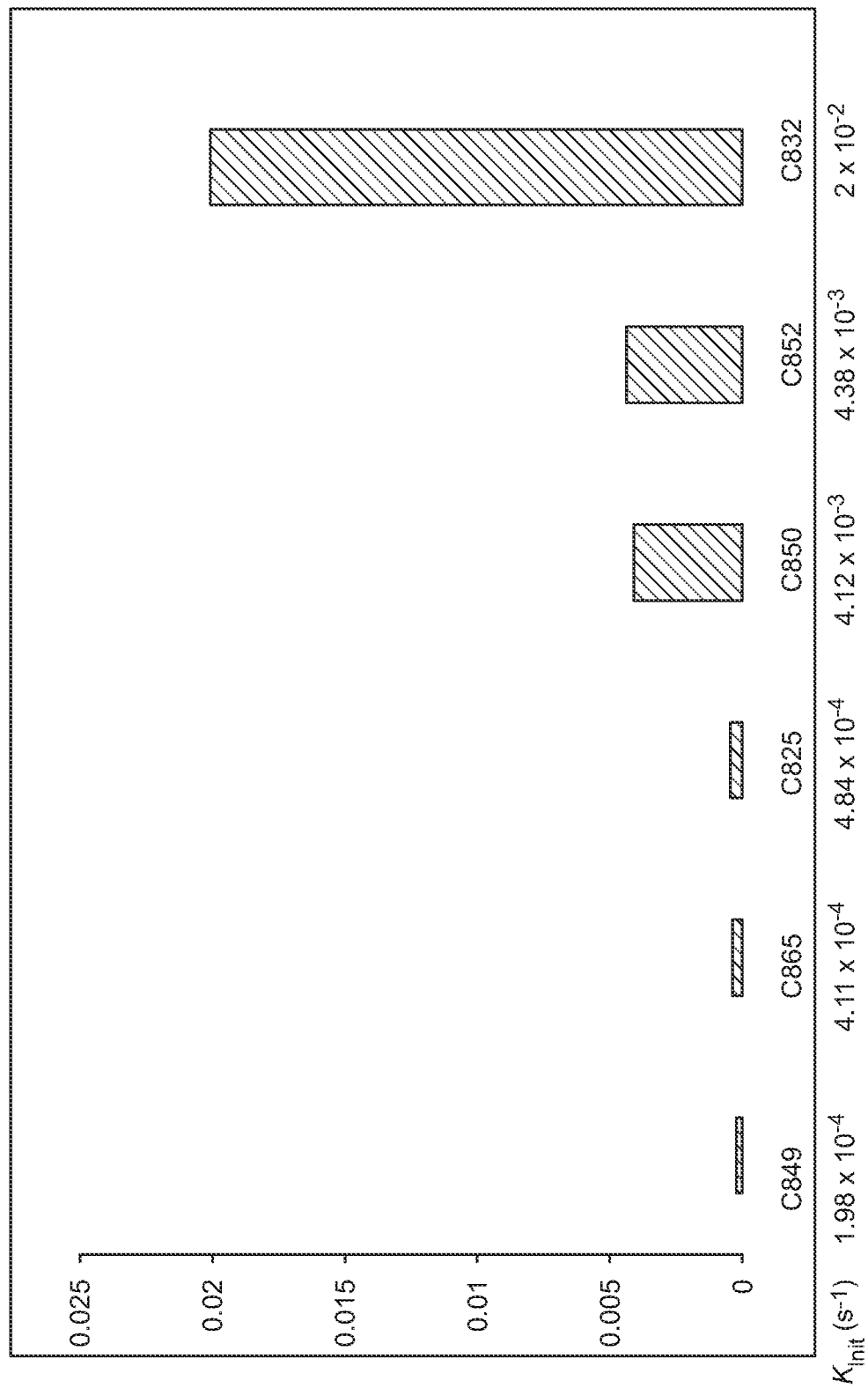
FIG. 10. Vinyl ether quenching experiments for catalysts: C849, C865, C825, C850, C852, and C832.
Figure 11:
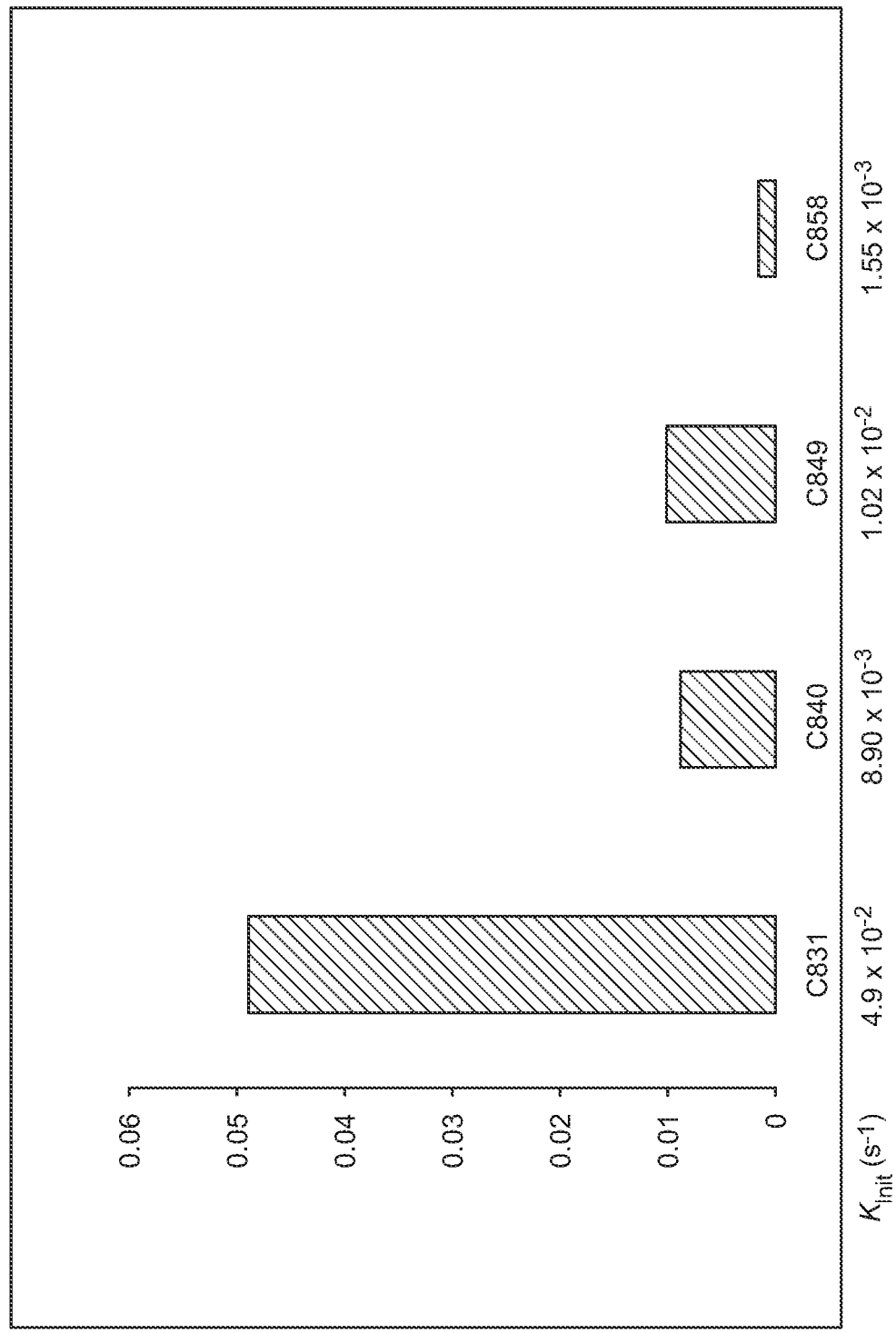
FIG. 11. Vinyl ether quenching experiments for catalysts: C831, C840, C849, and C858.

FIG. 10 shows the vinyl ether quenching experiments for catalysts: C849, C865, C825, C850, C852, and C832. FIG. 11 shows the vinyl ether quenching experiments for catalysts: C831, C840, C849, and C858. FIG. 12 shows the vinyl ether quenching experiments for catalysts: C848, C852, C855, and C858.

Example 29

ROMP Reactions

The catalytic activity of the complexes according to the invention, was evaluated in ROMP reactions as follows. A 250 mL beaker was filled with 100 g of DCPD-HT monomer and 50 ppm of CHP (cumene hydroperoxide). The monomer was equilibrated to the desired temperature in an oil bath (30° C.+/−0.5° C.). A J-Type thermocouple was suspended directly into the center of the monomer. The catalyst under study was dissolved in solvent (either toluene or $CH_2Cl_2$) to form a catalyst solution and the catalyst solution was then added to the monomer at a molar ratio of 45,000:1 (monomer:catalyst) to form a ROMP composition. Addition of the catalyst to the monomer to form the ROMP composition denoted the start of the ROMP reaction and hence, this was time point zero. Temperature readings were recorded using the thermocouple. The exotherm time was determined by measuring the amount of time that passed (i.e., the time difference) between time point zero and the time point that a propagating interface of the ROMP composition was first visually observed as the ROMP composition transitioned from a liquid state or gel state to a cured polymer state. ROMP reactions were stopped 2 hours after addition of the catalyst solution to the monomer. Time to exotherm is expressed by: slow >120 minutes; moderate 30-120 minutes; medium 1-<30 minutes; fast <1 minute and peak exotherm temperature are shown in Table 7.

TABLE 7

| Catalyst | DCPD-HT Monomer Temperature (° C.) | Time to Exotherm (min.) | Peak Exotherm Temperature (° C.) |
|---|---|---|---|
| C931 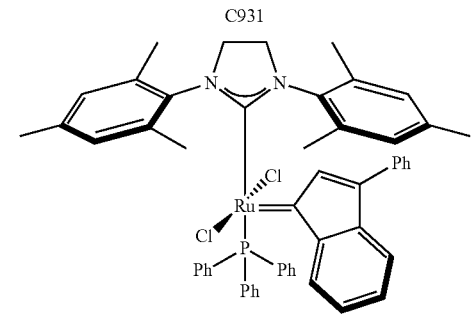 | 30 | medium | 192 |

TABLE 7-continued
| Catalyst | DCPD-HT Monomer Temperature (° C.) | Time to Exotherm (min.) | Peak Exotherm Temperature (° C.) |
|---|---|---|---|
| C940 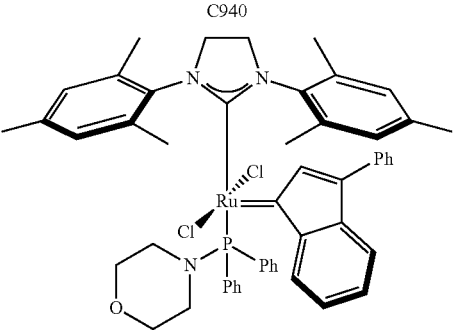 | 30 | moderate | 192 |
| C949morph 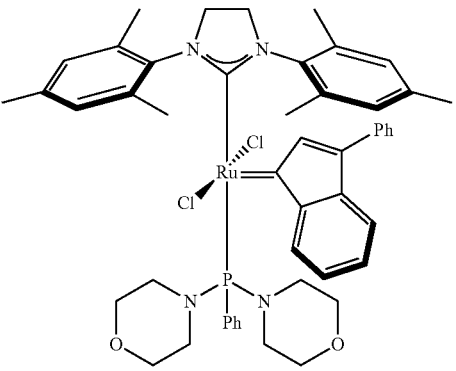 | 30 | moderate | 192 |
| C958 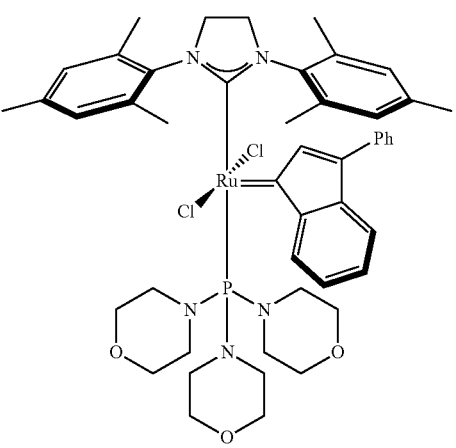 | 30 | moderate | 188 |

TABLE 7-continued

| Catalyst | DCPD-HT Monomer Temperature (° C.) | Time to Exotherm (min.) | Peak Exotherm Temperature (° C.) |
|---|---|---|---|
| C949 | 30 | slow | 186 |

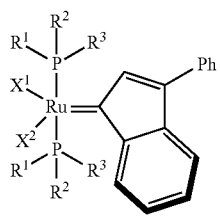

What is claimed is:

1. An olefin metathesis catalyst represented by Formula (I):

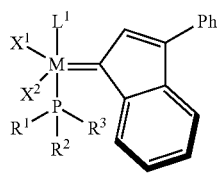

Formula (I)

wherein:

M is ruthenium or osmium;

$X^1$ and $X^2$ are independently halogen, trifluoroacetate, per-fluorophenols or nitrate;

$L^1$ is a ligand represented by the structure of Formula (II), or is a N-Heterocyclic Carbene ligand represented by the structure of Formula (III):

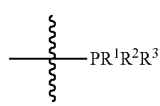

Formula (II)

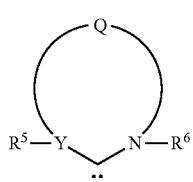

Formula (III)

$R^1$ is unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene) ($C_5$-$C_{24}$ aryl)]$_2$;

$R^2$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$;

$R^3$ is unsubstituted ($C_5$-$C_{24}$ aryl), substituted ($C_5$-$C_{24}$ aryl), unsubstituted saturated N-heterocycle, or substituted saturated N-heterocycle;

Y is $CR^4$ or N;

$R^4$ is hydrogen, unsubstituted ($C_1$-$C_{12}$ alkyl), or substituted ($C_1$-$C_{12}$ alkyl);

$R^5$ and $R^6$ are independently hydrogen, unsubstituted ($C_5$-$C_{24}$ aryl), or substituted ($C_5$-$C_{24}$ aryl);

Q is a two-atom linkage represented by structures —[$CR^7R^8$]$_s$—[$CR^9R^{10}$]$_t$— or —[$CR^{11}$=$CR^{12}$]—;

$R^7$, $R^8$, $R^9$ and $R^{10}$ are independently hydrogen, unsubstituted ($C_1$-$C_{24}$ alkyl), substituted ($C_1$-$C_{24}$ alkyl), unsubstituted ($C_5$-$C_{24}$ aryl), or substituted ($C_5$-$C_{24}$ aryl);

$R^{11}$ and $R^{12}$ are independently hydrogen, unsubstituted ($C_1$-$C_{24}$ alkyl), substituted ($C_1$-$C_{24}$ alkyl), unsubstituted ($C_5$-$C_{24}$ aryl), or substituted ($C_5$-$C_{24}$ aryl); and "s" and "t" are independently 1 or 2.

2. The olefin metathesis catalyst according to claim 1, represented by the structure of Formula (VI):

Formula (VI)

wherein:

$X^1$ is Cl;

$X^2$ is Cl;

$R^1$ is morpholino, thiomorpholino, 1-methyl-piperazino, piperidino, N-acetyl-piperazino, di-benzylamino, N-ethylcarboxylate-piperazino, diethyl-amino, methyl-phenylamino, or di-iso-propylamino;

$R^2$ is phenyl, morpholino, thiomorpholino, 1-methyl-piperazino, piperidino, N-acetyl piperazino, di-benzyl-amino, N-ethylcarboxylate-piperazino, diethyl-amino, methyl-phenylamino, or di-iso-propylamino; and $R^3$ is phenyl or morpholino.

3. The olefin metathesis catalyst according to claim 2, selected from:

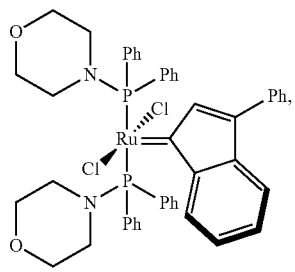

C905

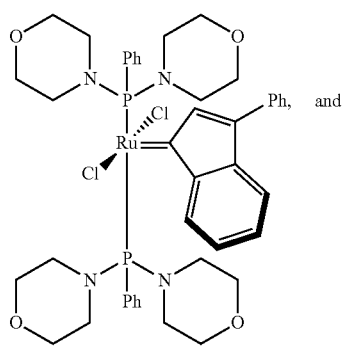

C923

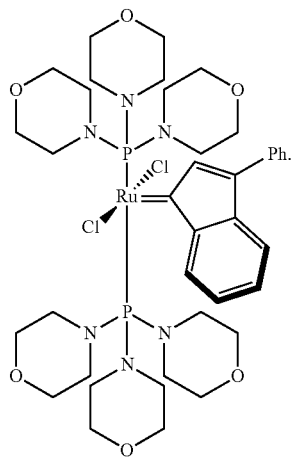

C941

4. The olefin metathesis catalyst according to claim 1, represented by the structure of Formula (VII):

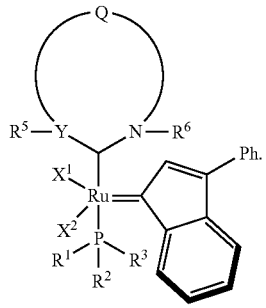

Formula (VII)

5. The olefin metathesis catalyst according to claim 4, represented by the structure of Formula (VIII):

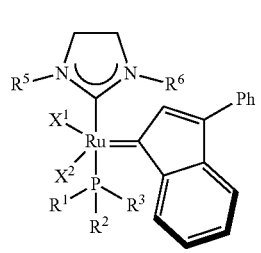

Formula (VIII)

wherein:
$X^1$ is Cl;
$X^2$ is Cl;
$R^1$ is morpholino, thiomorpholino, 1-methyl-piperazino, piperidino, N-acetyl-piperazino, di-benzyl-amino, N-ethylcarboxylate-piperazino, diethyl-amino, methyl-phenylamino, or di-iso-propylamino;
$R^2$ is phenyl, morpholino, thiomorpholino, 1-methyl-piperazino, piperidino, N-acetyl-piperazino, di-benzyl-amino, N-ethylcarboxylate-piperazino, diethyl-amino, methyl-phenylamino, or di-iso-propylamino;
$R^3$ is phenyl or morpholino; and
$R^5$ and $R^6$ are independently 2,4,6-trimethyl-phenyl, 2,6-di-iso-propylphenyl, 2-iso-propylphenyl, or 2-methyl-6-iso-propylphenyl;
Q is a two-atom linkage represented by structure —$[CR^7R^8]_s$—$[CR^9R^{10}]_t$—;
$R^7$, $R^8$, $R^9$ and $R^{10}$ are independently hydrogen; and
"s" and "t" are independently 1.

6. The olefin metathesis catalyst according to claim 5, selected from:

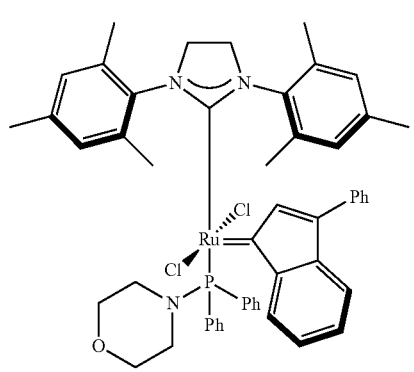

C940

-continued

C949 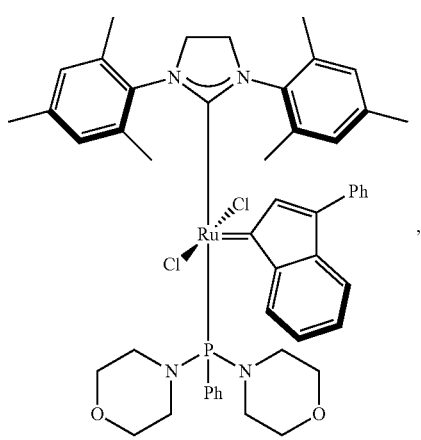,

C958 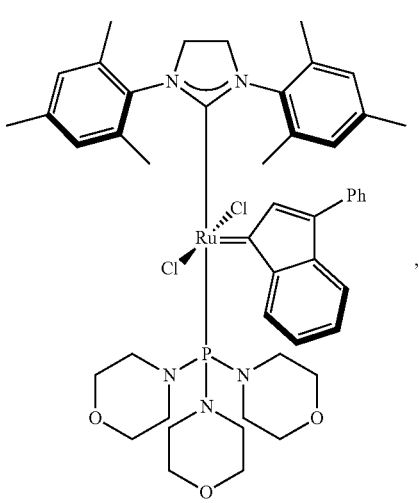,

C1042 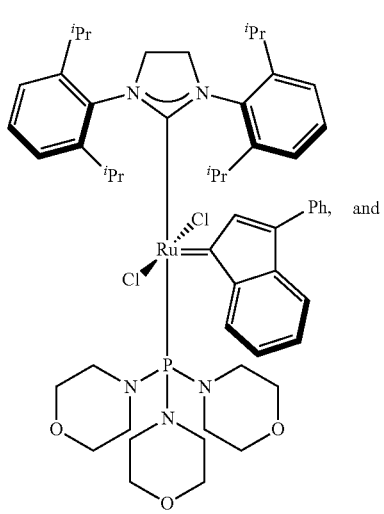 and

-continued

C1050 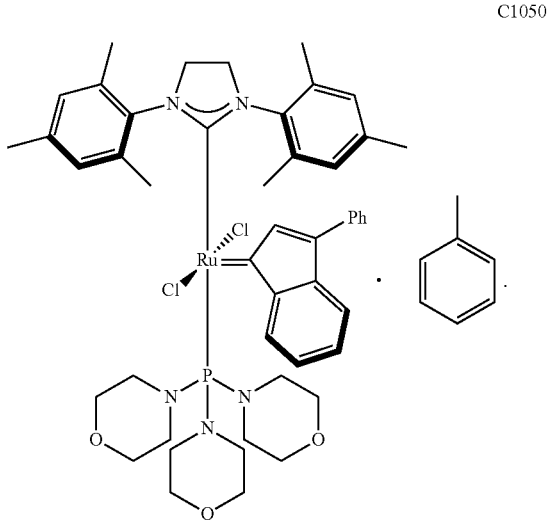 .

7. A method of synthesizing an olefin metathesis catalyst represented by the structure of Formula (A):

Formula (A)

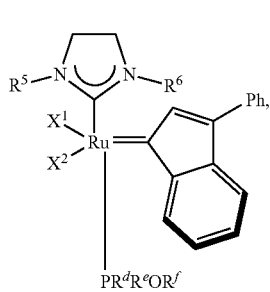

the method comprising contacting an olefin metathesis catalyst represented by the structure of Formula (VIII):

Formula (VIII)

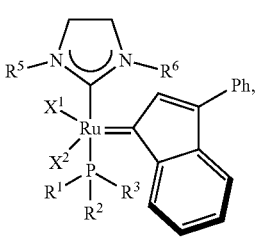

with a $PR^dR^eOR^f$ ligand at room temperature in an inert solvent, wherein:
$X^1$ and $X^2$ are independently halogen, trifluoroacetate, per-fluorophenols or nitrate;
$R^1$ is unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$;
$R^2$ is unsubstituted ($C_5$-$C_{24}$ aryl), substituted ($C_5$-$C_{24}$ aryl), unsubstituted saturated N-heterocycle, substituted saturated N-heterocycle, —NH($C_1$-$C_{24}$ alkyl), —N($C_1$-$C_{24}$ alkyl)$_2$, —NH($C_5$-$C_{24}$ aryl), —N($C_5$-

$C_{24}$ aryl)$_2$, —N($C_1$-$C_{24}$ alkyl)($C_5$-$C_{24}$ aryl) or —N[($C_1$-$C_6$ alkylene)($C_5$-$C_{24}$ aryl)]$_2$;

$R^3$ is unsubstituted ($C_5$-$C_{24}$ aryl), substituted ($C_5$-$C_{24}$ aryl), unsubstituted saturated N-heterocycle or substituted saturated N-heterocycle;

$R^5$ and $R^6$ are independently hydrogen, unsubstituted $C_5$-$C_{24}$ aryl, or substituted $C_5$-$C_{24}$ aryl; generally $R^5$ and $R^6$ are independently substituted $C_5$-$C_{24}$ aryl with one to three unsubstituted ($C_1$-$C_6$ alkyl) groups or substituted ($C_1$-$C_6$ alkyl) groups;

$R^d$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl;

$R^e$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; and $R^f$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl.

8. The method according to claim 7, wherein:

$X^1$ is Cl;

$X^2$ is Cl;

$R^1$ is morpholino, thiomorpholino, 1-methyl-piperazino, piperidino, N-acetyl-piperazino, di-benzyl-amino, N-ethylcarboxylate-piperazino, diethylamino, methyl-phenylamino, or di-iso-propylamino;

$R^2$ is phenyl, morpholino, thiomorpholino, 1-methyl-piperazino, piperidino, N-acetyl-piperazino, di-benzyl-amino, N-ethylcarboxylate-piperazino, diethylamino, methyl-phenylamino, or di-iso-propylamino; and $R^3$ is phenyl or morpholino $R^5$ is 2,4,6-trimethylphenyl;

$R^6$ is 2,4,6-trimethylphenyl;

$R^d$ is phenyl;

$R^e$ is phenyl; and $R^f$ is phenyl, methyl, p-(OMe)phenyl, or iso-propyl.

* * * * *